US009114843B2

(12) United States Patent
Ryan et al.

(10) Patent No.: US 9,114,843 B2
(45) Date of Patent: Aug. 25, 2015

(54) COLLAPSIBLE CYCLE

(71) Applicant: Projectgarlic Limited, Cashmere, Christchurch (NZ)

(72) Inventors: Grant James Ryan, Christchurch (NZ); Peter Lloyd Higgins, Christchurch (NZ); Caleb Peter Smith, Christchurch (NZ)

(73) Assignee: PROJECTGARLIC LIMITED, Cashmere, Christchurch (NZ)

( * ) Notice: Subject to any disclaimer, the term of this patent is extended or adjusted under 35 U.S.C. 154(b) by 31 days.

(21) Appl. No.: 13/914,527

(22) Filed: Jun. 10, 2013

(65) Prior Publication Data
US 2013/0277941 A1 Oct. 24, 2013

Related U.S. Application Data

(63) Continuation-in-part of application No. 13/003,994, filed as application No. PCT/IB2009/006267 on Jul. 17, 2009, now Pat. No. 8,523,212.

(30) Foreign Application Priority Data

Jul. 17, 2008 (NZ) ........................................ 569837

(51) Int. Cl.
*B62K 15/00* (2006.01)
(52) U.S. Cl.
CPC ............. *B62K 15/006* (2013.01); *B62K 15/008* (2013.01)
(58) Field of Classification Search
CPC ............................ B62K 15/006; B62K 15/008
USPC ............................................... 280/278, 287
See application file for complete search history.

(56) References Cited

U.S. PATENT DOCUMENTS

| 669,201 A | 3/1901 | Hehr | |
| 4,462,606 A * | 7/1984 | Hon | 280/278 |
| 4,653,763 A * | 3/1987 | Schulte | 280/28.15 |
| 5,474,148 A * | 12/1995 | Takata | 180/206.2 |
| 6,267,401 B1 * | 7/2001 | De Jong | 280/287 |
| 6,799,771 B2 * | 10/2004 | Bigot | 280/278 |
| 7,175,192 B1 * | 2/2007 | Lu | 280/287 |
| 7,651,109 B2 * | 1/2010 | Tong | 280/278 |
| 2005/0263981 A1 | 12/2005 | Kettler et al. | |
| 2007/0018422 A1 | 1/2007 | Pan | |

(Continued)

FOREIGN PATENT DOCUMENTS

| DE | 3100185 A1 | 8/1982 |
| JP | 06-099871 | 4/1994 |
| JP | 2002-529317 A | 9/2002 |

(Continued)

*Primary Examiner* — Tony Winner
(74) *Attorney, Agent, or Firm* — Stephen M. De Klerk

(57) ABSTRACT

A collapsible cycle for use by a rider over a terrain surface comprises a frame having front and rear portions and a seat attached to the frame. A front wheel is rotatably attached to a steering member, the front wheel rotatable in a first plane about a primary axis, and the steering member being pivotally attached to the front frame portion for rotation about a secondary axis orthogonal to the primary axis. A user-operable steering mechanism is coupled to the steering member. A rear wheel is rotatably attached to the rear frame portion and rotatable in a third plane about a tertiary axis. A drive mechanism is operatively coupled to the front and/or rear wheel. The cycle is collapsible from an erect riding configuration to a collapsed configuration by repositioning the front and rear wheels into mutually closer proximity.

34 Claims, 49 Drawing Sheets

(56) References Cited

U.S. PATENT DOCUMENTS

2007/0290479 A1 12/2007 Tong
2008/0116659 A1* 5/2008 Seaman ................. 280/278

FOREIGN PATENT DOCUMENTS

| JP | 2005-112126 | 4/2005 |
|----|-------------|--------|
| JP | 2008-044565 | 2/2008 |

* cited by examiner a)            b)

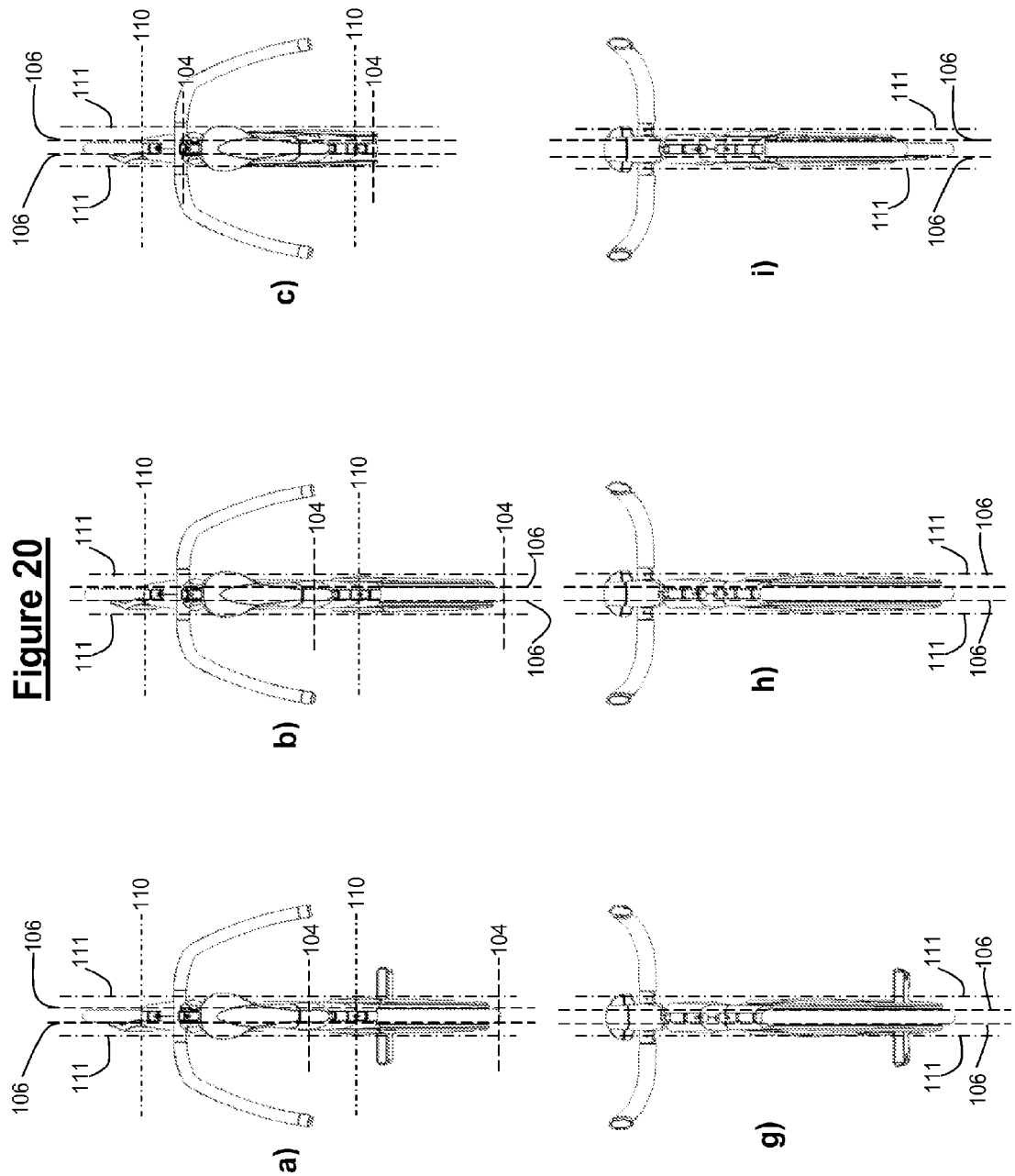

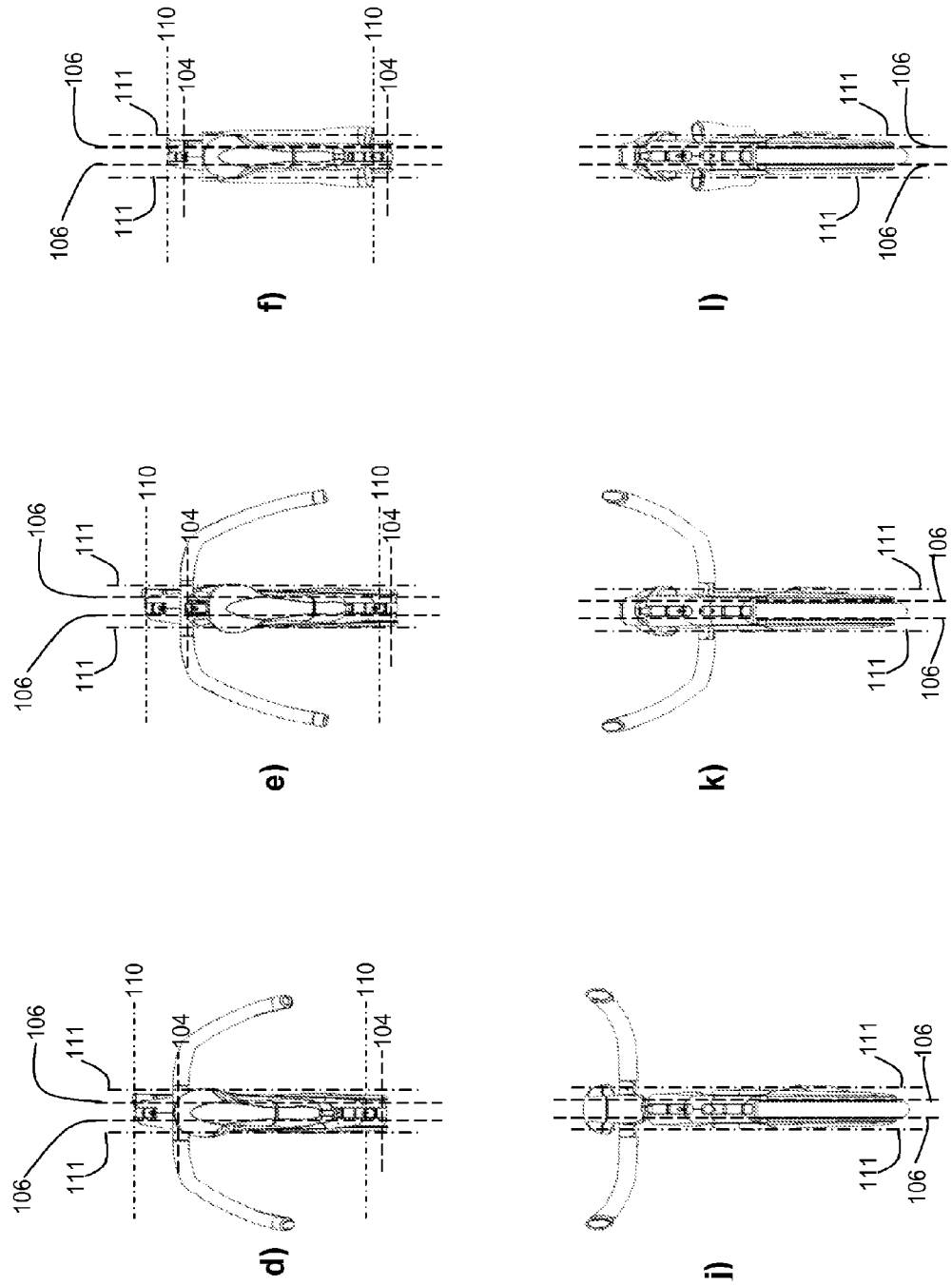

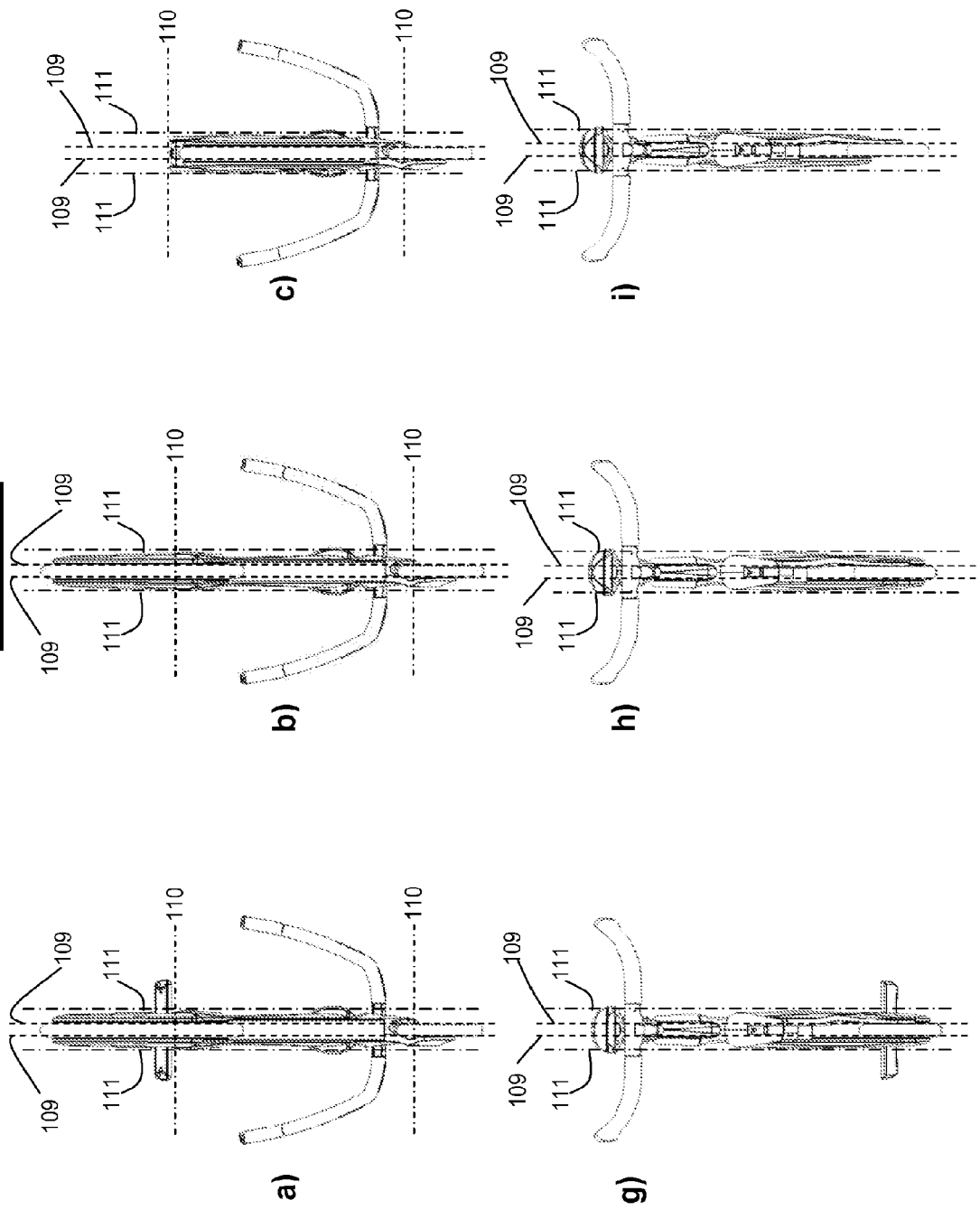

Figure 35
a) 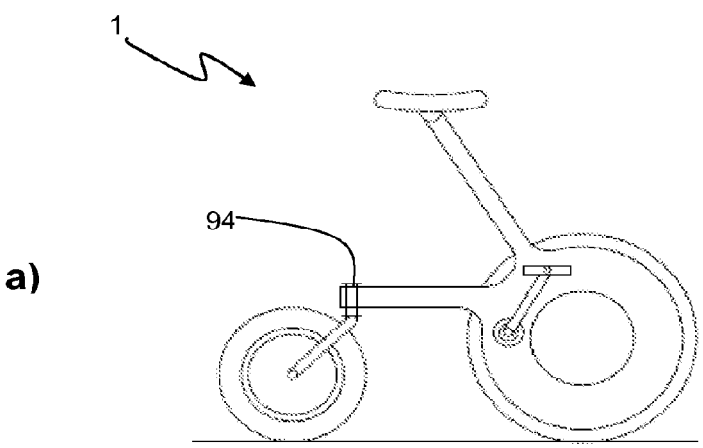
b) 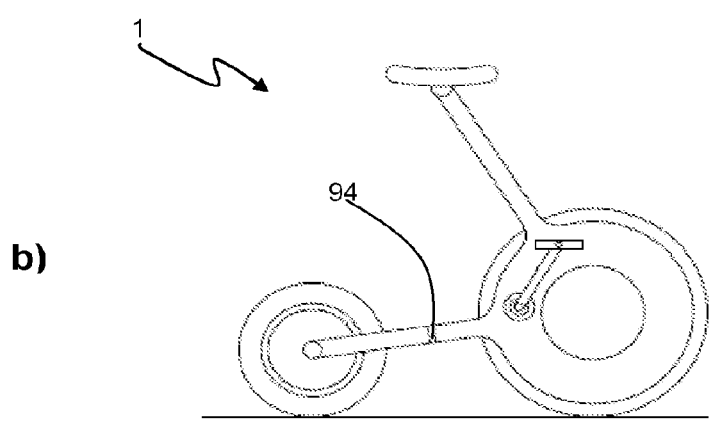
c) 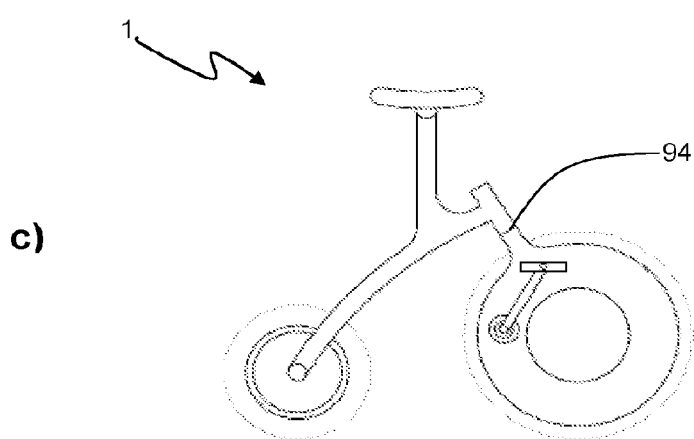

COLLAPSIBLE CYCLE

CROSS-REFERENCE TO RELATED APPLICATIONS

This is a continuation-in-part of prior U.S. patent application Ser. No. 13/003,994, filed on Jan. 13, 2011, which is a National Phase of International Application No. PCT/IB2009/006267 filed on Jul. 17, 2009, which claims priority from New Zealand Patent Application No. 569837, filed on Jul. 17, 2008.

TECHNICAL FIELD

This invention relates to cycles, and more particularly relates to a new and improved compactable cycle.

BACKGROUND ART

Cycles are one of the most widespread and efficient forms of individual human transport. The genesis of cycling produced the 'Penny Farthing' cycle with an oversized front wheel and a small stabilizing rear wheel. The Penny Farthing displayed numerous drawbacks of this design, including speed/efficiency limitations from a direct drive front wheel, difficulties in mounting/dismounting and limited manoeuvrability. These drawbacks brought about the diamond frame, chain driven rear wheel cycle configuration well-established to this day. Although significant developments have occurred in materials and ancillary equipment such as brakes, suspension and gears, this basic cycle configuration has evolved little over the subsequent 120 years.

Contemporary cycle design has been largely influenced by off-road riding or street/track racing and the corresponding cycle design elements heavily influence the consumer products marketed by cycle manufacturers. Despite the bias to designs optimised for such sporting origins, the overwhelming majority of cycles are used in non-competitive applications in urban environments for commuting and general transport. Cycles optimised for urban use have also been produced, though these tend to be adaptations of mountain bike designs with road-orientated tyres, simplified or no suspension and a more upright seating position than racing/sport orientated cycles. They can also suffer from a social perception of being staid, old-fashioned and lacking the intangible vicarious credibility of association with more dynamic sporting/adventurous activities.

However, increasing urban congestion, inexorable fuel cost increases and the predominance of workplaces being located in cities has created significant interest in alternatives to motor vehicle transportation. Public transport should present an attractive solution to many of these shortcomings in urban motor vehicle transport, particularly in commuting. However, much to the frustration of civil authorities, there is significant reluctance amongst individual travellers to lose the freedom of movement offered by individual transport. This reluctance is so well ingrained in many individuals that they will tolerate extensive traffic congestions, prolonged journey times as well as inconvenient and/or expensive parking options to maintain that perceived freedom.

Cycling offers a very attractive alternative for urban transport, and results in negligible traffic jams, zero fuel costs, minimal maintenance overheads and environmental impact. However, a significant number of potential users are still deterred from urban cycle usage by considerations including;

1. impracticability for extended commuting distances without supplementing with public transport;
2. incompatibility with most forms of public transport;
3. storage and/or security issues when not being ridden and/or being carried on public transport;
4. inconvenience of combining with automobiles for multi-mode journeys,
5. physical effort required for un-assisted pedal cycle travel.

A combination of cycle travel and either public transport or private vehicles offers a potential synergy of the beneficial attributes of both transport modes, namely;
   users retain the freedom of movement at either end of their journey, while a bus, train, tram, car or the like provides rapid distance coverage in-between, and;
   both conveyance means are cost-effective, with low per-person environmental impact compared to car travel.

Further benefits include the increased effectiveness of inner-city living, providing freedom of movement without the cumbersome coupling to public transport routes and timetables.

Unfortunately, cycles are also unwieldy, cumbersome objects to stow, carry or generally manipulate when not being ridden. Moreover, the majority of public transport is designed for ambulant individuals with minimal hand luggage of an essentially stowable/portable nature. Cycles cause significant handling difficulties for users during ingression/egression of buses, trains, or trams, they may obstruct doorways/passageways, hinder other passengers and possible cause minor impact injuries and/or clothing soiling from contact with the numerous inflexible projections, chains and the like. Many public forms of transport cannot accommodate conventional cycles, motor scooters or motor bikes at all, or they must be placed in special freight compartments.

Although occupying far less volume than motor vehicles, conventional cycles pose security issues for travellers when not in use. A variety of locks, chains, and the like are routinely used by cyclists to prevent theft. Unfortunately, the very adaptability and simplicity of cycles, vis-à-vis adjustable, quick release fitting/accessories (e.g. seats, wheels, lights, panniers, trip computers and so forth) often requires the rider to partially dismantle the cycle secure each fitting and/or completely detach the items from the secured cycle secured to a rack, post or similar. Clearly, commonplace procedures such as having to detach the front wheel and place adjacent the rear wheel to enable a security chain/lock to pass through both wheels and having to carry a cycle seat, lights or the like is far from convenient or desirable. The alternative however, of taking a conventional cycle into a typical office building and negotiate stairwells, lifts, narrow corridors, or office cubicles is also fraught with difficulties.

The physical effort of cycling creates further disincentives to those with employment in professional offices, customer service, or any environment requiring good personal presentation. The attendant overheads of additional showering and/or clothing changes to maintain acceptable workplace personal presentation and hygiene is often perceived as too inconvenient to warrant the effort in cycle commuting. Electric cycles and pedal-assisted electric cycles have been developed to supplement the rider's leg power. In general, the addition of an electrical drive mechanism adds significantly to the cost and weight of the cycle without in itself addressing the first three deterrents to urban cycling usage listed above.

Unsurprisingly therefore, there have been regular and concerted attempts to produce a practical folding, collapsible or otherwise compactable cycle to ameliorate the above difficulties.

An inherent complication with creating a practicable folding system for conventional bicycle frame design include the numerous protrusions, the lack of stability in most orientations, and the desire to avoid dismantling the drive mechanism (particularly oiled chain drives) during collapsing/erecting. That collapsing cycles have become increasingly popular despite these drawbacks is testament to the greater problems faced by the alternative urban transport options and despite the overriding premium on space in urban environments ranging from congested roads, limited parking, personal workspaces and urban homes. There is thus a clear benefit in producing a compact bicycle capable of providing urban transport that may also be readily transported and stored by an individual when not being ridden.

Several factors have however hindered the widespread public acceptance of prior art collapsible cycles, namely:
- compromised performance from typical design features including small diameter wheels, lack of frame rigidity;
- unwieldy size, weight and resultant collapsed configuration of 'full'-sized folding bike frames and wheel assemblies;
- risk of entrapment and/or clothing soiling from a chain, gearing, brakes mechanism.

Existing folding cycles may be classified according to their wheel diameter into three broad categories:
1. Full size cycles with comparable wheel diameters to conventional road cycles (i.e. 26") often with a single frame hinge folding the cycle in half. The almost unrestricted on-road performance comes at the cost of minimal, if any reduction in volume of the collapsed cycle and additional cost.
2. Smaller (24-16" diameter) wheels with more elaborate folding mechanisms. Typically 20" diameter wheels are considered the threshold for effectively negotiating urban riding hazards such as curbs, speed bumps, potholes and the like.
3. Sub 16" diameter wheels which place a premium on the collapsed volume over on-road performance. Often involving complex collapsing mechanisms, these cycles are generally difficult to ride for extended distances, or at speed and generally result in highly compromised riding functions, efficiencies and comfort.

The target market for these three cycle types respectively spans:
1. intermittent recreational users who are happy to compromise ease and speed of foldability for enhanced riding performance and comfort;
   urban commuters travelling regularly and for an appreciable distance, possibly mixed mode commuting in conjunction with public transport;
   users with space premium environments (e.g., apartment dwellers, car drivers), possibly intermittent usage needs, short distances and high need for portability, mixed mode commuting, marine craft and the like.

Self evidently, the largest potential market lies with regular urban commuters who need both cycle performance and effective folding, typified by purchases in the second category above. Typical purpose-designed collapsible bicycles in this category incorporate a hinged frame enabling the two halves of the frame to be folded together such that the two wheels lie substantially adjacent. Further folding techniques often include folding pedals, a hinged/detachable seat and the like. The resultant folded cycle is invariably still a large object with numerous projections and mechanisms which may become entangled with a user or external objects. Moreover, the wheel diameter provides a fundamental limitation on the degree of compaction possible without somehow dismantling the wheel itself.

Some of the features desirable in an idealised urban cycle include:
- capacity for sustained super-walking speeds, notwithstanding a typically a minimal need for high speeds (e.g. exceeding 20-30 km/h) in urban environments;
- collapsible configuration and dimensions sufficiently compact and wieldy to be carried as a practical day-pack, bag or satchel;
- minimal projections or protrusions in its collapsed state;
- minimised maintenance requirements;
- sufficient diameter wheels for riding comfort and the capacity to surmount routinely encountered urban obstacles such as curbs and potholes;
- prominent, high-visibility, rider seating position;
- high manoeuvrability, particularly at low speeds;
- sufficient stability to be ridden by riders of low/average physical dexterity;
- safe stopping means;
- rapidly compactable without tools;
- light-weight.

Modern cycle design (including folding cycles) have largely settled on the well established configuration of front wheel steering, rear wheel chain drive (via a chain driven offset crank located between the wheels) with the rider positioned between two identically sized wheels with handlebar steering attached to the front wheel at approximately midriff height. Most powered cycles and motor cycles also adopt the same general configuration. This configuration is however incompatible with many of the above desirable characteristics for a folding cycle. Typical folding cycles retain both wheels attached to a frame which folds approximately in half about a substantially central hinge point. Consequently, usage of small diameters for both wheels is commonly employed to reduce the folded cycle volume, with the resultant drawbacks discussed above.

Moreover, for pedal driven cycles, achieving a worthwhile degree of compaction from a reduced wheel size creates an impractically small pedal crank length for ergonomically efficient usage or requires the use of a conventional chain drive with the pedal crank exterior from the wheel. In the latter configurations, the use of cranks sized for efficient adult human usage necessitates positioning the pedal shaft in a higher horizontal plane than the rotational axis of the driven wheel to avoid ground contact during pedalling.

The presence of an exposed chain further reduces the practicality of carrying a collapsed cycle as a backpack or satchel without the risk of soiling the user's clothing. The complications associated with detaching and re-attaching a chain from a wheel precludes such actions as a practical and convenient step to overcome such drawbacks.

Shortening the wheelbase of a cycle can reduce its folded size. However, the reduced stability due to the riders high centre of gravity increase the vulnerability of overturning during braking or when striking an obstruction. The risks associated with a rider pitching forward are exacerbated by the conventional placement of the handlebars in front of the rider and above their knees causing the rider to strike the handlebars or become entangled in the machine, trapped by the handlebars.

The infancy of bicycle design explored a variety of configurations including the 'penny farthing' configuration; —asymmetrical wheel size, direct pedal crank drive (i.e. no chain and gearing), and a very large front wheel diameter. However, one of the difficulties with direct front-wheel-drive, front-wheel-steer pedal cycles of this type, particularly when starting from rest, is that pressure applied to the pedals exerts a destabilising steering effect. Driving the pedal crankshaft about the center of the front wheel also imposes ergonomic constraints on:
the type of frame configurations;
possible seating positions;
the maximum pedal crank size possible without risk of grounding, and
the maximum and minimum wheel diameter.

Powered cycles may use auxiliary power units to supplement pedal power (e.g. when travelling up inclines) or be powered solely by a power unit such as a combustion engine or electrical drive. Prior art powered cycles suffer from the aforesaid drawback of pedal cycles plus the additional complexity, cost and weight associated with incorporating the power unit into a collapsible cycle configuration. It will be thus appreciated there is a need for a compactable cycle with at least some of the aforementioned desirable features, while mitigating at least some of the disadvantages outlined. It would be particularly advantageous to provide such a bicycle which is also readily collapsible into a compact package for storage or transport.

It is an object of the present invention to address the foregoing problems or at least to provide the public with a useful choice.

Further aspects and advantages of the present invention will become apparent from the ensuing description which is given by way of example only.

SUMMARY OF THE INVENTION

It should be noted that the terms 'steering member' and 'secondary axis' are also hereinafter referred to for ease of readability as a 'steering fork' and 'steering axis' respectively.

As used herein the term;

'frame' includes any structure, housing, body, elements or components interlinking the wheels, steering mechanism, steering member, and seat of the cycle and any other components not otherwise discretely specified and includes fittings such as wheel mounts, brackets and the like;

'wheel' includes a complete wheel assembly including a terrain-engaging annular tyre, a rotatable or fixed rim portion mounting said tyre, hubless wheels, hubbed wheels with a centre rotation axle, spoked wheels, solid wheels, eccentrically driven wheels, wheel rim, and/or any other element attached to the steering member;

'seat' includes any structure, protrusion, platform, or recess configured to support a seated rider, further including any associated supporting elements, fittings, structure and any positional-adjustment mechanism or facilities or the like and, in the case of detachable seats, the term 'seat' include a seat attachment point, structure, or fitting.

'steering member' includes any structure rotatably retaining the front wheel, including single and double-sided forks, steerer tubes, and/or any other structure pivotally attaching the steering member to the frame;

'steering mechanism' includes any mechanism, structure of fitting attached to the steering member for pivoting same, including a stem, handlebars, joystick, pulleys, levers or the like.

'drive mechanism' includes any mechanism for supplying motive force to the cycle.

According to one aspect, the present invention provides a cycle for use by a rider over a terrain surface, said cycle including:
a seat attached to the frame;
a frame having a:
front frame portion;
rear frame portion;
longitudinal axis coincident with a second plane orientated substantially vertically, passing through a forward and rearward direction of cycle travel, and
lateral axis orthogonal to said major axis,
a front wheel attached to a steering member, said front wheel rotatable in a first plane about a primary axis, said steering member being pivotally attached to the front frame portion for rotation about a secondary axis orthogonal to said primary axis;
a user-operable steering mechanism coupled to said steering member;
a rear wheel rotatably attached to the rear frame portion and rotatable in a third plane about a tertiary axis, wherein said front and rear wheels have different diameters, and
a drive mechanism operatively coupled to the front and/or rear wheel;
said cycle characterised in the inclusion of a recess or aperture in one said wheel capable of at least partially accepting the insertion of the other wheel in said collapsed configuration.

Contemporary conventional riding positions for non-recumbent cycles place the rider with an inclined torso stance, partially crouched with a lowered head. Whilst being more aerodynamically advantageous for higher speeds, this position places more strain on the rider's physique and reduces the rider's peripheral awareness and road presence for other traffic.

A natural, upright sitting position, with the rider's feet in front of the rider's hips in an unstressed configuration, is impractical with conventional cycle configurations. Preferably, the cycle includes at least one footrest on the front wheel configured such that a rider seated on the seat in operative contact with said steering member and footrest when the cycle is in motion, is positioned in an unstressed, substantially upright posture without substantial torso inclination whilst permitting both seated rider's feet to simultaneously reach the terrain surface when the cycle is stationary.

Thus, the rider is able to ride the aforementioned cycle in an ergonomically balanced, unstressed stable seating posture with the rider's legs extended forward to the front wheel footrest(s) rather than being placed below and/or behind the rider's hips. In comparison to a conventional riding posture, this upright riding position provides numerous advantages for urban transport including:
an excellent field of view and an elevated sightline for the rider;
presenting a greater visual signature or presence for other road users;
reduced musculoskeletal strain, and
placing the riders feet forward of the hips in a stable and natural position, reducing the minimum seat height required and thus lowering the centre of gravity and improving stability.

This riding position is in marked contrast to the overwhelming majority of both contemporary and historical cycle designs. A conventional riding position forces the rider to support a portion of the torso weight on the front handlebars via the rider's back, shoulders and arms. Road-racing style cycles optimised for speed are configured to place the rider with their torso and head in a substantially recumbent prone position. Such a riding position is entirely unsuited to urban riding/commuting given the low average speeds and need for high visibility and manoeuvrability. Racing cycles are also very difficult to configure as effective folding/compacting designs.

Mountain bikes and urban-specific variants have a more upright torso riding posture, though the rider's torso is still required to be inclined in order for the rider to reach the steering mechanism and brakes. Some form of inclined torso stance is difficult for a cycle designer to avoid given the innate dynamics/ergonomics of a rear-wheel pedal crank driven conventional cycle, coupled with the constraints of human body proportions.

It will be appreciated that the drive mechanisms may be divided into two categories, i.e. mechanisms powered by the human user/rider (such as pedal cranks) or mechanisms with a power source independent or external to the user/rider (such as electric motors, engines or the like) defined herein as 'user-powered' and 'externally-powered' respectively. As used herein, the term "footrests" encompasses any fitting configured to permit a user to place their feet during riding and includes movable (e.g. pedal cranks), cages, foldable and fixed rests.

Preferably said drive mechanism includes at least one of: an electric motor, generator, pedal crank, pedal crank and chain drive, internal or external combustion engine and/or any combination of same. These drive mechanisms are individually considered more fully in subsequent sections below.

The present invention thus provides a conceptually divergent frame configuration/seating from existing cycle designs, with the closest comparable riding posture being exhibited by penny farthing designs from the turn of the last century. However, known penny farthing designs possess numerous germane differences to the present invention as explained below.

The first Penny Farthing cycles were directly powered by a pedal crank through the front wheel axis and thus the front wheel needed to be of a significant diameter to provide adequate speed for a single rotation of the crank. However, the enlarged front wheel diameter prevented the rider from touching the terrain surface whilst seated. Moreover, the highly elevated riding position created a high centre of gravity, low manoeuvrability and poor braking performance. A Penny Farthing's riding position can expose the rider (particularly in the event of a rapid deceleration) to substantial vulnerability from;
- entanglement with the handlebars;
- difficulty in dismounting;
- a 'catapulting effect' about the front wheel axis from the resultant moment created by the high seating position, and relatively short wheelbase
- falls during slow speed riding through both the unwieldy size of front wheel and inability to use stabilising feet on the terrain surface.

In contrast, when configured and dimensioned to place the seated rider's feet in touching distance with the ground, certain embodiments of the present invention attenuate each of the above shortcomings. Such configurations include a combination of specific cycle frame geometry/dimensions and a front wheel diameter significantly smaller than conventional Penny Farthings, to create in effect a 'Mini-Farthing'. To distinguish from the historical prior art Penny Farthing design and from the embodiments of the present invention, the term 'Mini Farthing' will be used to denote the latter, where although the front wheel is larger than the rear, the rider is still able to touch the ground with both feet when stationary and rides with both feet on front wheel footrests/pedals.

Moreover, for both 'user-powered' and 'externally-powered' drive mechanisms, placing the rider's feet on front wheel footrests during riding also provides;
- increased dynamic stability,
- interactive rider involvement, and
- tactile feedback.

It will be apparent that the rider may assist the steering inputs to the front wheel via one or both footrests. In some instances, steering of the cycle may be performed solely by rider-input via the footrests. This may occur for intermittent periods when the rider's hands are otherwise occupied or in one embodiment, as the primary method of steering, i.e. the front wheel footrests themselves are the said user operable steering mechanism coupled to said steering member. Although a manually operated steering mechanism may be superior in terms of manoeuvrability, ridability and ease of use, a solely foot-steered embodiment offers a potentially more simplified construction that is compactable into a smaller volume.

A fuller consideration of the specific steering mechanism variants that may be implemented with the present invention and their respective performance parameters are subsequently discussed in more depth. The location of the steering mechanism coupled to the steering member is however specifically pertinent to the issue of riding position. Other configuration parameters identified as having a pertinent influence on the cycle performance for the present invention are identifiable from considerations including:
- locating a manually operated steering mechanism within an easily accessible distance from the seat;
- a seat height not exceeding the rider's inside leg length;
- footrest displacement from seat position permitting front wheel steering movement without interference from, or detachment of, the riders feet.

It is widely established that typical human bodies possesses certain interrelationships regarding the proportions of various limbs, body features and elements. By way of example, the distance between the fingertips of opposing outstretched arms is approximately equal to the person's height, while interlinking both sets of fingertips places the hands at the same level as the groin. Thus, despite the natural variation in human form and size, these interrelationships may be used as a design parameter for optimising the cycle ergonomics to suit the majority of human body frames.

As discussed above, for an embodiment of the present invention utilising front wheel footrests there is a clear physical relationship between the position of the seat and the footrests. While the configuration and position of the rear wheel has some bearing on the cycle performance and compactability, it is not directly involved in the ergonomic interaction of the rider with the front wheel footrests and steering mechanism. As human stature varies greatly, it is an advantage of one embodiment of the present invention for inventive aspects of the cycle configuration/riding position to be definable with respect to proportions, ratios and angles and not solely defined by specific dimensions. As a result, cycles adapted for riders such as children, or for adults of smaller stature may simply be scaled appropriately without departing from the scope of the invention. Notwithstanding the above, it is a further advantage of one aspect of the present invention that riders of a wide range of physiques may use the same configuration without adjustment of the cycle.

Given that the maximum seat height is limited by the rider's inside leg length, it thus follows the separation of the footrests from the seat must lie within an arc of radius no greater than the rider's inside leg length. An advantageous consequence of steering the cycle front wheel and also placing the rider's feet on the front wheel is a more immediate sense of involvement in the cycle dynamics, steering and responsiveness. In conventional framed cycles, the front wheel is relatively remote from the rider's feet and turning the steering (e.g. the handlebars) about the steering axis acts about an axis displaced from the rider's centre of mass. Indeed, the steering axis of most prior art cycles is orientated with respect to the rider's seated position, such that there is little, if any intersection with the rider's torso.

In contrast, one embodiment of the present invention places the rider seated upright on the seat with their torso on an intersection with said steering axis or said secondary axis. Preferably, said intersection occurs substantially at the shoulders of the upright rider. In a further embodiment, hand controls for said steering mechanism are substantially aligned vertically with said steering axis. In a yet further embodiment, said footrests are also located vertically adjacent, or substantially aligned with, said steering axis.

A configuration providing substantial alignment about the steering axis of one or more of the rider's;
  feet on the front wheel footrests;
  knees;
  hands on the steering mechanism, and
  shoulders,
creates a highly responsive, controllable and compact cycle, where steering movements are effectively experienced 'through' or 'about' the rider's body. This placement of the rider's body adjacent, or on the steering axis enables a greater sense of immediacy and involvement for the rider to the cycle movements, and is akin to other dynamic activities or sports (e.g. snowboarding or skateboarding) where rotational movement is performed about an axis close to the rider's/user's centre of mass.

It will be appreciated that the steering axis angle is an influential parameter in the steering geometry of the cycle with a direct affect on the physical performance of the cycle steering. In conjunction with the front wheel diameter, and steering fork offset, the steering axis angle (also know as 'rake' in bicycle parlance) define the degree of 'trail' which in turn affects the balance between steering stability and responsiveness.

In one embodiment, the present invention has been found to be capable of accommodating a steering axis angle $\theta$ between 70 (+/−10) degrees measured from a planar horizontal terrain surface.

Thus, in one embodiment, the present invention provides a cycle substantially as hereinbefore described, wherein said secondary axis subtends an angle of 70 (+/−10) degrees with a planar horizontal terrain surface, said cycle preferably being configured such that a least one of said rider's feet, rider's hands and/or rider's shoulders, is/are disposed about, or substantially adjacent said steering axis in a longitudinal vertical plane. The implications of this steering angle range in combination with the requirement that the rider be able to place their feet on the front wheel footrests are significant, as it defines the seating posture and proximity of the rider to the steering axis. Prior art cycles either utilise steeper steering angles (which do not pass through, or adjacent the user's limbs/torso) or much shallower steering angles creating a 'chopper-style' front wheel assembly which is consequently located too remotely for feasible footrest placement.

Given the ergonomic requirement that the seated rider must be able to place their feet on the front wheel footrests, this constrains the longitudinal separation between the seated rider and the front wheel, and thus, the steering axis.

There is a direct relationship between the maximum seat height $Y_{max}$ and the length of the rider's inside leg length. Similarly, there is an inter-relationship between the maximum separation of the front wheel footrest and the seat—both in terms of the height Y of the seat and the horizontal separation X of the seat and the steering axis. As a reference point, the position of the seated rider may be considered as represented by a vertical line passing through the rider's pelvis and spine, or alternatively, as a vertical line at the rearward seat edge.

It has been found that for a given seat height $Y_1$, and a steering axis angle $\theta=70°$, the horizontal separation $X_1$ of the steering axis from said vertical line is equal to approximately $0.24Y_1$. Thus, it follows geometrically that the vertical height $Y_2$ to the intersection with the steering axis is given by the expression:

$$Y_2=0.24Y_1 \tan \theta + Y_1 \qquad -1)$$

It also follows that the horizontal distance $X_3$ between the intersection of the steering axis with the terrain surface and the vertical line is given by the expression:

$$X_3=\tan \theta/(0.24Y_1 \tan \theta + Y_1) \qquad -2)$$

Thus, according to one embodiment, the present invention provides a cycle with a secondary axis angle of 70°(+/−10°) and a cycle seat positioned to bear the rider's upright torso at a horizontal distance $X_1$ (+/−20%) from the intersection of said secondary axis and the terrain surface given by $X_3=\tan \theta/(0.24Y_1 \tan \theta + Y_1)$, where $Y_1$ is the vertical seat height.

In an alternative means of defining the interrelationship between the steering axis and the rider seating position, the vertical line may be taken as the rearward edge of the seat. While a rider may purposely sit further rearward of the steering axis, there are performance consequences for doing so, even if the rider were still able to reach the front wheel footrests. Sitting further away from the steering axis places increased weight on the rear wheel and commensurately lightens the force on the front wheel, which reduces the front wheel grip and cornering ability. Moreover, for a cycle constructed with the seat pivoted to the frame about a pivot axis on or adjacent the steering axis, increasing the rearward seating position increases the applied torque on the seat pivot. Appropriate strengthening may thus be required to accommodate these increased forces with a possible attendant increase in overall cycle weight. Thus, the rear of the seat can provide a suitable reference point for the position of the vertical plane adjacent the rider's back, spine and shoulders.

Considering the alternative reference point of the rear seat edge, the corresponding horizontal separation $X_2$ of the steering axis (18) from said seat edge is equal to approximately $0.28Y_1$.

Thus, according to a further embodiment, the horizontal distance $X_4$ between the intersection of the steering axis with the terrain surface and the seat rear edge is given by:

$$X_4=\tan \theta/(0.28Y_1 \tan \theta + Y_1),$$

where $\theta$ is the steering axis angle, $Y_1$ is the vertical seat height.

In recognition of the variation in rider stature, seating position and personal style, in a further embodiment, the horizontal distance $X_2$ between the intersection of the steering axis with said terrain surface and the vertical line is variable by plus or minus 20%.

Penny Farthing cycle configurations have almost entirely fallen out of mainstream use for over a century. Whilst numerous historical examples are still capable of being ridden, modern replicas are produced for novelty and entertainment purposes and not as practical conveyance means, particularly for urban transport/commuting. Despite this fall from favour, the Penny Farthing configuration of a front wheel relatively larger than the rear wheel offers many advantages for a practical urban-focused Mini-Farthing cycle when adapted in conjunction with the collapsing aspect of the present invention, including:

predetermined steering mechanisms,
external drive mechanisms and
hubless wheel constructions.

It will be appreciated this does not preclude embodiments (as described elsewhere herein) of the present invention utilising non-Mini-Farthing configurations such as a rear wheel of the same or even a larger diameter than the front wheel.

Preferably, said front wheel may have a diameter exceeding that of said rear wheel.

To collapse the cycle into a compact, portable configuration, several methods may be employed without departing from the spirit of the invention and are explored in greater detail further herein. It will be readily apparent however that the Mini-Farthing configuration offers an opportunity to specifically utilise the relative difference in size between the two wheels to facilitate compaction of the collapsed cycle.

In comparison to typical small-wheel collapsible urban commuting/transport cycles, the Min-Farthing configuration provides several potentially advantageous characteristics including;
- a reduced volume, (both erected and compacted) compared to a cycle with both wheels of equivalent diameter to the Mini-Farthing front wheel;
- enhanced rideability over small-wheel cycles as the front wheel is the dominant wheel in governing rideability, particularly in traversing obstacles and uneven surfaces;
- extra volume within the front wheel perimeter for a drive mechanism and/or storage;
- the potential to locate footrests on the front wheel.

However, as referred to above, compaction is not the only advantage of a Mini-Farthing configuration.

Preferably, the cycle may include at least one of:
- a manually operable steering mechanism configured and positioned to provide a substantially unobstructed or unencumbered region forward of the rider's legs;
- at least one hubless wheel; and/or
- at least one externally-powered drive mechanism operatively coupled to the front and/or rear wheel.

As stated above, the present invention may also advantageously utilise a mini-farthing configuration in conjunction with a hubless front wheel, externally-powered drive mechanism and/or rear-wheel drive mechanism. A hubless front wheel is particularly advantageous in combination with compacting cycles as a means of providing a storage volume into which elements of the cycle may be compacted. A hubless front wheel may, but not necessarily, be formed with a void in the wheel centre. In addition to storage possibilities, a wheel centre void allows a drive mechanism(s) and suspension componentry and the like to pass through the plane of the wheel. Moreover, the application of motive power from the drive mechanism need not be applied via a centre axle in the manner of a conventional wheel.

This freedom of location to couple the drive mechanism to the wheel is explored more fully in the subsequent section relating to an eccentric front wheel drive mechanism. Similarly, the benefits of a rim-driven hubless front wheel and the use of externally-powered drive mechanisms for the front and/or rear wheel of a mini-farthing configuration of the present inventions are more fully discussed in sections below.

The collapsible cycle of the present invention differs from prior art collapsing cycles in several regards, including the speed and simplicity of collapsing method and the magnitude of the compaction achieved. Prior art cycle compaction falls into several broad categories, as follows.
- Essentially full-size, 'conventional' pedal driven prior art cycles are collapsed by a frame hinge in which the cycle essentially folds in half, followed by telescopic compaction of the extended seat post and possibly the handlebars. Although this reduces the cycle dimensions along the original longitudinal cycle axis, the cycle is notably unavoidably larger laterally, often accompanied by awkward projections of pedals, handles bars, brake cables and the like. The cumbersome nature of such a collapsed cycle is exacerbated by the structure of conventional front and rear cycle wheels together with associated chain/pedal drive paraphernalia preventing an intimate mating of the two folded wheel assemblies.
- Alternative prior art collapsible cycles have concatenated the cycle frame about one or more hinged frame folds in a manner akin to a collapsing child stroller/buggy. Although this also reduces the original longitudinal length of the cycle, typically the height increases commensurately, leading to a redistribution of the cycle volume rather than any significant reduction.
- Telescopic frame compaction is also employed in the prior art, though this generates significant frame flex, stability and sturdiness issues. Consequently, although the volumetric reduction through compaction may be significant, the erected cycle is typically only suitable for infrequent, short distance travel on smooth flat terrain.

The volume occupied by a cycle in its erect riding configuration and collapsed configuration may be defined by a cuboid 'box' volume with planar sides touching the cycle extremities. Comparable cuboid volumes are definable for each of the major cycle components, including the wheels, steering and frame assemblies. Comparison of the changes in the positions of the planes forming the box sides quantifies not only the volume changes, but also the nature of the collapsed cycle shape.

The cycle may be defined volumetrically by mutually-orthogonal parallel-pairs of vertical and horizontal planes (when the cycle is positioned upright), demarcating opposed longitudinal, lateral and vertical boundary planes, respectively located at longitudinal, lateral and vertical extremities of both said cycle and said front wheel, rear wheel, steering mechanism, seat and frame individually.

Preferably, said cycle is configured to collapse from said erect riding configuration to said collapsed configuration by:
- repositioning the front wheel and frame into mutually closer proximity such that at least one said lateral boundary plane of the front wheel at least partially overlaps a region between said frame lateral boundary planes;
- repositioning the front wheel and frame into mutually closer proximity such that at least one said lateral boundary plane of the frame at least partially overlaps a region between said front wheel lateral boundary planes;
- repositioning the rear wheel and frame into mutually closer proximity such that at least one said lateral boundary plane of the rear wheel at least partially overlaps a region between said frame lateral boundary planes;
- repositioning both the front wheel, rear wheel and frame into mutually closer proximity such that at least one said lateral boundary plane of each of the front and rear wheels at least partially overlaps a region between said frame lateral boundary planes;
- repositioning the front wheel and frame into mutually closer proximity such that both lateral boundary planes of the front wheel overlap a region between said frame lateral boundary planes;
- repositioning the front wheel and frame into mutually closer proximity such that both lateral boundary planes of the frame overlap a region between said front wheel lateral boundary planes;

repositioning the rear wheel and frame into mutually closer proximity such that both lateral boundary planes of the rear wheel are located in a region between said frame lateral boundary planes;

repositioning the front wheel and rear wheel into mutually closer proximity such that at least one said lateral boundary plane of the rear wheel at least partially overlaps a region between said front wheel lateral boundary planes;

repositioning the front wheel and rear wheel into mutually closer proximity such that at least one said longitudinal boundary plane of the rear wheel at least partially overlaps a region between said front wheel longitudinal boundary planes;

repositioning the front wheel and rear wheel into mutually closer proximity such that both said lateral boundary planes of the rear wheel are located in a region between said front wheel lateral boundary planes;

repositioning the front wheel and rear wheel into mutually closer proximity such that both said longitudinal boundary planes of the rear wheel are located in a region between said front wheel longitudinal boundary planes;

repositioning the front wheel and rear wheel into mutually closer proximity such that at least one said lateral boundary plane of the front wheel at least partially overlaps a region between said rear wheel lateral boundary planes;

repositioning the front wheel and rear wheel into mutually closer proximity such that at least one said longitudinal boundary plane of the front wheel at least partially overlaps a region between said rear wheel longitudinal boundary planes;

repositioning the front wheel and rear wheel into mutually closer proximity such that both said lateral boundary planes of the front wheel are located in a region between said rear wheel lateral boundary planes;

repositioning the front wheel and rear wheel into mutually closer proximity such that both said longitudinal boundary planes of the front wheel are located in a region between said rear wheel longitudinal boundary planes;

repositioning the front wheel, rear wheel and frame into mutually closer proximity whilst maintaining a constant, or decreased separation between the cycle vertical boundary planes;

repositioning the front wheel, rear wheel and frame into mutually closer proximity whilst maintaining a constant, or decreased separation between the cycle longitudinal boundary planes;

repositioning the front wheel, rear wheel and frame into mutually closer proximity whilst maintaining a constant, or decreased separation between the cycle lateral boundary planes repositioning the front wheel, rear wheel and frame into mutually closer proximity whilst maintaining a constant, or decreased separation between both the longitudinal and vertical cycle boundary planes;

repositioning the front wheel and frame into mutually closer proximity such that at least a portion of the front wheel is positioned inside a recess, enclosure, opening, housing, or indentation in the frame;

repositioning the steering mechanism and frame into mutually closer proximity such that at least a portion of the steering mechanism is positioned inside a recess, enclosure, opening, housing, or indentation in the frame;

repositioning the steering member and frame into mutually closer proximity such that at least a portion of the steering member is positioned inside a recess, enclosure, opening, housing, or indentation in the frame;

repositioning the seat and frame into mutually closer proximity such that at least a portion of the seat is positioned inside a recess, enclosure, opening, housing, or indentation in the frame;

or any combination or permutation of same.

In one embodiment said cycle is configured to collapse from said erect riding configuration to said collapsed configuration by repositioning;

at least two of the front wheel, rear wheel, steering mechanism, seat and frame into mutually closer proximity such that the longitudinal, lateral and vertical cycle boundary planes define a reduced volume cuboid;

any two of the front wheel, rear wheel, steering mechanism, seat and frame into mutually closer proximity such that the longitudinal, lateral and vertical cycle boundary planes defines a reduced volume cuboid, and/or all of the front wheel, rear wheel, steering mechanism, seat and frame into mutually closer proximity such that the longitudinal, lateral and vertical cycle boundary planes define a reduced volume cuboid.

In contrast, many prior art collapsing cycles actually generate a larger total cuboid volume when collapsed from their erect riding configuration, largely due to the lack of mutually interlocking components. Even designs optimised specifically for at least some of the major cycle frame components to co-operatively mate, the total volume of the cycle is not reduced, particularly if just two or three components are repositioned into their collapsed configuration.

It will be noted that the respective descriptions of the boundary planes (vertical, longitudinal, and lateral) is denoted with respect to their spatial position relative to the cycle, not to the orientation of the planes themselves, i.e. the boundary planes are vertically, longitudinal, and laterally spaced about the cycle respectively.

In one embodiment, said steering mechanism includes a stem configured with two distal ends, said stem being attached to said steering member at one distal end and attached to a pair of handlebars at the other distal end. According to one aspect, the stem is orientated rearwards from the steering member.

Preferably, the stem and/or the handlebars may be pivotally repositioned into mutually closer proximity with the frame and/or front wheel whilst maintaining a constant or decreased separation between the cycle lateral boundary planes.

Preferably, the stem and/or the handlebars may be pivotally repositioned into mutually closer proximity with the frame and/or front wheel whilst maintaining a constant or decreased separation between the cycle longitudinal boundary planes.

Preferably, said pair of handlebars is formed as twin bars, laterally disposed symmetrically either side of said stem, each bar being capable of being repositioned into closer mutual proximity with the frame by insertion into a corresponding mating recess in said frame.

The present invention thus provides a wide variety of options in which to collapse the cycle according to the particular requirements of the cycle features and/or frame/wheel geometry. Similarly, defining the position of the boundary planes for the cycle and its various components may be adapted to suit the nature of the interaction between the components in the collapsing process.

As an example, while the rear wheel may be only partially inserted into a recess in the front wheel, a tire fitted to the rear wheel may be identified as being fully inserted between the lateral front wheel boundary planes, by defining the rear wheel lateral boundary planes at the edges of the lateral tire perimeter, rather than the rear wheel structure.

The rotating terrain-engaging annular tire fitted to each wheel is by its intrinsic nature a common feature of each cycle wheel. A tire need not be rubber, pneumatic, or even flexible. In some embodiments, the tire may be formed from a rigid, inelastic or semi-inelastic material, and/or configured without any voids, gas-pockets, aerations or the like. Similarly, the road-engaging tire may be formed as a discreet item removable from the wheel rim portion, or alternatively it may be an integral, inseparable and continuous portion of the wheel. Regardless of the specific properties and construction of the tire, it is required to present a uniform rotating profile. Consequently, it is expedient to use the position of the tire boundary planes as an effective comparison aid with prior art cycles to illustrate the salient differences in the collapsing process with the present invention Preferably, the frame is configured with one or more recesses or apertures capable of accepting the at least partial insertion of the front wheel, rear wheel, steering mechanism, and/or the seat.

In order to achieve meaningful compaction of a cycle, the frame and components (i.e. wheels, steering mechanism and seat) must somehow be inserted into one another or the effective volume of the cycle will remain unchanged, even if the cycle shape is re-configured. Components may be inserted inside one another by two main methods, either telescopic contraction or via a hinged/pivoting arrangement whereby the hinged parts are configured with mating surfaces capable of some form of mutual co-operation. Collapsible cycles are naturally concerned with reducing the cycle weight to enhance portability of the collapsed cycle. Correspondingly, collapsible cycle frames are produced relatively diminutively compared to full size conventional cycles whilst the position of the seat, pedals and handlebars are maintained by relatively long tubular telescopic extensions.

In their erected riding configuration, such telescopic extensions are prone to greater flexure and inherently offer less structural integrity than hinged frames. Hinged components can form a sturdy structure when erected, whilst offering reliable, repeatable and reversible constrained paths for the components to travel between their collapsed and erected configurations. However, without appropriate recesses or apertures in the frame and/or wheels, hinged collapsing cannot yield a reduction in the total volume of the collapsed cycle. In order for one wheel to be inserted into the other, it is axiomatic that one wheel needs to have a smaller diameter than the other. This leads inevitably to either a 'chopper' style larger rear wheel/smaller front wheel arrangement or a Penny Farthing configuration, as discussed above. Nevertheless, it appears the potentially usable volume in the centre of either wheel has been largely overlooked in the sphere of collapsible cycle research and development. This inner wheel volume is particularly suited for receiving the other wheel provided it is of smaller diameter and the larger wheel is preferably hubless.

Preferably, said repositioning includes, but is not limited to, pivoting, hinging, detachment and reattachment, telescopic mechanisms, apparatus, attachments, fittings and manipulations.

Preferably, said front wheel and frame may be pivoted together to insert the front wheel at least partially into a recess or aperture in the frame.

Preferably, when the cycle is oriented vertically upright, said front wheel repositioning is performed by pivoting the front wheel substantially in the vertical plane about a transversely orientated first fold axis.

Preferably, said rear wheel repositioning is performed by pivoting the rear wheel substantially in the horizontal plane about a second fold axis, orthogonal to said first fold axis. In an alternative embodiment, said rear wheel repositioning is performed by a combination of pivoting and linear translation of the rear wheel substantially in the vertical plane about a second fold axis.

It will be appreciated the converse situation with a front wheel of smaller diameter being folded into an aperture or recess in the rear wheel may be achieved in a corresponding manner. In all cases of one of the wheels being inserted into the other during collapsing, some degree of lateral movement as well as longitudinal movement of the smaller wheel is required to move it out of, and then back into, the same plane as the larger wheel, in order to move around the wheel perimeter surrounding the larger wheel's aperture/recess.

According to one embodiment, the rear wheel is releasably pivotable about a hinge located on the frame and having a second fold axis orientated in the vertical plane when the cycle is in its upright configuration.

In one embodiment, the steering mechanism and seat are both pivotable about a third fold axis. Alternatively, the steering mechanism and seat are separately pivotable about separate fold axes. Preferably, the third fold axis is located on, or substantially adjacent to, and orthogonal to, the secondary axis, i.e. the steering axis.

Preferably, the front wheel is releasably constrained from rotation about said secondary axis (or steering axis) by pivoting the steering mechanism and/or front wheel into a mating steering mechanism retaining recess and front wheel retaining recess respectively in the frame. The stability of the cycle is impaired during the collapsing process if the front wheel and steering member is allowed to rotate freely about the steering axis. Inserting at least a portion of the steering mechanism, front wheel and/or the steering member into the corresponding mating recesses on the frame effectively locks the front wheel from such unwanted rotating, stabilising the cycle during collapsing.

Optionally, the cycle may include a latch to releasably secure the steering mechanism and/or front wheel in said steering mechanism retaining recess and front wheel retaining recess respectively. Pivoting the seat and the steering mechanism enables the use of a single securing latch.

Preferably, said collapsing from an erect riding configuration to a collapsed configuration is releasably securable by three latches.

Preferably, the steering mechanism retaining recess and front wheel retaining recess are respectively configured as a longitudinally-elongated, part-arcuate slot in an underside of the frame and a longitudinal slot in an upper portion of the frame.

Although it has already been illustrated that the present invention may be configured to collapse in a wide variety of configurations, as expanded on herein, certain methods and sequences provide increased ease, speed, and/or simplicity of collapsing.

One example, of collapsing a cycle substantially as hereinbefore described from an erect riding configuration to a collapsed configuration, comprises four steps to reduce the separation between the lateral, longitudinal and vertical cycle boundary planes.

Preferably said four steps include pivoting the steering mechanism, front wheel, rear wheel and seat into mutually closer proximity to the frame.

Disadvantages in prior art collapsing cycles include:
requiring numerous steps (more than four) to reduce the volume of the cycle in all of the three mutually orthogonal boundary directions, and
requiring a combination of pivoting and telescopic actions to collapse the cycle components.

Preferably, the method of collapsing a cycle substantially as hereinbefore described from an erect riding configuration to a collapsed configuration, includes the sequence:
1. pivoting the front wheel and frame into mutually closer proximity about a first fold axis such that at least one said lateral boundary plane of the front wheel at least partially overlaps a region between said frame lateral boundary planes;
2. pivoting the steering mechanism and frame into mutually closer proximity about a third fold axis such that at least a portion of the steering mechanism is positioned inside a recess, enclosure, opening, housing, or indentation in the frame, thereby preventing the steering mechanism and the attached steering member from rotation about said secondary axis relative to the frame;
3. pivoting the rear wheel and frame into mutually closer proximity about a second fold axis such that at least one said lateral boundary plane of the rear wheel at least partially overlaps a region between said frame lateral boundary planes;

According to an alternative example, the method of collapsing a cycle substantially as hereinbefore described from an erect riding configuration to a collapsed configuration, includes the sequence:
1. pivoting the steering mechanism and frame into mutually closer proximity about a third fold axis such that at least a portion of the steering mechanism is positioned inside a recess, enclosure, opening, housing, or indentation in the frame, thereby preventing the steering mechanism and the attached steering member from rotation about said secondary axis relative to the frame;
2. pivoting the front wheel and frame into mutually closer proximity about a first fold axis such that at least one said lateral boundary plane of the front wheel at least partially overlaps a region between said frame lateral boundary planes;
3. pivoting the rear wheel and frame into mutually closer proximity about a second fold axis such that at least one said lateral boundary plane of the rear wheel at least partially overlaps a region between said frame lateral boundary planes.

It will be seen that the cycle may be configured to secure the front wheel from rotation about the steering axis during collapsing by either first pivoting the steering mechanism into a frame recess, or first pivoting the front wheel into a frame recess.

Preferably, said method also includes a fourth step of pivoting steering mechanism handlebars about a fourth fold axis into mutually closer proximity with the frame.

Preferably, said handlebars are pivoted into mating handlebar recesses in said frame and/or said rear wheel. In one embodiment, the handlebars are releasably retained in said handlebar recesses by magnets. Preferably, the handlebar recesses are configured such that the rear wheel is prevented from release from the collapsed position while the handlebars are positioned in the frame handlebar recesses.

Preferably, at least one of the aforementioned methods of collapsing further includes the step of:
repositioning one or more footrests and the frame into mutually closer proximity, said step being performable at any point in a said method.

Preferably, said footrest repositioning is performed by pivoting. Preferably, pivoting one of a pair of footrests simultaneously pivots the other footrest.

It will be appreciated that the footrests may be individually deployed in their riding position extended substantially perpendicular to the plane of the front wheel, or folded upright, substantially flush with the front wheel surface. The footrests may also be pivotally geared together such that they both raise and lower simultaneously by moving either footrest.

In a yet further embodiment, a said method may include the step of pivoting the seat and frame into mutually closer proximity about a third fold axis such that at least a portion of the seat is positioned inside a recess, enclosure, opening, housing, or indentation in the frame, thereby preventing the steering mechanism and the attached steering member from rotation about said secondary axis relative to the frame.

The present invention may thus be readily configured to collapse from an erect riding configuration to a collapsed configuration, solely by use of pivots or hinges without any telescopic or sliding inter-movement of the various cycle components.

As referred to above, the appropriate positioning for the boundary planes for the various cycle components may be defined according to the nature of the components and their interrelations with the other components. As an example, the previously given definitions for the front and rear wheels encompass several assemblies, sub-components and the like. It may, for example, facilitate identification of the volumetric reduction and positional movement of the wheels during collapsing to place the longitudinal boundary planes of each wheel at the lateral edges of the rotating tire. This readily illustrates the manner in which the present invention is capable of at least partially placing one wheel inside another, and/or a wheel inside the frame.

Thus, according to one embodiment, said longitudinal, vertical and lateral boundary planes respectively define the lateral vertical and longitudinal extremities of a terrain-engaging annular tire incorporated in each of said front and rear wheels.

Preferably, the cycle is collapsible to a compacted transport configuration wherein said front wheel steering member is releasably hinged to allow the front wheel to pivot towards the frame. In a preferred embodiment, said frame is substantially arcuate, configured and dimensioned to mate with at least a portion of the front wheel. Preferably, the frame is substantially U-shaped in cross-section capable of accepting the insertion of at least a portion of the front wheel perimeter and, optionally, the drive mechanism, In one embodiment, the cycle is collapsible to a compacted transport configuration wherein the rear portion of the frame is releasably hinged to allow the rear wheel to pivot towards the front wheel and/or the frame. Preferably, the rear wheel is dimensioned to allow the pivoted rear wheel to be positioned inside or adjacent the centre of the front wheel. In an alternative embodiment, the rear wheel is detachable, capable of being removed from the frame and fitted inside the front wheel. As the rear wheel need not be encumbered with a conventional chain drive and associated fittings, either of the above-described means of collapsing the cycle by moving the rear wheel is readily performed.

Steering is self-evidently a critical parameter of cycle performance and has been the subject of great consideration for more than a century. The specific steering geometry and associated frame configuration of the present invention is explored further later. In broad terms however, cycle steering may be subdivided into the following broad categories;
above seat—direct;
above seat—indirect;
below seat—direct, and
below seat—indirect.

Self-descriptively, the above category descriptions respectively relate to:
- the position of the steering mechanism (e.g. handlebars) with respect to the vertical position of the rider's seat (i.e. above or below the seat) and
- whether the rider's steering inputs are made directly or indirectly (e.g. via linkages, gears, pulleys etc) to any element, structure or the like (e.g. handlebars, levers, wheel, or the like) to pivot the steering member attached to the front wheel.

In different embodiments of the present invention, each of these steering categories may be utilised. The first two categories (above seat) mirror a conventional cycle steering mechanism (in the former case) and a more complicated variant in the latter.

Utilising above-seat, direct steering provides the well established benefits of simplicity, reliability and ease of use. Most riders are conversant with above-seat direct steering such handlebars attached to the front wheel fork and are able to readily transfer their skills to other such steering mechanisms. However, disadvantages include the presence of a rigid, entangling, potentially injurious obstacle to the rider in the event of a collision, or rapid deceleration sufficient to project the rider forwards into the handlebars. Collisions or dismounting where the rider is thrown over, or into, the handlebars invariably result in injury. A primary cause of such injuries is the inability of the rider to move their legs free of the handlebars as they pitch forwards. Entanglement with the handlebars is exacerbated by the presence of the associated gear, brake levers, cables, lights, bells and the like.

Utilising above-seat, indirect steering is a largely unattractive alternative unless the cycle frame configuration specifically prevents the rider effectively operating handlebars positioned at or adjacent the steering axis. Indirect steering involves some form of translating steering inputs from the rider applied to handlebars, levers or the like adjacent the rider to the pivotable steering member. Due to their typically elongate configuration, such steering mechanisms are often employed in recumbent cycles. As previously illustrated, several characteristics of the present invention enhance its efficacy for urban usage, particularly as a collapsible cycle. However, such characteristics are largely unsuited for recumbent cycles. The need for small, compactable frames, enclosed drive mechanisms, highly visibly riding position and agile manoeuvrability are not hallmarks of recumbent cycles. Conversely, a low reclined aerodynamic seating position, high speed capacity and long distance suitability are either unimportant or even dangerous for urban usage. Consequently, above seat, indirect steering mechanisms are not a primary choice for collapsing, urban-focused cycles.

Utilising below-seat steering, both directly and indirectly, offers significant opportunities for an urban-focused cycle design, particularly a commuting, collapsing cycle. Urban riding does not involve high speeds nor consequentially the need for a low, crouched body position to minimise aerodynamic drag. A long wheelbase, large front and rear wheels, and a semi crouched riding position with a portion of the rider's weight borne by the arms are all counterproductive to configuring a compactable, manoeuvrable urban cycle, providing high rider visibility and awareness.

In the event of a rapid deceleration sufficient to propel the rider forward from the seat, whether from rider braking and/or accident, it is highly advantageous for the rider to be able to dismount easily without entanglement with the steering mechanism. This requires a fundamentally different steering configuration to existing upright, non-recumbent cycles. Moving the steering mechanism out of the forward path of the rider requires the steering mechanism, and preferably any other potential obstacles to be positioned behind the rider's torso and legs. This clearly has implications for the drive mechanisms and frame design as well as the steering mechanism.

Regarding the steering mechanism, desirable criteria for a cycle configuration conducive to unobstructed forward dismounting, include:
- any manually operated steering mechanisms being located
  - below the rider's seat and/or
  - rearward of the rider's back and/or
  - below the rider's thighs and rearward of the rider's calves/lower leg, and/or
  - laterally outside the width of the rider's torso
- any foot operated steering mechanism being
  - easily detachable from the feet and
  - positioned below and/or rearward of the feet/lower legs.

Placing the steering mechanism laterally outside the width of the rider would create an unwieldy structure of significantly greater width than typical cycles, with consequence for road safety and manoeuvrability. Thus, although there is no insurmountable engineering obstacle to such a configuration, it is not as attractive as the alternatives described herein. Locating the steering mechanism behind the rider also has ergonomic complications for the user to easily reach and control the steering mechanism through the full range of steering movement. Although foot operated steering is a viable method of direction control for the present invention, either unassisted or in combination with manual steering, it is primarily suited to non-mainstream urban usage. The possibilities and drawbacks of foot operated steering are explored in more detail in previous discussions above.

Therefore, for a primarily urban usage cycle, locating the steering mechanism behind the rider's shins and below the rider's thighs offers the greatest synergy of ergonomic, functional and configurational advantages.

Thus, preferably said steering mechanism is configured and positioned to provide a substantially unobstructed or unencumbered region forward of the rider's legs and/or rider.

According to one embodiment, said steering mechanism is positioned below and/or rearward of said seat Preferably, said steering mechanism includes a pair of handlebars, positioned below and/or rearward of said seat. Preferably, said handlebars are centrally mounted to said frame for rotation about a quaternary axis.

In one embodiment, said quaternary axis is co-axial to the secondary axis (or steering axis). Preferably, said handlebars are displaced from the secondary axis by a stem. The stem may be configured in any desired form, e.g. a unitary beam, tube, bar, housing, rod, element, frame or the like and has the effect of moving the position of the handlebars closer to the rider than the secondary axis for an ergonomically more effective steering input.

Locating the handlebars beneath the seat places them in a very natural position for operation by the rider's relaxed arms in an unstressed position either side of the torso. In combination with placement of the rider's legs on front wheel footrests, this places the steering mechanism below and behind the rider's entire body. Consequently, in the event of an urgent need to dismount, the rider may simply release the steering mechanism and dismount forwards or even laterally without becoming entangled with any part of the cycle, including the steering mechanism. Moreover, the upright riding position and high visibility and awareness afforded by the present invention places the rider in an excellent body disposition for rapid dismounting and transition to movement on foot.

In order to place the handlebars (or equivalent) at the ideal position for access by the rider, a stem extending from the secondary axis to the handlebars provides a simple, reliable configuration to transfer the rotational movement of the rider to the steering member/front wheel. As previously stipulated, in one embodiment, the steering mechanism stem is configured with two distal ends, said stem being attached to said steering member at one distal end and attached to a pair of handlebars at the other distal end. As the stem provides a direct connection to the steering member, there is no need to change the direction of handlebar rotation to correspond with the desired front wheel rotation. However, to generate the necessary degree of rotation of the front wheel, the arc circumscribed by the handlebars at the distal end of the stem to the steering axis may be an uncomfortable reach for some riders. Consequently, adding a bar end handgrip or tip to the outer end of each of handlebar orientated to pass around the outside of the riders thighs and/or buttocks places the bar end handgrip in closer proximity to the rider's body throughout the range of steering movement. According to one aspect therefore, said handlebars include an outer end portion orientated to extend around the rider's thighs. In one embodiment, said handlebar outer end portion is oriented substantially horizontally, parallel to said stem.

It will be understood the shape of each of the handlebars with bar end outer end portions may range from continuously curved bars, to two substantially orthogonal sections. In a complimentary manner to conventional cycles, the ends of the handlebars provide a convenient position to place any cycle controls, such as brakes, throttle (for externally-powered embodiments) lights and so forth.

In an alternative embodiment, said quaternary axis is displaced from said steering angle. In such embodiments, the steering mechanism further includes a transfer coupling to transfer rotational movement of the steering mechanism to generate corresponding rotational movements of the steering member and front wheel about the secondary axis in the same direction as the steering mechanism.

The transfer coupling may also be formed from numerous mechanisms including one or more tie-rods, pulleys, gears, universal joints (e.g. a pair of Hooke or Chobham universal joints) or the like. The transfer coupling may, according to one aspect, be at least partially enclosed by a portion of said frame. In one embodiment, said transfer coupling is configured to provide a mechanical advantage, whereby a given rotational movement of the steering mechanism produces a reduced rotational movement of the steering member.

The steering mechanism may be configured from any convenient mechanism in addition to handlebars, including levers, pulleys, wheels or the like. It will be appreciated however, that the steering mechanism need not necessarily operate in a fixed substantially horizontal plane as per conventional handlebars, nor be symmetrically attached to the frame. By way of example, a steering mechanism formed from cables and pulleys attached to manually operated handles may be moved through a range of complimentary motions (primarily of the riders' forearms) akin to dumbbell raises. In yet further embodiments the steering mechanism may be operable by a single hand. This may take the form of a joystick type control positioned between the rider's legs or alternatively positioned on one side of the user. Such embodiments may permit the rider's free hand/arm to be used in a variety of sporting or other activities, e.g. mail delivery.

The present invention enables numerous different frame configurations and constructions to be employed without departing from the scope of the present invention. The compact wheelbase, novel seating/steering arrangement and mini-farthing wheel arrangement embodiments generate different frame requirements and constrictions to a conventional cycle.

In one embodiment, the frame is substantially arcuate with a central section shaped with a recess corresponding to the outer perimeter of the front wheel. Preferably, the frame also incorporates recesses capable of accepting insertion of the steering member, steering mechanism and/or the rear wheel. As the front wheel is the largest single component, it will be recognised that efficiency of compaction during collapsing depends on the interaction between the frame and other components and the front wheel. An arcuate-shaped frame thus offers an essentially mirrored profile shape to the outer portion of the front wheel to aid co-operative mating.

However, alternative frame shapes and constructions are possible including an essentially tubular framework construction or laterally asymmetric frame where the front and/or rear wheel is pivoted alongside rather than inserted inside the frame.

Further alternatives include frames with linear, beam and/or extrusion shaped frame section profiles.

As identified earlier, the drive mechanisms may be divided into two categories, 'user-powered' i.e. mechanisms powered by the human user/rider (such as pedal cranks) or mechanisms with a power source independent or 'externally-powered' i.e. external to the user/rider such as electric motors, engines or the like.

Moreover, the term "footrests" include any fitting configured to permit a user to place their feet during riding and includes movable (e.g. pedal cranks), cages, foldable and fixed rests.

As also identified previously, the drive mechanism may take numerous forms including an electric motor, generator, pedal crank, pedal crank and geared chain drive, internal or external combustion engine and/or any combination of same.

Considering 'externally powered' drive mechanisms such as electric motors, several alternatives have been explored in prior art cycles though commercial success has been muted in comparison to the volume of user-powered conventional pedal cycles. The reason for such a marketplace reaction is influenced by a combination of factors not directly associated to the drive mechanism. Primarily, to have an effective external drive requires adequate riding performance, which in turn requires a sufficiently powerful drive with worthwhile endurance. Moreover, when focused on urban usage, as discussed at length above, this is inter-related to the effectiveness of collapsing the cycle. Cycle performance and the portability (and thus viability) of the collapsed cycle are both directly influenced by the cycle weight. As the disadvantages in prior art folding cycle design invariably lead to heavier collapsible cycles offering comparable functionality and performance to non-collapsible cycles, the issue of external drives (such as electric motors) has focused on supplementary motive assistance.

However, the innate benefits of compactness, lightness and performance achieved by the present invention enable embodiments of the cycle to be entirely powered by an electric drive with a battery power source. In particular, the packaging advantages of a hubless front wheel combined with a collapsible mini-farthing wheel configuration enable a significantly smaller frame to be utilised, which may be specifically configured to mate with the collapsed wheel-in-wheel configuration. Utilising the available volume inside the perimeter of one of the wheels (preferably the front wheel) is most effectively achieved with a hubless wheel. If the other smaller wheel (e.g. the rear wheel) is made as small as pragmatically possible, the necessary volume available for the drive mechanism is most easily found in the volume of the larger wheel. This also obviates the need for drive linkages between folding/pivoting components. Consequently, it would be advantageous to drive the rotatable rim portion of the larger wheel by a drive mechanism located in the same wheel. This applies to both external and internal powered drive mechanisms. The available inner volume of the larger hubless wheel also enables other fittings and mechanisms from the drive mechanism, such as batteries, pedal mountings, chains, gears and the like to be enclosed by an appropriate covering. This not only provides a smooth outer surface and protection from dirt and moisture ingress, but also prevents unwanted interference with the rider or their clothing.

Preferably, the front wheel is a hubless front wheel with a rotatable outer rim portion and the drive mechanism is operatively coupled to the front wheel to the outer rim portion to effect front wheel rotation.

Such a rim drive configuration is advantageous to both external drive mechanisms, such as electric drives, and to self powered drives such as pedal crank mechanisms.

Preferably, said drive mechanism is operatively connected to the front wheel for rotation about a tertiary axis, parallel to said primary axis.

Preferably, said tertiary axis is positioned within the first wheel eccentrically from said primary axis Preferably, said tertiary axis is located between the primary axis and a rearward portion of the front wheel.

In one embodiment, the drive mechanism is coupled to the outer rim portion via one or more gears, belt drives, chain drives or the like.

The above cycle thus provides numerous advantages over comparable prior art cycles. Front wheel drive of the cycle enables a conventional external rear-wheel chain drive to be omitted whilst also simplifying the dimensional, structural and geometric requirements for the frame. However, driving the front wheel directly by placement of the drive mechanism at the primary axis places constraints on the maximum practical wheel size, seating position and manoeuvrability. The eccentric placement of the drive mechanism addresses these shortcomings and enables an optimised front wheel size to be employed without compromising the most ergonomically efficient placement and size of the footrests and/or pedal crank with respect to the ground and the rider.

It will be appreciated several alternative drive configurations are possible. In one embodiment, a single external drive mechanism applies motive power to both the front and rear wheels. Alternatively, separate external drive mechanisms individually drive both the front and rear wheel. These embodiments both give all-wheel drive to the cycle, thereby potentially spreading the motive power between both wheels reducing the likelihood of wheelspin and improving traction. In the latter embodiment, it also offers a degree of redundancy should one drive become inoperative. In a yet further embodiment, solely the rear wheel may be powered by an external drive.

As identified previously, a salient difference between the main 'user-powered' drive mechanism, i.e. a pedal crank, and the 'externally-powered' drive mechanisms is the requirements for the rider's foot placement. Pedalling a pedal crank naturally requires the rider's feet be located on movable pedals, whilst 'externally-powered' mechanisms enable the rider's feet to be placed on some form of static footrests. Due to ergonomic considerations, the position of such footrests may substantially coincide with the desirable position of a pedal crank. Again, although not reiterated in each instance, for the sake of readability it should be understood that references to the position of footrests and pedal cranks are to be interpreted as being interchangeable except where explicitly stated to the contrary.

Considering the specific case of pedal powered drive mechanisms for a front wheel drive cycle, the optimum wheel size of a collapsible urban cycle is dependent on several factors. Superior riding performance is usually compromised by small diameter wheels, particularly over rough road surfaces. However, in urban environments, while the road surface may be of variable quality with potholes, grids and other hazards, it is generally of a high standard in comparison to off-road surfaces. Thus, an urban-specific pedal-powered cycle may utilise smaller wheel sizes than an all-purpose collapsible cycle. A practical constraint on minimum wheel size for urban use is that the wheel is sufficiently large to mount/dismount a curb without unseating the rider. However, for pedal crank drive mechanisms it is not possible to utilise the minimum practical diameter on wheels driven directly by a centre-mounted pedal crank. The crank length required for efficient pedalling by an adult human defines a minimum practical wheel size below which the pedals may contact the ground, particularly during cornering.

Conversely, if a cycle embodiment with a large wheel diameter is desired, a centre pedal crank again causes constraints on the maximum size possible without preventing the rider from efficiently operating the pedals and/or reaching the ground at rest.

The use of an eccentric drive mechanism position in the present invention dispenses with both these limitations and permits the optimum wheel diameter to be selected for both externally-powered and user-powered drive mechanisms. Locating the pedal crank in an upper quadrant of the wheel enables a reduced wheel diameter to be employed while placement in a lower quadrant enables the use of larger wheel diameters without compromising pedalling efficiency.

Although a drive mechanism may be coupled to rotate the front wheel via a mechanism acting on the primary axis, this clutters the central volume of the wheel span which may otherwise be used to maximise the compaction of the collapsed cycle. Thus, the drive mechanism preferably couples the pedal crank to the wheel rim enabling the drive mechanism to be readily enclosed in a housing free of projections or the like that may ensnare a rider or rider's clothing, particularly in a collapsed configuration. To aid compaction, in one embodiment the pedal crank/footrests are configured to be removable and/or pivotable to be orientated substantially flush with the drive mechanism housing.

The drive mechanism may include one or more user-selectable gears or simply be configured with a single gear ratio. Given the cycle is primarily intended for urban usage, a single gear ratio does not necessarily pose the same impediment it would pose for a racing or mountain bike. It also offers a lighter and simplified drive mechanism capable of being enclosed in a small housing.

In one embodiment, the drive mechanism, such as a pedal crank attached to a crank gear, is rotatably engaged via an intermediate gear to a drive gear to drive said rotatable outer rim. The outer rim and drive gear may both be configured with a toothed engagement interface, or a smooth frictional contact. An intermediate gear is required to ensure the direction of crank pedal rotation matches that of the front wheel though it will be appreciated that an extremely simplified configuration is possible by driving the rim portion directly from the gear crank if a satisfactory gear ratio can be achieved.

To further ensure the collapsed cycle presents a sleek, sealed cycle free from exposed chains, gears and the like, the outer rim portion (and associated drive mechanism) may be enclosed in a common housing extending about the front wheel as an annular ring. Preferably, the steering member is attached to said housing. It will be apparent to one skilled in the art that the steering member attachment to the front wheel may be a fork configuration with the arms of the fork passing either side of the wheel, or alternatively an asymmetrical attachment on a single side of the front wheel. Lubrication oil, entrapped dirt and the like typically associated with exposed external chain drives are thus shielded from the rider, enabling the collapsed cycle to be carried on a rider's back without risk of soiling.

Preferably, the outer rim portion includes, or is attached to a ground engaging tire portion, typically in the form of a pneumatic tire.

As discussed above, front wheel drive pedal cycles with the pedal crank passing through the primary axis suffer from the effects of torque steer, particularly when starting from rest. Displacing the crank pedal rearward from the primary axis provides several key benefits, including increased stability (aided by an increased wheelbase) and reduced torque steer. Ergonomic constraints on a front wheel pedal drive cycle with the pedal crank through the primary axis requires the rider to be positioned substantially over the top of the front wheel. Although this provides good visibility from the very upright riding position, it increases the sense of (and actual) instability of the cycle, akin to that of a unicycle. The rearward displacement of the pedal crank from the primary axis in the present invention enables a rider seating position also to be moved rearwards, thus providing greater stability whilst retaining the desirable high visibility characteristics and truncated frame.

It will also be appreciated that several variants of the above embodiments are possible without departing from the spirit of the present invention. The cycle may, for example further include a combination of user-powered and external drive mechanisms. Typically, the use of an additional drive mechanism is as a supplementary drive mechanism, e.g. an externally powered mechanism supplementing a primarily pedal-powered cycle or vice versa. A supplementary external drive mechanism may power a front or rear wheel and may be selected from any convenient known powered drive mechanisms including electric drives (battery and fuel cell powered), internal combustion engines and so forth. Such a supplementary drive may assist the rider in steep ascents and optionally be configured to provide retardation and/or electro-motive power generation during descents and/or braking.

Preferably, said supplementary powered drive is located within said drive mechanism housing.

Despite the stability enhancement from the eccentric crank pedal positioning, a substantially upright riding position on a compact frame still creates the risk of pitching the rider forward during vigorous application of a front brake. The placement of conventional handlebars in front of the rider presents a hazard in the event the rider is pitched forward. In contrast, some embodiments of the present invention overcome such difficulties by placement of the handlebars under and/or behind the rider. Thus, the rider may easily dismount the cycle over the front portion of the cycle free from any encumbrance. Such dismounts may occur during emergency braking or even deliberately at much slower speeds. Such deceleration techniques are already commonplace for skateboard and scooter riders.

The cycle may thus be optionally fitted with a front and/or rear brake. An embodiment without brakes is possible given an urban application where the cycle is used at speeds no greater than human running speeds and dismounting used as a means of speed control. It will be appreciated however that conventional cycle brakes on the rear and/or front wheel adds to the practicality of the cycle, at the expense of some mass and complication.

By way of further example, the present invention may include embodiments with alternative configurations of the:
Frame and seat;
Securing Latches;
Wheels;
Handlebars;
Batteries, and
Miscellaneous cycle features
as described herein.

As described previously, the present invention may be transformed from its erected configuration to its collapsed state by releasing a number of latches. It is clearly desirable to use the least number of latches necessary to avoid delays in erecting and collapsing the cycle and to avoid user irritation.

In one embodiment, one of the folding stages of the present invention results in two or more of the interlocking components being collapsed/erected together with a single latch to secure the collapsed/erected components together. Alternatively, each folding stage may be provided with its own securing latch, providing enhanced stability and security, albeit at the expense of added complexity and reduced collapsing speed. In one embodiment, two or more latches may be substantially identical. Preferably, at least the front wheel, steering mechanism and seat latch are substantially identical.

Preferably, the latches are operable with one hand, preferably by a single digit. Such latch configuration may include an over-centre lever pivot latch. Optionally, the lever may be extendable/telescopic to increase the torque of the lever during use, while minimising the size when not in use. A compact latch/latch lever aids in the ability to mount the latch in an unobtrusive position, and/or to be recessed into a portion of the cycle.

Thus, according to a further embodiment, the cycle includes one of more latches with extendable lever portions. Preferably, said latch is at least partially recessed into at least one other cycle component. In one embodiment, said latch is positioned in a recess and includes:
  at least one release element movable between a locked and
    a released position;
  at least one fixed engagement fitting;
  a recess enclosure;
wherein portions of said recess are provided with a first surface pattern and/or colour and adjacent portions of the latch recess and surrounding surface are provided with a second surface pattern and/or colour, such that in said locked position, the release element obscures said first surface pattern, whilst when the release lever is moved to said released position, said first surface pattern is visible.

Consequently, the present invention provides a readily implemented visual mean to indicate to the user whether the cycle is safely secured in a locked or a released state. The first surface pattern/colour may simply be red, whilst the adjacent second pattern/colour may be green so that the user is easily alerted by the sight of any visible red surface as a warning signal that the latch is not securely locked.

To ensure a secure latching action and a degree of resilience to prevent 'rattling' and the need for excessive opening/closing force, a resilient material such as an elastomer or rubber may included in the construction of the fixed engagement fitting.

Instead of separately disengaging each switch/latch to collapse or erect the cycle; the latches may incorporate electro-mechanical control whereby all the latches may be operated in the required sequence to automatically collapse or erect the cycle. When fully collapsed, the electrical drive may be automatically disconnected as a further precautionary feature.

The frame design may be further adapted to incorporate features such as a suspension. A suspensions unit, such as a shock absorber and/or damper unit may be fitted at several positions about the cycle frame to accommodate relative movement between the frame and at least one of the front wheel, back wheel and/or seat. A vast range of such suspension units are available, with performance characteristics that may be tailored to the desired dynamics of the cycle activities. Embodiments of the present invention, primarily intended for urban commuting for example, would not require the incorporation of suspension units designed for mountain bikes usage which may need to accommodating a large degree of travel, rebound force and the like. Many suspension units are user adjustable for such parameters, and could enable the present invention to be adapted for use on roads of differing quality.

Developments in mountain bike suspensions, trail bikes, off-road vehicles and the like has seen the shock absorber/damper units located at numerous positions whereby the vertical travel of the relevant wheel is connected to the unit via linkages and couplings. Similarly, such known adaptations may be utilised in the present invention and as such are not discussed in more detail herein. In a further embodiment, the rear wheel assembly and rear frame portion may be pivotally attached to the main frame portion. Such a configuration permits the pivot point to function as the articulation means for suspension travel and also the means of collapsing the rear wheel towards the frame.

However, in contrast to such prior art techniques, the present invention also allows the seat itself to become a suspended component. As the seat may be attached to the frame at a single end in a cantilever configuration, it may be appreciated that the cantilever attachment may be pivotally attached to the frame and resiliently sprung and/or damped. This resilience may be performed by a suspension unit mounted on the frame or under the seat. The suspension may utilise any convenient medium, e.g. air, hydraulics, spring, etc.

The seat may alternatively be configured with a linear freedom of travel, with a substantially vertical component which may in turn be coupled to a suspension unit. This linear sliding movement may also be used as a means of adjusting the seat height in a manner akin to a conventional cycle. Furthermore, the seat may be completely replaceable to allow riders of different stature to use their own seat optimised for their build.

The above described embodiment of the present invention incorporating a hubless wheel may be further configured to reduce the ingress of dirt and moisture through the rotating rim. An intrinsic feature of such a hubless wheel construction is the need for an annular perimeter opening about the interface between the rotating rim portion and the wheel centre portion. Consequently it is difficult to provide a totally weatherproof seal about this opening which is inevitably subjected to abrasive water-borne grit and dirt ingress.

According to one aspect, the present invention provides a rotatable outer rim portion rotating about the wheel centre supported by a plurality of bearings located about the periphery of said wheel centre, where said outer rim portion and bearings are configured to be in mutual contact between mating surfaces on an inner rim portion contact surface and an outer bearing contact face respectively, characterised in that the inner rim portion contact mating surface in transverse cross-section is substantially convex, v-shaped, anhedral or otherwise configured such that liquid and particulate are deflected outwards by rotation of the wheel. Thus, although moisture and dirt may enter through the opening, the centripetal motion generated by the rotating wheel causes the expulsion of same via the same opening. This action also preserves the mating surfaces between the rotating portion and the bearings from wear resulting from the accumulation of dirt/grit.

The rotational effects of the wheel may also be utilised to generate an airflow movement through the wheel centre to aid in cooling any electrical components located therein, such as batteries, electrical controllers and an electrical drive mechanism. The airflow may be enhanced by airflow cooling guides, including fins, slots, channels and the like to direct the airflow in the desired direction. In one embodiment, a conduit to said airflow cooling guides is provided by placing said footrests in the lowered operative position, thereby exposing at least one aperture in the wheel centre cover.

As previously described, the outer rim portion may also include a toothed inner surface to be driven by the electric drive mechanism. This configuration enables the use of a high speed, high torque electric motor, (e.g. a brushless DC motor), to drive the rim via a pinion and right angle gearbox without the need to gear down the motor. Additional volume is also liberated within the wheel by such a configuration. As an additional safety feature, a mechanical brake may be used to supplement the braking effect of regenerative braking. Optionally, the mechanical brake may be located on an external output shaft of the electric drive mechanism.

The incorporation of electronics into a cycle provides numerous capabilities unavailable to conventional cycles. Moreover, use of the steering mechanism position of the present invention whereby the handlebars are positioned behind and around the rider offers new potential for cycle safety, communication and signalling.

The handlebars substantially as hereinbefore described may be provided with brake lights and indicators on the handlebars, in addition to a conventional forward illumination light. A conventional bike is effectively prohibited for mounting rear brake lights on the handlebars as their visibility to road users behind the cycle would be severely obscured by the rider's body. To a somewhat lesser extent, indicator lights mounted on handle bars on a conventional cycle would also be limited in their visibility, particularly from behind the cycle. However, as an embodiment of the present invention is configured with the portions of the handlebars clearly visible rearward and to the sides of the user, the cycle has a significantly enhanced visual, communication and safety impact for other road users.

The rearward portion of the handlebars may contain the brake lights and operating lights, while the forward facing distal ends of the handlebars may be equipped with the necessary forward facing white lights. The lights may also contain indicator lights or alternatively, the indicators may be discreet lights, facing forward, laterally and rearwards. The ability to incorporate built-in indicators means the user may operate the signalling controls without removing a hand from steering and consequently risk a loss in control and reactions.

The intuitiveness of providing throttle and brake controls on the handlebars may be further enhanced by colouring these controls green and red respectively. It will be appreciated that the throttle and brake controls may be separated into individual controls located on opposing sides of the handlebars, or alternatively, combined into a single multifunction combination unit.

Alternative embodiments are possible in which manual manipulation of the controls is effected by different digits; thumb control for example leave the remaining fingers free to operate indicator switches and the like. A more responsive 'sporting' embodiment of the present invention may be equipped with shortened length handlebars, for more rapid response, and lower polar moments of inertia.

The present invention also provides multiple opportunities to use an additional battery supply(ies) to supplement the range/endurance of the fitted battery. This also enables one battery to be removed and charged, while the other fitted ready to provide transport without delay if needed. The additional battery supply may be stored directly on the cycle, such as under the seat, in the front wheel, in the frame, and the like. Naturally, supplementary battery supplies may also be carried in backpacks and the like.

The compactability of the cycle and its suitability to be controlled with a single hand, and for the rider to dismount without becoming embroiled in a potentially injurious crash would lend their suitability to assault infantry such as paratroopers, marines and the like.

According to one aspect, the cycle is provided with an electric motor drive mechanism that incorporates a regenerative braking system. A user may activate the braking system by reducing or cutting electrical power to the electric motor. The electric motor is then driven by the movement of the coupled cycle wheel. The motor thus functions as a generator to convert the kinetic energy of the cycle to electrical energy which can be passed to the power source to recharge. Where a high level of braking is required the electrical power may be reversed to reverse the rotation of the motor and oppose the movement of the wheel.

As the braking effect is effectively proportional to the speed of the cycle in a regenerative braking system, the braking effect may be comparatively 'smooth' and has a lower risk of skidding than a comparable friction-braking system. A regenerative braking system also has less weight, components and complexity than conventional friction-brakes which require cables, brake-pads etc.

However, in a further embodiment, the cycle may also be provided with a friction-brake capable of acting on a said wheel. The friction-brake may be manually or automatically activated and may be utilised as a redundant or backup braking system in case of failure of the main regenerative braking system or where the energy generated during braking exceeds the load-bearing capacity of the motor or batteries.

In another embodiment, the cycle may be provided with an Anti-lock Braking System (ABS) operable by repetitively activating and deactivating said regenerative braking system during braking.

In another embodiment, the cycle may be provided with an Anti Skid Braking System (ASBS) operable by repetitively activating and deactivating said regenerative braking system during braking.

The cycle may also be provided with sensors for detecting the wheel rotation speed and cycle speed and applying the ASBS on a threshold speed differential between the wheel and cycle speeds, e.g. where the wheel speed slows faster than the cycle speed to a threshold differential this may indicate the wheel is about to lock and may skid, the ASBS is then automatically activated to prevent locking.

It will be appreciated that known regenerative braking systems and controllers used in other vehicles may also be used with the cycle of the present claimed invention.

In yet another embodiment, the cycle may be provided with a controller, communicatively coupled to a terrain surface condition sensor for determining a condition of the terrain surface, the controller adjusting the braking effect and/or activating the ABS depending on a signal received from said terrain surface condition sensor indicative of a said terrain surface condition.

The terrain surface condition may include one or more of: friction co-efficient, temperature, inclination, dampness, humidity and/or surface variability (i.e. rough, smooth, undulating etc.) of the terrain surface. The controller may thus adjust the braking to suit the terrain-surface, e.g. on damp, icy or other low friction surfaces, the controller may limit acceleration or automatically activate the ABS during braking to prevent skidding. It will be appreciated that numerous known sensors may be used as the terrain surface condition sensor.

The terrain surface condition sensor may be attached to the cycle or provided as a separate device. The terrain surface condition sensor may even be provided remotely, e.g. as a weather monitor communicable with the cycle controller. The controller may be wired or wirelessly coupled to the terrain surface condition sensor.

Preferably, the cycle includes a sensored brushless electric motor drive mechanism. Brushless electric motors provide many well-known advantages over 'brushed' motors including: higher efficiency and reliability, reduced noise, longer lifetime (no brush erosion), elimination of ionizing sparks from the commutator, more power, reduced airflow cooling requirements and reduced electromagnetic interference. Brushless sensored electric motors also have a hall-effect sensor which determines the position of the rotor and therefore is useful in applications, including the aforementioned cycle, which require varying or high torque at start-up and/or where the position of the rotor needs to be known.

In yet another embodiment, the cycle may include at least two electric motor drive mechanisms, one said electric motor configured for providing 'optimised' motive power at a lower speed than the other electric motor. The cycle may therefore operate more efficiently by using low-speed and high-speed motors at low and high speeds respectively. The low-speed electric motor may be 'optimised' by configuring with a lower gear ratio and higher torque than the high-speed motor.

In one embodiment, the cycle may include a combustion engine in addition to an electric motor i.e. a hybrid drive mechanism. The combustion engine may increase the powered range of the cycle and can be used to charge the power source for the electric motor. In another embodiment, the cycle may include a drive mechanism in the form of a fuel-cell.

It will be appreciated that using an electric drive mechanism inevitably requires some form of recharging of the power source, e.g. the battery.

Thus, according to one aspect, the cycle is provided with an electrical drive mechanism coupled to a removable battery. Preferably, the electrical drive mechanism and battery are attached in the cycle front wheel. The battery is preferably detachable and removable to allow a user to quickly and easily replace the battery once drained. The front wheel is preferably provided with a housing or recess in which the battery is retained and coupled to the drive mechanism. Thus, to increase the powered range of the cycle, a user merely has to carry a spare battery(ies) and use as needed.

In one embodiment the cycle is provided with a controller for controlling the operation of the cycle drive mechanism. The controller thus preferably includes, or is coupled to an accelerator (e.g. accelerator trigger) operable by the rider. In another embodiment, the controller may be used to control a cycle braking system. The controller thus preferably includes, or is coupled to a brake control (e.g. brake trigger) operable by the rider. Preferably, the controller is wirelessly coupled to the drive mechanism, braking system and/or accelerator and/or brake control. As the accelerator and brake control are normally located on the steering mechanism, in contrast to a wired coupling, the wireless coupling negates the risk of connecting wires breaking when the cycle is collapsed.

Preferably, the controller is capable of being configured, e.g. preferably programmable, to determine the operation of the cycle drive mechanism and/or braking system. Providing such a configurable controller may allow a user to alter the acceleration, braking and speed characteristics of the cycle without requiring alteration of the physical cycle components.

In one embodiment, for example, the controller is configured to limit the maximum speed of the cycle to minimise the risk and consequences of accidents.

In another embodiment, the controller may be configured to adjust the acceleration and braking to assist a rider in performing predetermined manoeuvres, e.g. a 'stoppie' where the rear wheel is lifted off the ground and the rider and cycle weight is centred through the front wheel at the point of contact with the terrain surface. This 'stoppie' manoeuvre may also be used to perform a rapid turn by which the rider initiates a wheelie and then twists the cycle to rotate and re-orientate the cycle in the required direction. Cycles with rear wheel drive may also be configured to perform the comparable rear-wheel manoeuvre commonly known as 'wheelies', i.e. raising the front wheel clear of the ground whilst in forward motion.

In performing such manoeuvres it may be necessary for the controller to receive orientation feedback in order to adjust the acceleration and braking correctly and thus, in one embodiment, the controller is coupled to orientation sensors capable of detecting the orientation of at least part of the cycle. Known orientation sensors may be used such as gyroscopes, Micro Electrical-Mechanical System (MEMS), tilt meters, clinometers, inertial measurement units (IMU) and attitude heading reference systems (AHRS).

According to yet another aspect, the cycle may include an external environment sensor such as a proximity, light or weather sensor for detecting one or more conditions of the environment external to the cycle.

In a further embodiment, the cycle may include a visual, audible and/or tactile feedback mechanism communicably coupled to a said external environment sensor for providing feedback to the rider indicative of the environment condition(s) as indicated by a signal generated by said external environment sensor. In one embodiment, for example, the cycle may include a tactile feedback mechanism communicably coupled to a said external environment sensor, said tactile feedback mechanism providing tactile feedback, e.g. vibration, when the external environment sensor detects a predetermined external environment condition, e.g. the cycle following too closely to another cycle or vehicle.

In another embodiment, the controller may be communicably coupled to a said external environment sensor and configured to control the acceleration, speed and/or braking characteristics of the cycle according to a signal received from said external environment sensors. For example, in one embodiment the cycle may include a proximity sensor that detects when an object is within a predetermined distance in front of the cycle at a given speed, the controller reducing the speed or applying brakes to slow the cycle until the object is at said predetermined distance, i.e. the controller and external environment sensors may be used to control the cycle's following distance in traffic and provide a form of 'cruise control'.

It will be appreciated that numerous sensors and feedback mechanisms may be used together with the cycle to achieve varying functionality and the foregoing examples are provided by way of example only.

According to another aspect, the cycle includes a manually operable steering mechanism configured and positioned to provide a substantially unobstructed or unencumbered region forward of the rider's legs, wherein one or more lights are provided on the steering mechanism.

Such lights may include a brake light provided on a rearward-facing portion of the steering mechanism, turning indicator lights on lateral, rearward-facing and/or forward-facing portions, headlights provided on a forward-facing portion or any other functional or decorative lights or lighting systems. The lights may operate independently or be part of an integrated system. Preferably, the cycle includes brake lights, headlights and indicator lights.

The rider may activate the lights manually or alternatively the lights may be configured to activate automatically, e.g. where the rider activates the brake, the brake lights may be automatically turned on and where the rider turns the steering mechanism (and cycle) the indicator lights may be automatically activated. The headlights may also be automatically activated when the rider activates the accelerator and/or when the cycle is in motion.

One or more of the lights may be automatically switched off when a rider is no longer seated on the cycle as detected by a sensor.

Preferably, a rider has a series of controls, similar to motorcycles, whereby the rider can manually activate the headlights and indicator lights.

It will be appreciated that numerous lighting configurations are possible and the examples given herein should in no way seen to be limiting.

According to another aspect, the cycle may be provided with a security system for preventing unauthorised operation. The security system may take any of numerous forms including: a biometric scanner, finger-print detection pad, intrusion alarm, motion-detection alarm, detachable steering mechanism or other critical components, or any other security system.

In one embodiment, the security system may involve a detachable portion that includes an electronically readable security code, readable to determine a match with the corresponding cycle. The cycle may include a reader, e.g. a microprocessor that is capable of reading the security code and passing an 'authorised' signal to the controller to permit operation of the cycle. The code may be programmed at manufacture or set by the user.

In another embodiment, the cycle includes:
a detachable portion, including a computer-readable memory or other storage medium for storing rider 'settings' including acceleration, speed and/or braking characteristics;
a reader, capable of reading said rider settings when the throttle is attached;
wherein the acceleration, speed and/or braking characteristics of the cycle are set to the rider's settings on attachment of the detachable portion.

Preferably, the detachable portion is a detachable throttle or handset. Multiple different riders may thus use the same cycle but with different riding characteristics by using different detachable portions.

In yet another embodiment, the security system may be embodied in a preset sequence of light activations by the rider. The rider would thus have to 'unlock' the cycle by activating the lights in the correct sequence.

In preferred embodiments the cycle does not have the encumbrances of chains, gears, cranks etc. so inherent in conventional cycles and thus offers a far more compact cycle when in the collapsed configuration and therefore can be carried more readily in a bag, pack, box, satchel or other container without leaving grease, grime and the like. For example, the cycle may be enclosed in a protective bag or satchel and therefore sheltered from rain, scratching etc. Such a container can also be used to store a spare battery, tools or anything else.

Conventional cycles are typically manufactured from various alloys, steels, aluminium and carbon fibre. Each material posses various beneficial attributes and disadvantages, for example:

steel is plentiful and readily formed into complex frame shapes with elongated components capable of withstanding high loads, though involving relatively high manufacturing costs and higher frame weights;

aluminium and various alloys offer similar properties to steel with lighter frame weights, though at an increased manufacturing cost;

carbon fibre offers highly desirable performance characteristics for cycle frames and components, being very light, stiff and non-corrosive. Manufacturing is however relatively expensive and complex.

Plastics, particularly injection moulded plastics, offer highly desirable characteristics for mass manufacture and thus would be a natural choice for cycle frame manufacture if there were no other significant impediments. However, cycle frames typically involve the need for relatively elongated slender components capable of withstanding bending and flexing loads. Plastics are relatively weak to such loads in comparison to metals and carbon fibre and require either supplementing with support structures (e.g. metal reinforcing inserts) and/or requiring oversized lateral cross-sections to maintain the necessary stiffness.

Some advantages of injection molding are high production rates, repeatable high tolerances, the ability to use a wide range of materials, low labour cost, minimal scrap losses, and little need to finish parts after molding. Furthermore, the material parts cost is low, so per-item cost of manufacturing large volumes enables products to be retailed at very low costs. Facilitating low cost manufacturing enables the cycle to reach emerging or marginal markets where economic pressure may otherwise make it difficult for commuters to justify unorthodox means of transport and instead rely on environmentally costly conventional alternatives. It should be understood that although the terms 'injection molding' and 'plastics' have specific technical meanings, they are also used herein for the sake of clarity to denote any suitable plastic and a mass manufacturing method capable of producing same.

The present invention thus provides a cycle configuration readily adaptable to manufacture by injection moulding to produce at least one of said cycle frame, wheels, seat, steering member and/or steering mechanism. A key obstacle in the ability to produce a viable plastic-framed cycle is the length of the major tubular frame components dictated by a conventional cycle frame diamond configuration. The length of these frame portions prohibits a purely plastic construction without an unwieldy large cross-section and/or thick walled construction, which in turn creates a very heavy frame. Whilst this may be tolerable in a non-collapsing cycle, it directly hinders the portability of a collapsible cycle. However, the present invention provides a frame and a steering mechanism configuration resulting in compact dimensions, without the need for elongate slender frame portions. Moreover, embodiments with an electrical drive mechanism further obviate the need for a flex-resistant frame as the loads generating by pedalling are totally omitted. Further, the incorporation of an electrical drive mechanism and optionally, an electrical control, transmission and braking system, further reduces the mass and complexity of the cycle componentry.

According to one aspect, the present invention provides a cycle for use by a rider over a terrain surface, said cycle including:

an injection moulded plastic frame having front and rear portions, a seat attached to the frame;

a front wheel rotatable about a primary axis and attached to a steering member, said steering member being pivotally attached to the front frame portion for rotation about a secondary axis orthogonal to said primary axis;

a user-operable steering mechanism coupled to said steering member;

a rear wheel, rotatably attached to the rear frame portion;

a drive mechanism operatively coupled to the front and/or rear wheel;

at least one footrest on the front wheel;

configured such that a rider can be seated on the seat in operative contact with said steering mechanism when the cycle is in motion, whilst permitting both feet of said seated rider to reach the terrain surface when the cycle is stationary.

wherein:

said steering mechanism is configured and positioned to provide a substantially unobstructed or unencumbered region forward of the rider's legs, and/or said steering member secondary axis subtends an angle with said terrain surface of 70 degrees, (+/−10) degrees.

It will be appreciated that both the latter characteristics provide a means of characterising the shape and/or configuration of the cycle which denotes the compactness attributable to the seating and steering interrelationship. Although it may superficially appear to be a small connection, there is in fact a direct causal connection between the longitudinal size/aspect ratio of the cycle (i.e. the relatively upright riding (and therefore also steering stance) and the necessary length and aspect ratio of the frame components. Therefore, whilst numerous frame configurations are possible, the above parameters provide an effective means of creating a cycle capable of being manufactured from cheap, ubiquitous materials such as injection moulded plastic.

It will be understood that there is not a unique, rigid, inflexible cycle frame configuration capable of being effectively manufactured from plastics. Rather, the above-described configuration of the present invention is one possible configuration whose suitability for mass manufacturing techniques may be further enhanced by the following design considerations including:

weight reduction;

drive mechanism and/or rider ergonomics optimisation of the proportions of frame elements to match the performance characteristics of plastics.

Utilising either or both of these features may permit the use of cheaper plastics with lower performance characteristics, or different manufacturing parameters or form smaller cross-section frame components, and so forth. In an alternative aspect, either feature in its own right may provide the means to produce a cycle frame that can be mass manufactured from cost-effective plastics.

As previously described, utilising an electrical drive mechanism can replace a pedal crank transmission, and associated chain, gears, cabling, gear changing controls mechanisms and so forth. Consequently, it can be seen this replacement alone provides a significant reduction in the weight, complexity and means to optimise the frame ergonomics to avoid long slender elongate structural frame elements. Without the need for a pedal crank, chain and a gear-driven rear wheel, the rider's feet may be placed on the front wheel and the associated frame ergonomic constraints of the pedal drive removed.

Furthermore, as discussed above, an electrical drive mechanism provides the ability to be configured as a brake, using regenerative braking, and thereby potentially alleviating the necessity for a mechanical braking system together with the associated cabling or hydraulic control lines. Thus, further reductions in weight and complexity are possible simply by utilising the electrical drive as a brake and removing the mechanical braking system.

Preferably, the cycle incorporating said injection moulded plastic frame, including an electrical drive mechanism is further characterised in that said drive mechanism also functions as a braking mechanism.

It will be appreciated that the benefits of stripping the braking and transmission/gear changing mechanisms and control lines may also be applied to existing cycles. Consequently, the present invention provides a method of adapting an existing cycle by:
- replacing the pedal drive mechanism, gearing and chain with an electrical drive mechanism;
- removing the gear changing control lines;
- configuring the electrical drive mechanism to provide regenerative braking;
- removing the mechanical braking control lines;

The present invention thus provides a collapsible cycle capable convenient urban transport, which is collapsible into a compact volume for transport and storage with minimal risk of becoming entangled with the user or their clothing.

BRIEF DESCRIPTION OF DRAWINGS

Further aspects of the present invention will become apparent from the following description which is given by way of example only and with reference to the accompanying drawings in which:

FIGS. 20a-20f show plan views of the collapsing sequence of the cycle of FIG. 1 and the lateral and longitudinal boundary planes of the front and rear wheels and the frame;

FIGS. 20g-20l show front elevations of the of the collapsing sequence of the cycle of FIG. 1 and the lateral boundary planes of the front and rear wheels and the frame;

FIGS. 35a-35c show three embodiments of a cycle according to another aspect of the present invention;

DETAILED DESCRIPTION OF THE INVENTION

Figure 1:
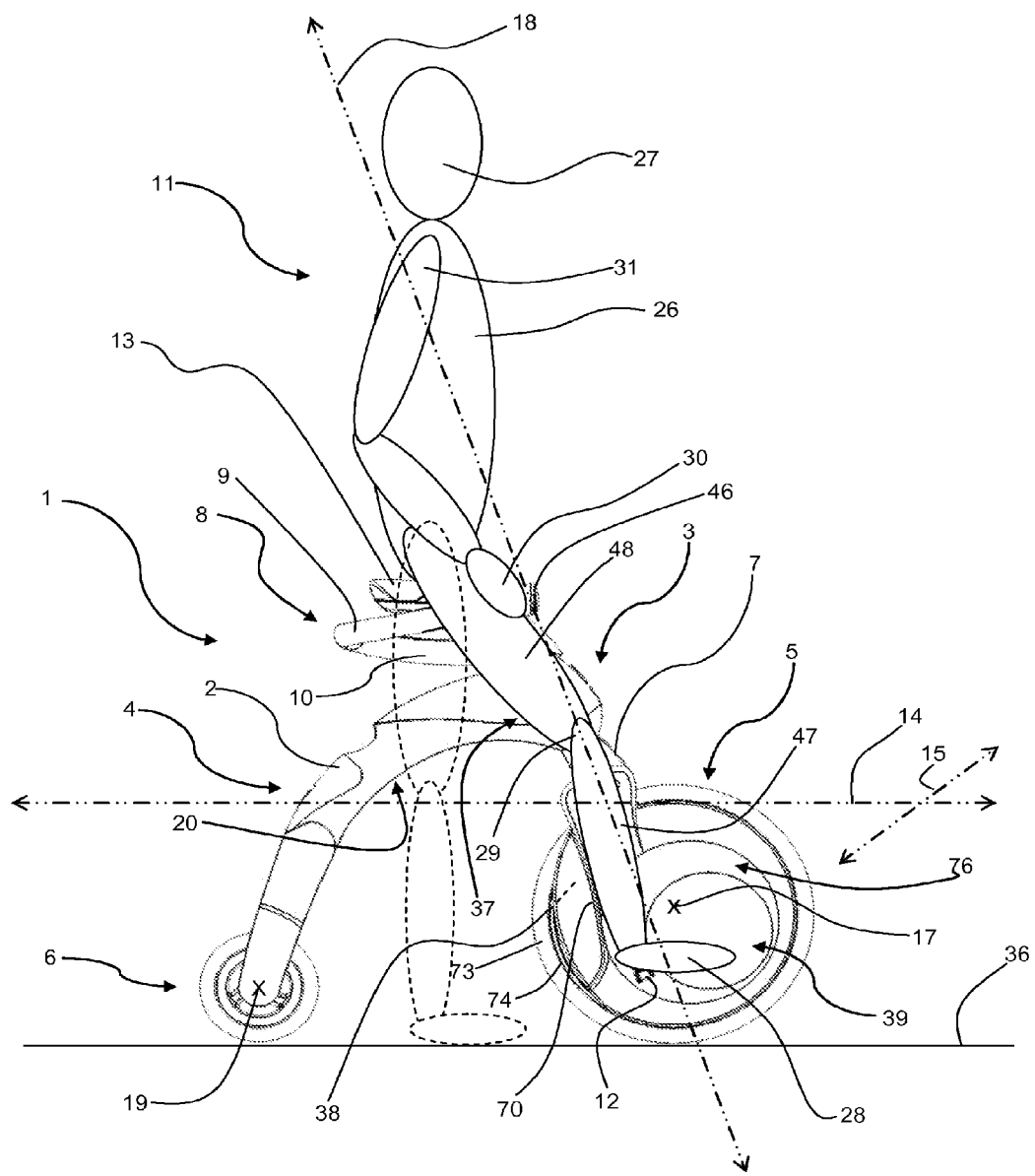
FIG. 1 shows a side elevation of a preferred embodiment of the present invention in the form of a collapsible cycle.

FIGS. 1-21 show a cycle (1) according to a preferred representative embodiment of the present invention.

In broad terms, the cycle (1) for a rider (11) has a frame (2) with:
a front frame portion (3),
a rear frame portion (4),
a front wheel (5) attached to the front frame portion (3)
a rear wheel (6) attached to the rear frame portion (4)
a steering member in the form of a fork (7) pivotable attached to the front frame portion (3) and rotatable retaining the front wheel (5)
a steering mechanism (8) provided in the form of handlebars (9) and a stem (10)
a footrest (12) attached to the front wheel (5)
and a seat (13).

The cycle (1) has a natural orientation in use, i.e. with the frame (2) upright in the vertical plane with a substantially longitudinal axis (14) aligned with a forward and rearward direction of cycle travel and a lateral axis (15) orthogonal to said longitudinal axis (14).

A seat (13) is attached to the front frame portion (3) via a seat mounting. It will be appreciated that while in the preferred embodiment shown in the figures the seat (13) is fixed to the frame (2), the seat may also be releasably attached to a seat post or mounting, in a manner similar to many contemporary cycle seat arrangements.

Although not essential, in the embodiments shown in FIGS. 1-36, the cycle (1) is also collapsible between an erect riding configuration to a collapsed configuration by repositioning the front (5) and rear (6) wheels into mutually closer proximity with the frame (2). The seat (13), handlebars (9) and steering fork (7) are also repositioned into mutually closer proximity with the frame (2) to thereby reduce the overall volume occupied by the cycle (1). The methods of collapsing the cycle are discussed in more detail separately.

A front wheel (5) is attached to a steering member provided in the form of steering fork (7). The front wheel (5) is rotatable in a first plane about a primary axis (17) and the steering fork (7) is pivotally attached to the front frame portion (3) for rotation about a secondary axis (18) orthogonal to the primary axis (17). A rear wheel (6) is rotatably attached to the rear frame portion (4) and is rotatable in a third plane about a tertiary axis (19). The frame (2) also has a substantially arcuate portion (20) with a substantially U-shaped cross-section that is dimensioned to mate with at least a portion of the front wheel (5). The rear wheel (6) has a smaller diameter than front wheel (5) such that it can be inserted into a front wheel aperture (39).

The front wheel (5) includes a terrain-engaging annular tire (73) and a rotatable rim portion (74) mounting the tire (73).

A user-operable steering mechanism (8) is provided and includes a pair of handlebars (9) that are joined to the steering fork (7) via a stem (10) configured with two distal ends. The stem (10) is attached to the steering fork (7) at one distal end and attached to the pair of handlebars (9) at the other distal end. Rotation of the handlebars (9) via the stem (10) and connected steering fork (7) thus rotates the front wheel (5) to implement the rider's (11) steering inputs during motion. The pair of handlebars (9) are formed as twin bars, laterally disposed symmetrically either side of the stem (10).

Figure 31:
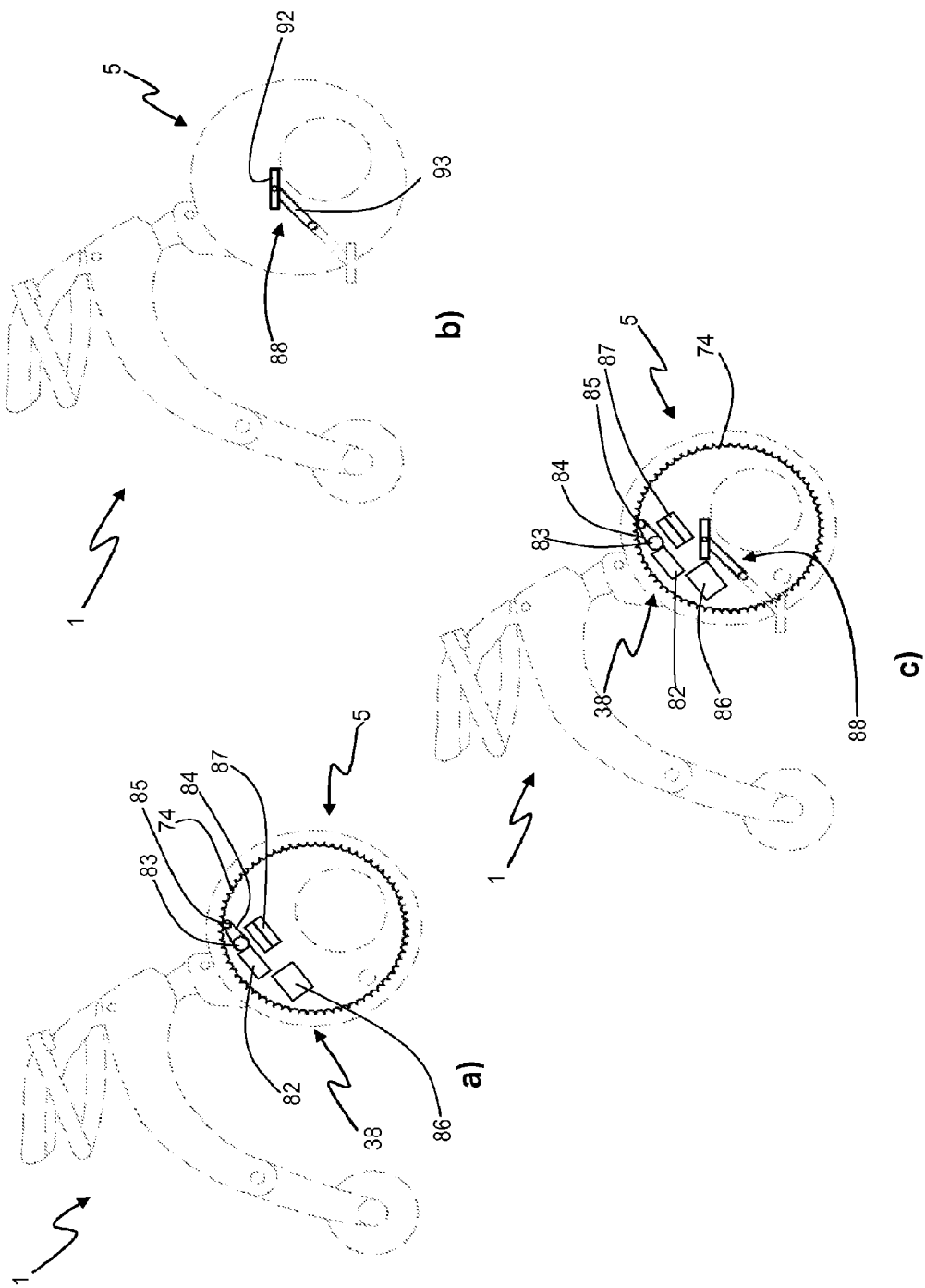
FIGS. 31a-31c respectively show an externally-powered, user-powered and combination external and user-powered drive mechanisms for use with the cycle of FIG. 1

A drive mechanism (38) is provided in the form of an electric motor (shown schematically as (82) in FIG. 31, though concealed in FIG. 1 by the front wheel central housing (76)). The electric motor (82) is operatively coupled to the front wheel (5) via a gearing system.

Footrests (12) are provided on either side of the front wheel (5) for supporting a rider's feet when the cycle (1) is in motion.

The cycle (1) is configured such that a rider can be seated on the seat (13) in operative contact with the steering fork (7) via handlebars (9) and the footrests (12) when the cycle (1) is in motion, whilst permitting the seated rider's feet (28) to reach the terrain surface when the cycle (1) is stationary. It will be readily apparent that the cycle (1) is configured to support the rider (11) in an unstressed substantially upright posture without substantial torso inclination whilst stationary and during motion.

Figure 2:
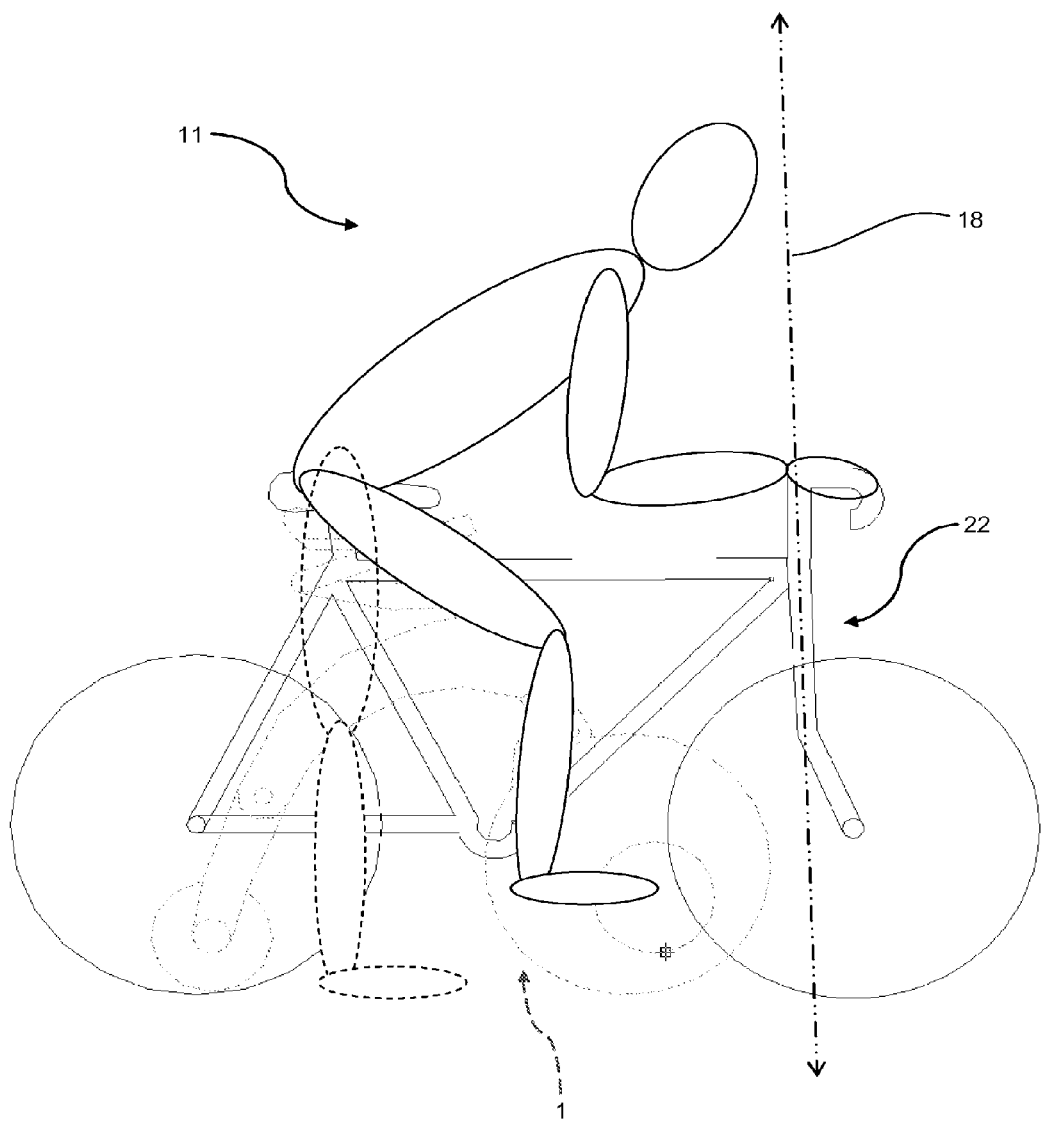
FIG. 2 shows a side elevation of the cycle of FIG. 1 in comparison with a conventional modern cycle.
Figure 3:
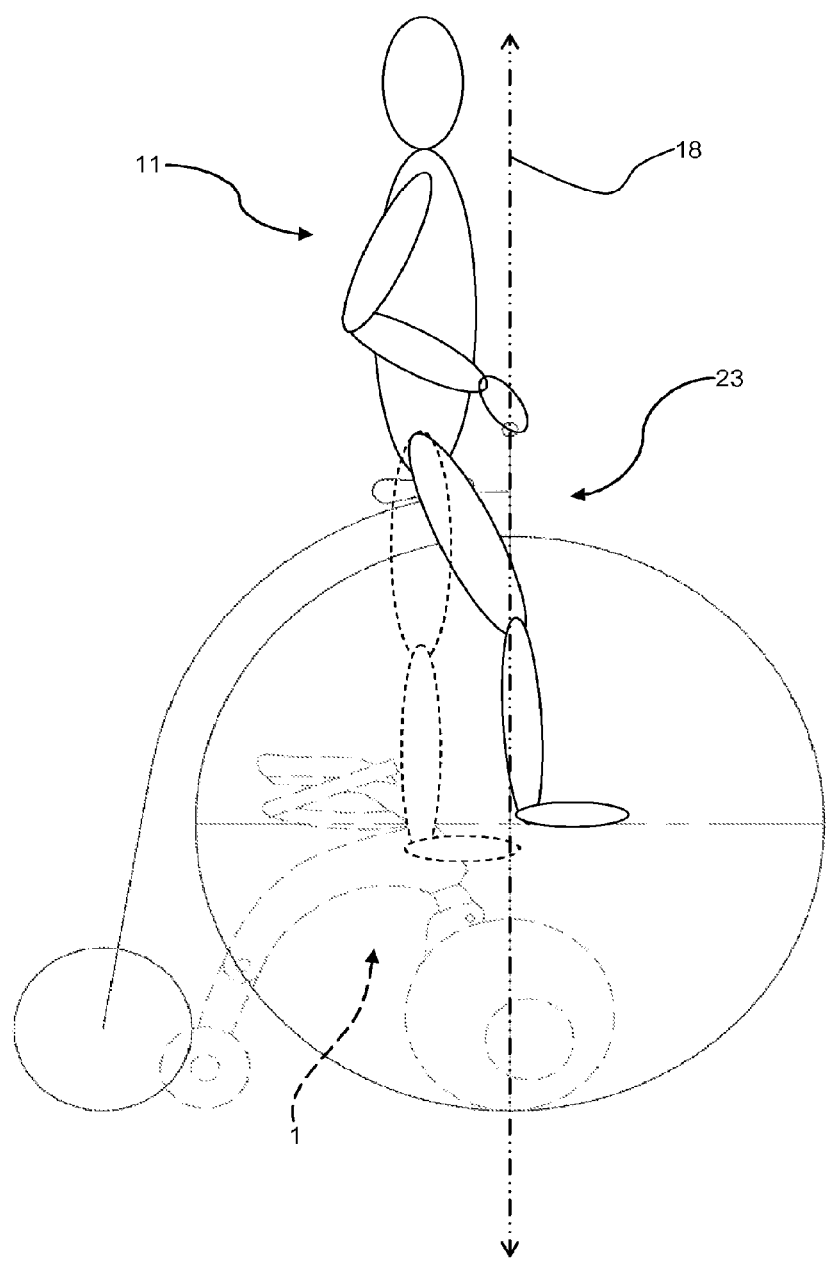
FIG. 3 shows a side elevation of the cycle of FIG. 1 in comparison with a Penny Farthing cycle.
Figure 4:
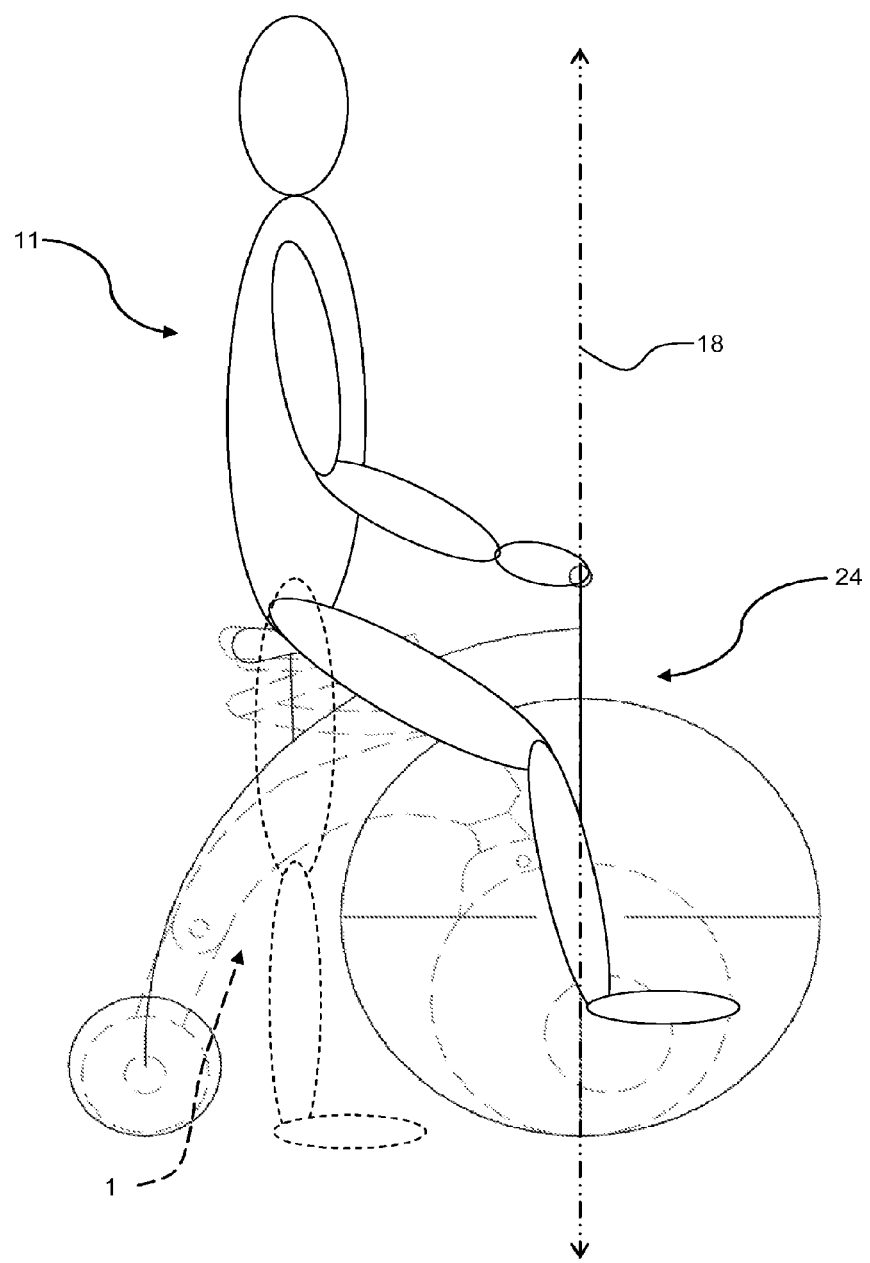
FIG. 4 shows a side elevation of the cycle of FIG. 1 in comparison with a mini Penny Farthing (mini-farthing') cycle.

The upright, unstressed rider position differs significantly from typical current and historical cycles. Prior art cycles invariably require the rider to bear a portion of their weight on the steering mechanism, whilst inclining their torso. FIGS. 2-5 show a spectrum of representative germane prior art cycle configurations overlaid onto a phantom representation of one embodiment of the present invention. The rider (11) shown in FIGS. 2-4 is the same as in FIG. 1 and throughout all the drawings (except FIG. 8) illustrates a comparison of the dimensional differences as well as the frame and wheel layout differences.

Although mountain bikes, touring bikes and other categories vary slightly in rider stance, a modern road racing cycle (22) as shown in FIG. 2 is representative of contemporary cycle frame configurations. The conventional riding position shown in FIG. 2 for non-recumbent cycles places the rider with an inclined torso stance, partially crouched with a lowered head. In contrast to the riding position of the present embodiment shown in FIG. 1, the contemporary riding position (FIG. 2) is optimised for high speed through reduced aerodynamic drag. However, this consequently places more strain on the rider's physique and reduces the rider's peripheral awareness and road presence for other traffic. In contrast, the rider of the cycle (1) in FIG. 1 is placed in an ergonomically balanced, unstressed stable seating posture with the rider's legs extended forward to the front wheel footrests (12) or pedals rather than being placed below and/or behind the user's hips. In comparison to a conventional riding posture (FIG. 2), this upright riding position provides numerous advantages for urban transport including:
- an excellent field of view and an elevated sightline for the rider (11);
- presenting a greater visual signature or presence for other road users;
- reduced musculoskeletal strain, and
- placing the rider's feet (28) forward of the hips (48) in a stable and natural position, reducing the minimum seat height required and thus lowering the centre of gravity and improving stability.

The cycle (1) has a larger front wheel (5) than rear wheel (6) which is a markedly differing frame/seating configuration from existing cycle designs, with the closest comparable riding posture being exhibited by penny farthing designs from the early 20$^{th}$ century. An example of such a Penny Farthing cycle (23) is shown in FIG. 3 in comparison with the cycle (1). However, as mentioned previously, there are a numerous problems inherent with known penny farthing designs which have prevented their ongoing use in modern cycles. In contrast, as the cycle (1) is configured with the wheels (5, 6) and frame (2) dimensioned to allow the seated rider's feet to touch the ground, these aforementioned problems with the 'Penny Farthing' design are reduced or eliminated.

The provision of the footrests (12) on the front wheel (5) also provides increased dynamic stability, interactive rider involvement and tactile feedback. Furthermore, the footrests (12) may be used by the rider (11) to assist in steering the front wheel (5) or may be used as the sole steering input if the rider requires their hands to be free.

A miniaturised modern variant (24) of the penny-farthing design is shown in FIG. 4 in comparison with the cycle (1) and is an attempt to alleviate some of the problems with the traditional penny farthing cycle by reducing the size of the front wheel to allow the rider (11) to reach the ground with their feet (28). However, disadvantages include that:
- the cycle is not collapsible;
- the steering axis angle is steep (possibly to avoid the effort in turning such a large wheel with a smaller or 'slacker' steering axis angle);
- the steering mechanism handlebars are positioned in front of, and above, the rider's seat, and
- the drive mechanism is a fixed crank through the centre axis of the front wheel.

Figure 5:
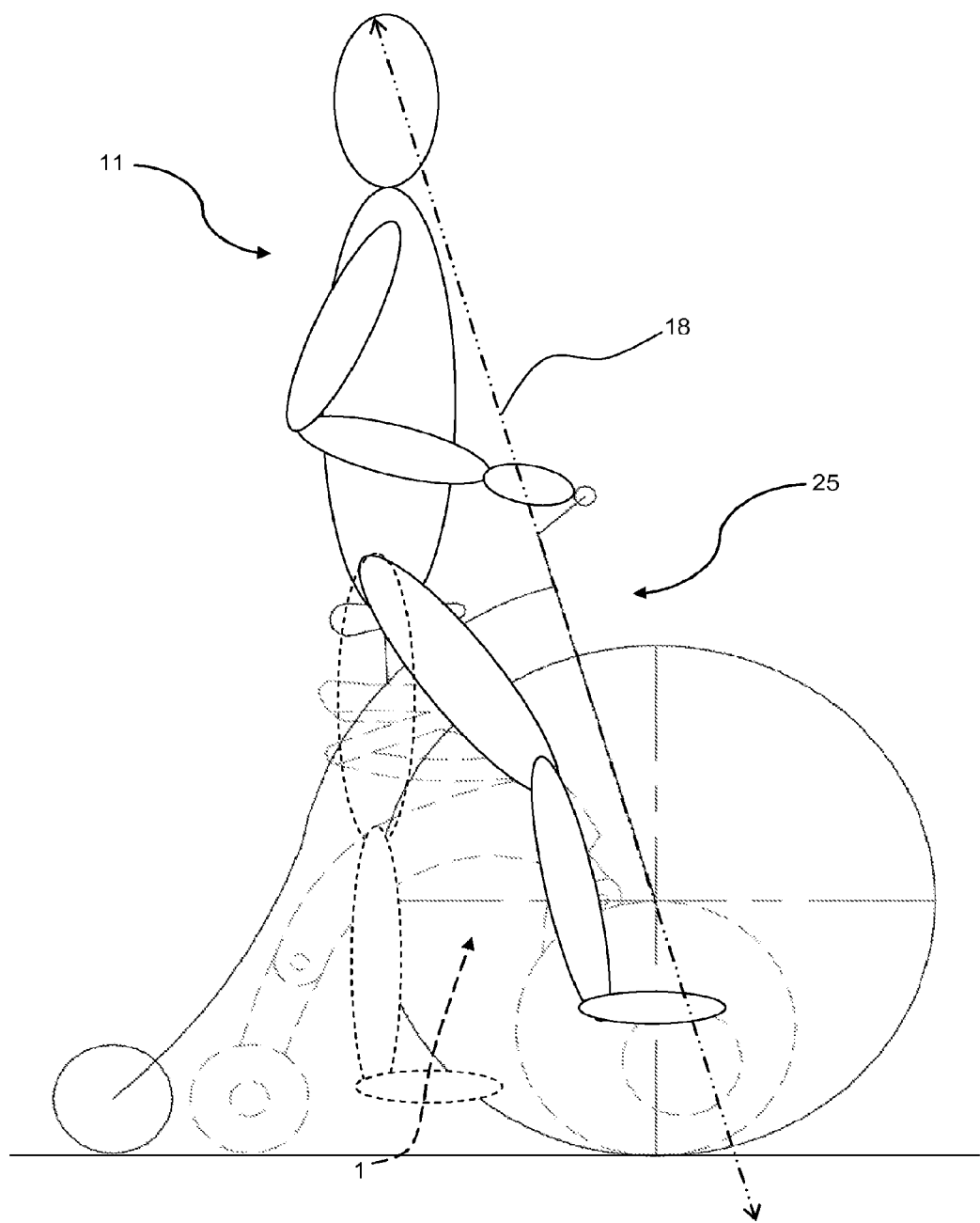
FIG. 5 shows a side elevation of the cycle of FIG. 1 in comparison with another known Penny Farthing cycle.

Another more modern penny-farthing variant design (25) is shown in FIG. 5, which incorporates a slacker steering axis angle and smaller front wheel than a full-size penny farthing. However, it still places the average rider too high to place both feet on the ground when stationary and incorporates all of the other disadvantages given above for the cycle shown in FIG. 4.

The location of the steering mechanism coupled to the steering member is thus specifically pertinent to the issue of riding position. Other pertinent configuration parameters include:
- locating a manually operated steering mechanism (8) within an easily accessible distance from the seat (13);
- a seat height not exceeding the rider's inside leg length;
- footrest displacement from seat position permitting front wheel steering movement without interference from, or detachment of, the rider's feet (28).

It is widely established that typical human bodies possesses certain interrelationships regarding the proportions of various limbs, body features and elements. Despite the natural variation in human form and size, these interrelationships may be used as a design parameter for optimising the cycle ergonomics to suit the majority of human body frames. As discussed above, for any embodiment of the present invention utilising front wheel footrests, there is a clear physical relationship between the position of the seat (13) and the footrests (12).

Figure 6:
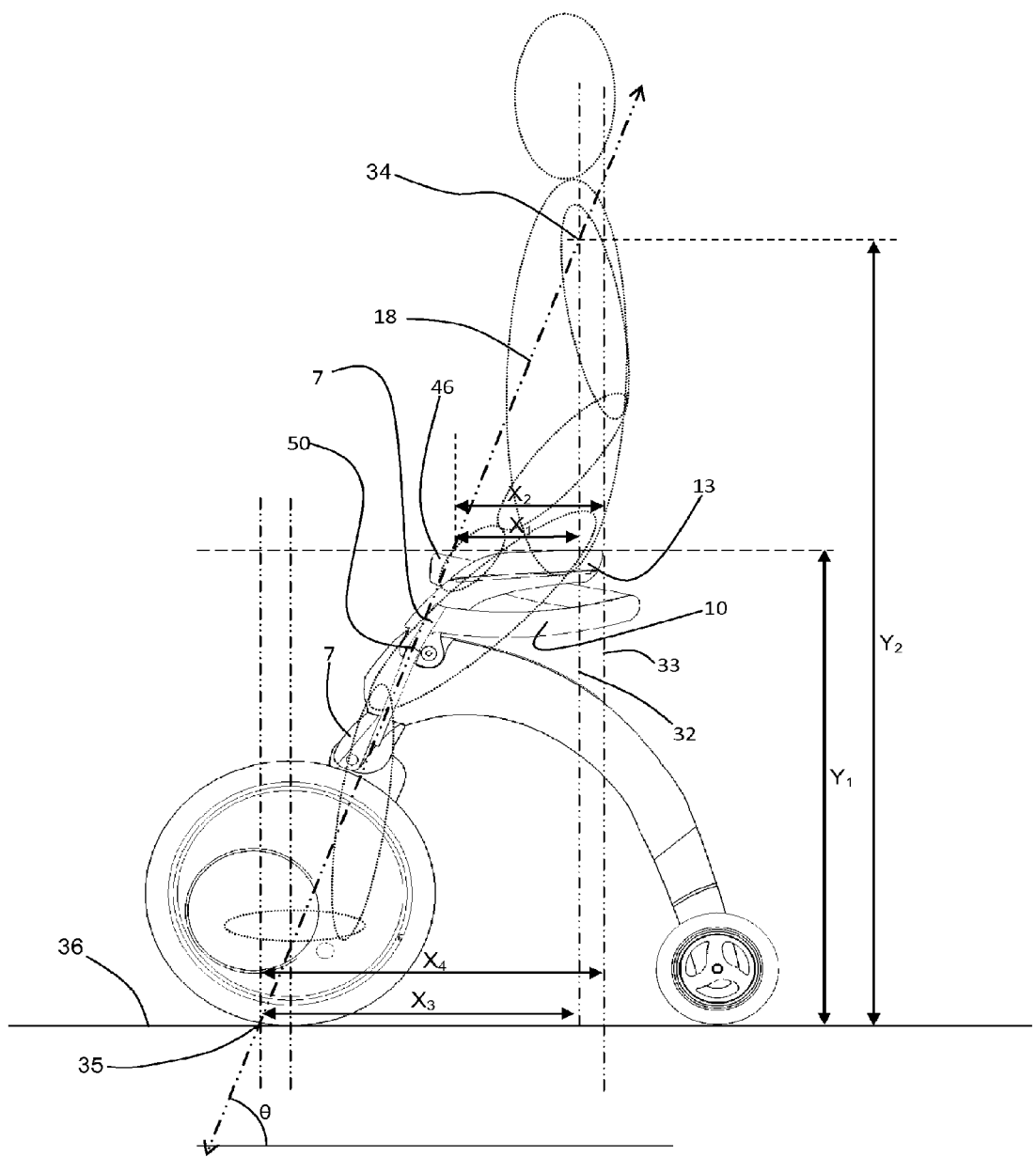
FIG. 6 shows a side elevation of the cycle of FIG. 1 and cycle dimensions.
Figure 7:
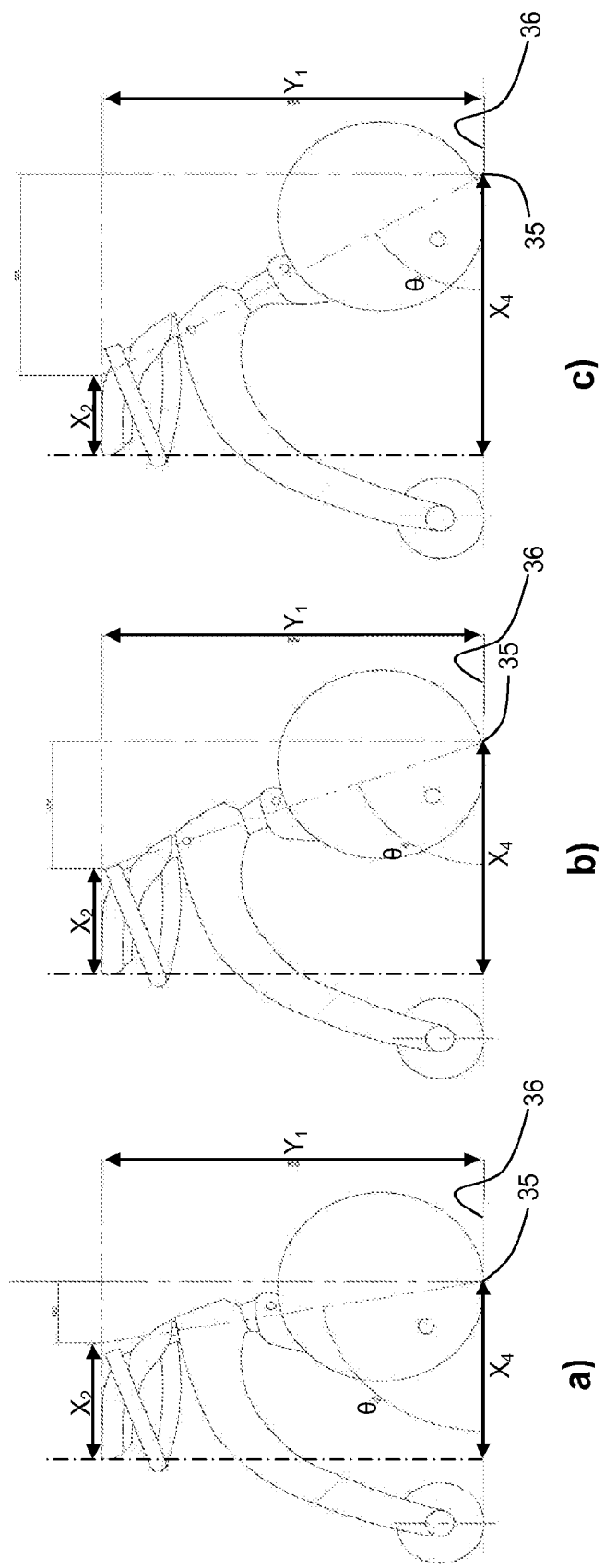
FIGS. 7a, 7c, 7b show side elevations of the cycle of FIG. 1 with different steering axis angles.
Figure 8:
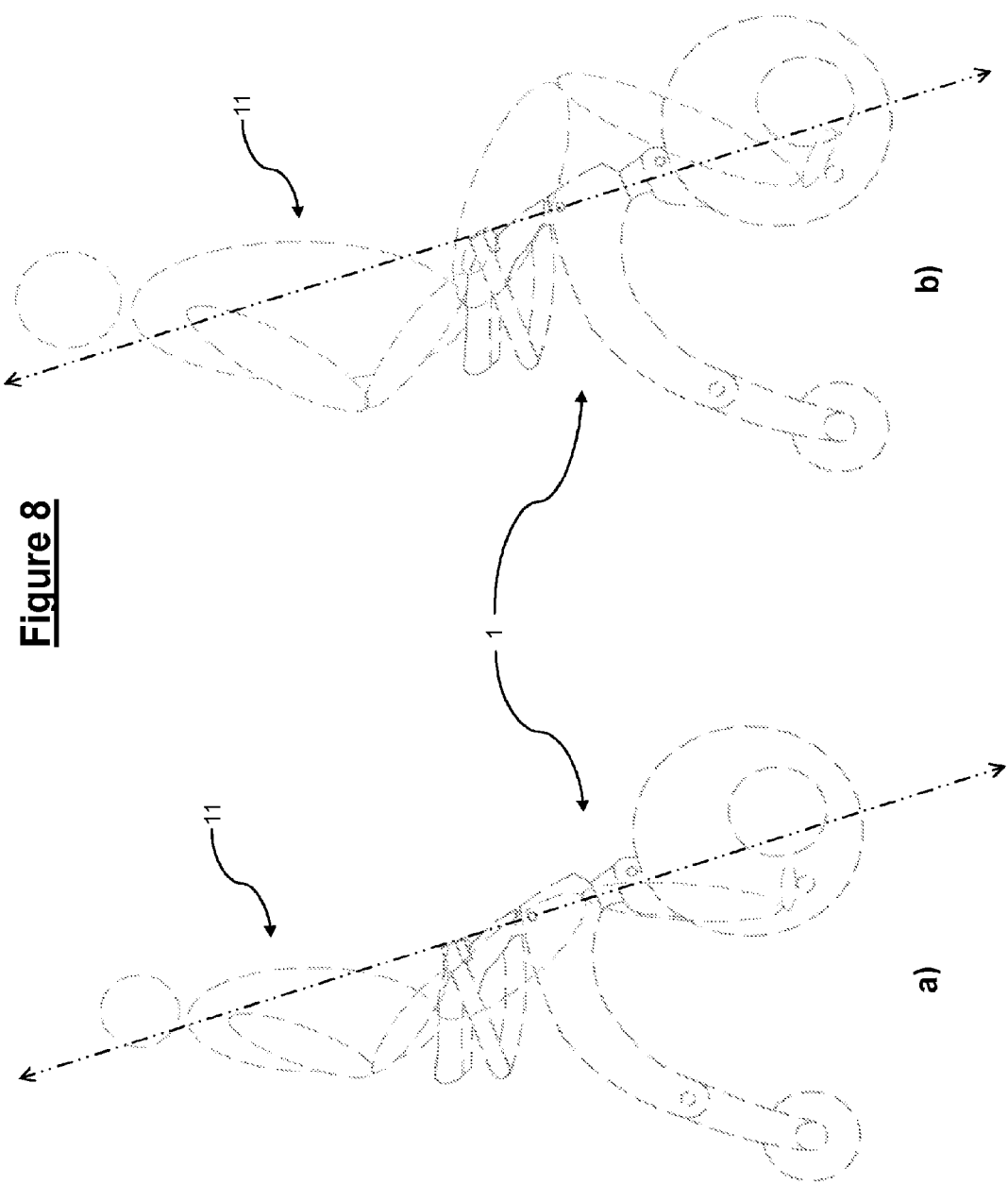
FIGS. 8a and 8b respectively show side elevations of smaller and larger riders than that shown in FIGS. 1-5.

FIGS. 6-8 show the interrelationship between the rider (11) and the key parameters of the cycle (1) frame-wheel interrelationship, particularly the position of the secondary axis, or 'steering axis' (18) relative to the rider (11) and seat (13).

Given that the maximum seat height is limited by the rider's inside leg length, it thus follows the separation of the footrests (12) from the seat (13) must lie within an arc of radius no greater than the rider's inside leg length. The present invention advantageously places the steering axis (18) at an angle and in sufficient proximity to effectively pass through the rider's torso (26) and limbs. In prior art cycles, such as shown in FIGS. 2-5, it can be readily seen the steering axis is positioned remotely from the upright rider's torso (26). Even if the rider (11) is inclined sufficiently for the steering axis to pass near the region of their head (27) or upper chest, the remainder of the rider's body including the feet (28), knees (29), and torso (26) are significantly displaced. If the rider (11) were to sit upright, with an unstressed spinal position, the steering axis (18) doesn't intersect the rider (11).

FIG. 6 shows in side elevation view the close proximity of the steering axis (17) as it passes the rider's feet (28), knees (29), hands (30) and finally the torso (26), as it extends through the shoulders (31). FIG. 8 illustrates how, even for riders of significantly different stature, the steering axis (18) remains in close proximity to the rider's limbs and torso (26). It also illustrates how a fixed-height seat (13) still enables different sized riders to use the cycle (1) without need for adjustment.

Steering axis angle θ is also an influential parameter in the cycle steering geometry of the cycle with a direct affect on cycle handling, stability and responsiveness. It has been found in one embodiment, that an allowable range for the steering axis angle θ to maintain the required performance and handling characteristics is a rearward inclined steering axis angle θ between 70 (+/−10) degrees measured from a planar horizontal terrain surface. FIGS. 7a)-7c) show the cycle (1) with steering axis angle values of e between 60° and 80° in 10° increments.

Given the ergonomic requirement that the seated rider must be able to place their feet (28) on the front wheel footrests (12) this constrains the longitudinal separation between the seat (13) and the front wheel (5), and thus, the steering axis (18).

There is a direct relationship between the maximum seat height and the length of the rider's inside leg length. Similarly, there is an inter-relationship is between the maximum separation of the front wheel footrest (12) and the seat (13)— both in terms of the height of the seat (13) and the horizontal separation of the seat (13) and the steering axis (18). As a reference point, the position of the seated rider may be considered as represented by a vertical line (32) passing through the rider's pelvis and spine, or alternatively, as a vertical line (33) at the rearward seat edge.

It has been found that for a given seat height $Y_1$, and a steering axis angle θ=70°, the horizontal separation $X_1$ of the steering axis (18) from said vertical line (32) is equal to approximately $0.24Y_1$. Thus, it follows geometrically that the vertical height $Y_2$ of line (32) to the intersection (34) with the steering axis (18) is given by the expression:

$$Y_2 = 0.24Y_1 \tan\theta + Y_1 \qquad \text{-1)}$$

It also follows that the horizontal distance $X_3$ between the intersection (35) of the steering axis (18) with the terrain surface (36) and line (32) is given by the expression:

$$X_3 = \tan\theta/(0.24Y_1 \tan\theta + Y_1) \qquad \text{-2)}$$

Thus, according to one aspect, the present invention provides a cycle (1) with a secondary axis angle of 70°(+/−10°) and a cycle seat (13) positioned to bear the rider's upright torso at a horizontal distance $X_3$ (+/−20%) from the intersection (35) of said secondary axis (18) and the terrain surface (36) given by $X_3 = \tan\theta/(0.24Y_1 \tan\theta + Y_1)$, where $Y_1$ is the vertical seat height.

Considering the alternative reference line (33) of the rear seat edge, the corresponding horizontal separation $X_2$ of the steering axis (18) from said seat edge (33) is equal to approximately $0.28Y_1$.

Thus, the horizontal distance $X_4$ between the intersection (35) of the steering axis (18) with the terrain surface (36) and the seat rear edge (33) is given by $X_4 = \tan\theta/(0.28Y_1 \tan\theta + Y_1)$, where $\theta$ is the steering axis angle, $Y_1$ is the vertical seat height.

In recognition of the variations in rider stature, seating position and personal style, in a further embodiment, the horizontal distance $X_4$ between the intersection of the steering axis with said terrain surface and line $Y_1$ is variable by +/−20%, as exemplified in FIG. 7.

The penny farthing configuration of a front wheel relatively larger than the rear wheel offers many advantages for a practical urban-focused mini-farthing cycle. The present invention utilises the mini-farthing configuration advantageously in conjunction with:
- collapsible cycle configurations;
- predetermined steering mechanisms, e.g. under-seat steering;
- external drive mechanisms, such as electric drives, and hubless wheel constructions.

Each of these features or capacities is illustrated throughout FIGS. 9-37, as described below.

Thus, according to different embodiments of the present invention there is provided a cycle (1) as hereinbefore described;
  wherein said front wheel (5) is of a diameter exceeding said rear wheel (6);
configured to include at least one of:
  being collapsible from an erect riding configuration to a collapsed configuration by moving said wheels (5) (6) into mutually closer proximity;
  a manually operable steering mechanism (8) configured and positioned to provide a substantially unobstructed or unencumbered region forward of the rider's legs (37);
  at least one hubless wheel (5); and/or
  at least one externally-powered drive mechanism operatively coupled to the front and/or rear wheel (6).

As stated above, the present invention may also advantageously utilise a mini-farthing configuration in conjunction with a hubless front wheel (5) (as shown in FIG. 1), an externally-powered drive mechanism (38) (shown in FIG. 31) and/or rear-wheel drive mechanisms. A hubless front wheel (5) is particularly advantageous in combination with compacting cycles as a means of providing a storage volume into which elements of the cycle may be compacted. A hubless front wheel may, but not necessarily, be formed with a void in the wheel centre e.g. as in the front wheel (5) of the cycle (1) shown in FIGS. 1-37.

In addition to storage possibilities, a wheel centre void (39) allows a drive mechanism(s) and suspension componentry and the like to pass through the plane of the wheel.

It will be noted that each of the mini-farthing embodiments (having front wheel larger than rear wheel) described herein, may be configured with at least one footrest (12) on the front wheel (5), and/or configured such that the seated rider (11) is also able to reach the terrain surface (36) with both the seated rider's feet when the cycle is stationary and also reach both the steering mechanism (8) and footrest (12) when the cycle (1) is in motion.

As discussed above, the cycle (1) is capable of being reconfigured from an erect, riding configuration to a collapsed configuration by repositioning the front wheel (5), rear wheel (6), seat (13), steering mechanism (8), footrests (12) and steering member (7) into mutually closer proximity with the frame (2).

FIGS. 8-13 show the second preferred embodiment of the cycle (1) and the points at which fold axes are located and about which the various cycle components fold in repositioning between the erect and collapsed configurations.

A first fold axis (40) (shown in FIG. 9) is located where the front wheel (5) is pivotally joined to the steering fork (7) and allows the front wheel (5) and frame (2) to pivot relative to each other. The first fold axis (40) is parallel to the primary axis (17) which passes through the geometric centre of the front wheel (5) and about which the front wheel (5) rotates.

A second fold axis (41) is located at a connection between the rear wheel (6) and the frame (2) and permits the rear wheel (6) to pivot relative to the frame (2) into mutually closer proximity with the frame (2) and front wheel (5). The second fold axis (41) is orientated parallel to the first fold axis (40) and the rear wheel repositioning is performed by a combination of pivoting in the vertical plane about the second fold axis (41) and linear translation of the rear wheel (6).

Figure 9:
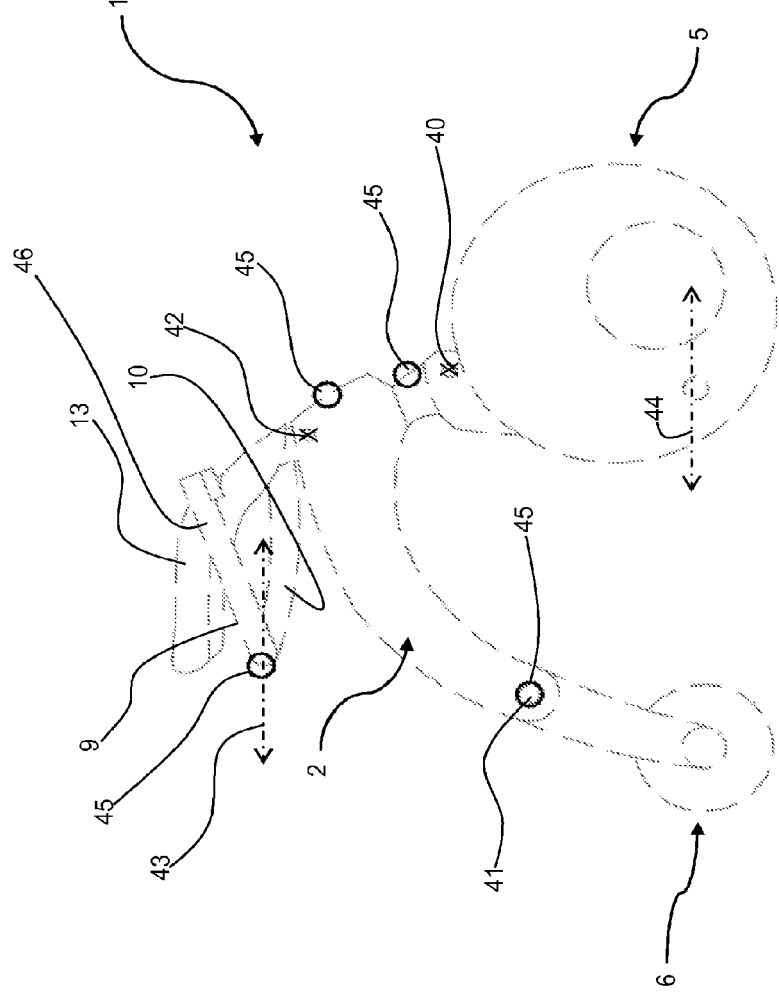
FIG. 9 shows a side elevation of the cycle of FIG. 1 and fold axes.
Figure 10:
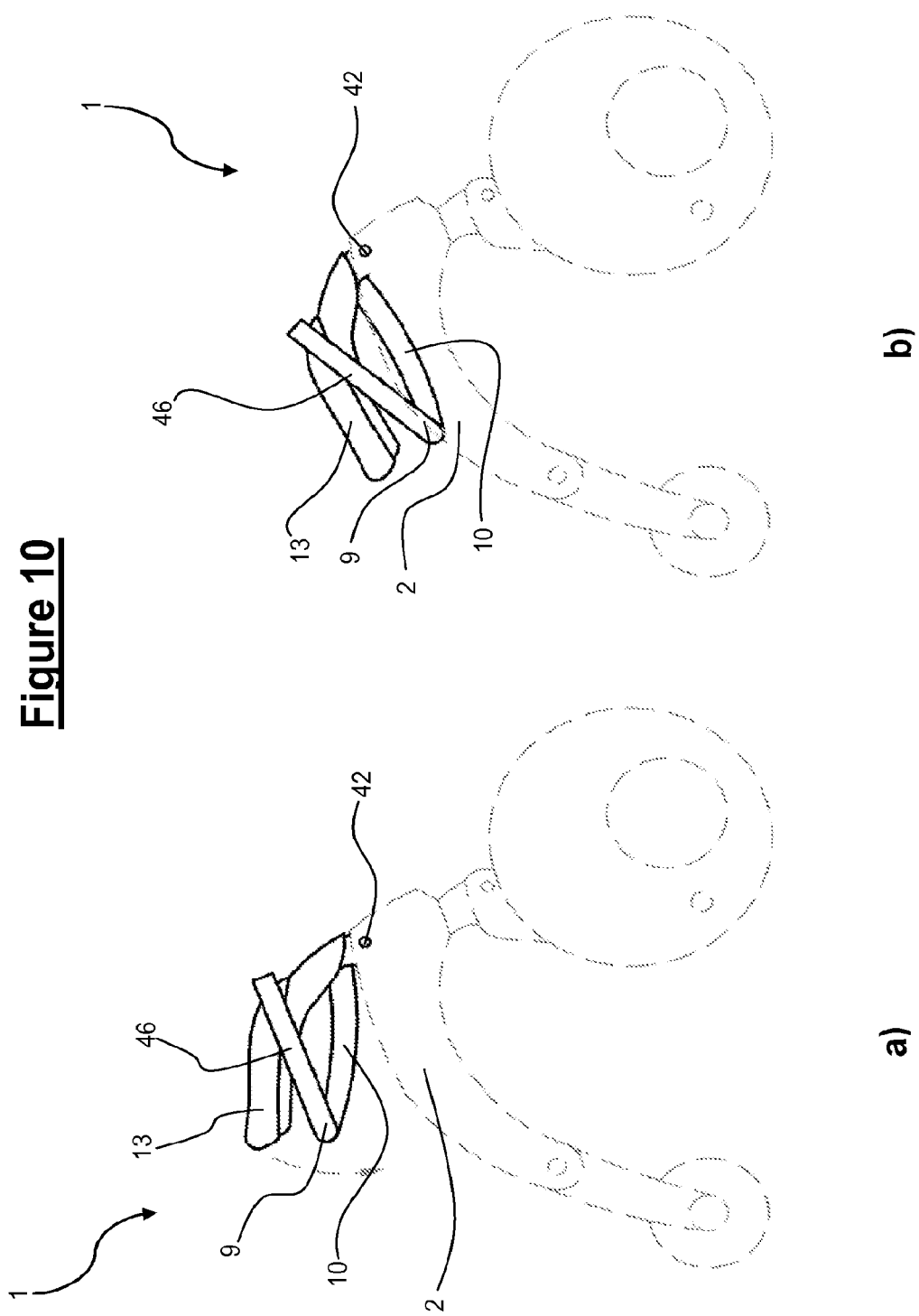
FIG. 10a show a side elevation of the cycle of FIG. 1 with the steering mechanism and seat in the erect configuration FIG. 10b show a side elevation of the cycle of FIG. 1 with the steering mechanism and seat in the collapsed configuration.

The first (40) and second (41) fold axes and the respective pivoting of the front (5) and rear (6) wheels is shown in FIGS. 9-13. The seat (13) and steering mechanism (8) are both pivotable about a third fold axis (42) located at the mounting for the seat (13) which includes a pivoting connection to allow the seat (13) to pivot relative to the frame (2). As shown in FIG. 6, the steering mechanism (8) contains a universal joint (50) about which the stem (10) can pivot. FIG. 10 shows the repositioning of the seat (13) and steering mechanism (8) from the erect (FIG. 10a) to the collapsed (FIG. 10b) configurations.

A fourth fold axis (43) is located at the connection between the handlebars (9) and stem (10) of the steering mechanism and is oriented substantially parallel to, or co-axial with the longitudinal axis of the stem (10) to allow the handlebars (9) to pivot in a vertical plane from the erect configuration (shown in FIG. 11a) to the collapsed configuration as shown in FIG. 11b. FIGS. 11a and 11b also show the repositioning of the footrests (12) about respective fifth fold axes (44) which are aligned horizontally in the plane of the front wheel (5).

Figure 12:
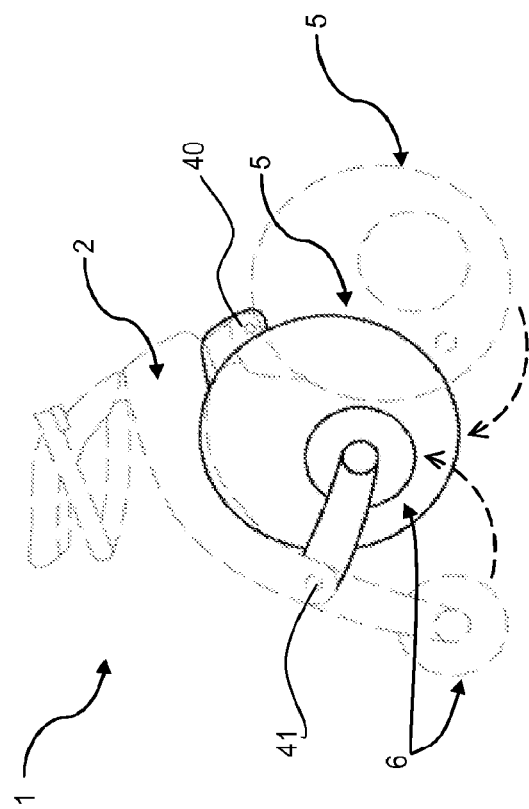
FIG. 12 shows a side elevation of the cycle of FIG. 1 with the front and rear wheels moved between the erect and collapsed configurations.
Figure 13:
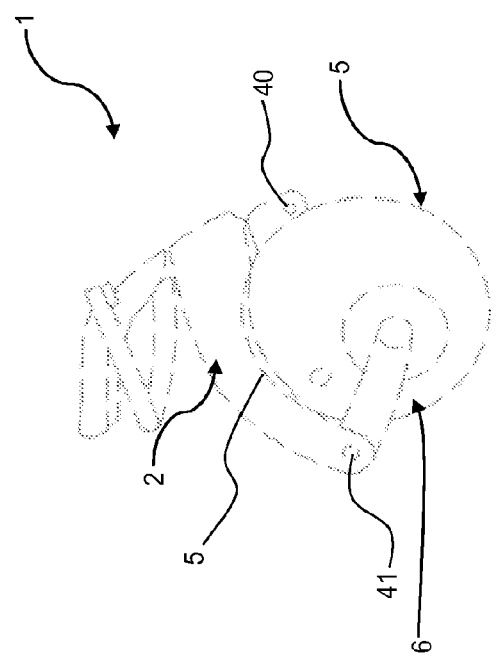
FIG. 13 shows a side elevation of the cycle of FIG. 1 with the front and rear wheels in the collapsed configuration.

FIG. 12 shows the rear wheel (6) repositioned inside the front wheel (5) with the erect cycle (1) shown in phantom, while FIG. 13 shows the front and rear wheel positioning of the cycle (1) in the collapsed configuration.

FIG. 9 also shows the representative positions of latches (45) which respectively retain the front wheel (5), rear wheel (6), cycle seat (13)/steering mechanism (8) and the handlebars (9) in the erect configuration and can be released to allow the respective pivoting of the front wheel (5), rear wheel (6), cycle seat (13)/steering mechanism (8) and the handlebars (9), about the first (40), second (41), third (42) and fourth (43) fold axes. It will be appreciated that the footrests (12) may not require a latch as the rider's foot pressure will likely be sufficient to retain the footrests (12) in the erect configuration (FIG. 11a) during motion. Pivoting the seat (13) and the steering mechanism (8) together enables the use of a single securing latch (45).

FIGS. 14a-14e and FIGS. 15a-15e show the first preferred embodiment of the cycle (1) in the erect (FIGS. 14a-14e) and collapsed (FIGS. 15a-15e) configurations. The fold axes (40, 41, 42, 43, 44) of the first embodiment in FIGS. 1-17 are generally similar to those of the second embodiment shown in FIGS. 8-13 and differ only in that the second fold axis (41) about which the rear wheel (6) folds is orientated in the vertical plane at an angle of approximately sixty degrees to horizontal when the cycle (1) is upright. This second fold axis (41) thus allows the rear wheel (6) to be repositioned by pivoting out of the longitudinal plane of the cycle (1) and then returning into the plane of the cycle (1) and inserted into the aperture (39) in the front wheel (5). This second fold axis (41) can be more clearly seen in FIG. 15 when the cycle (1) is in the collapsed configuration.

Figure 15:
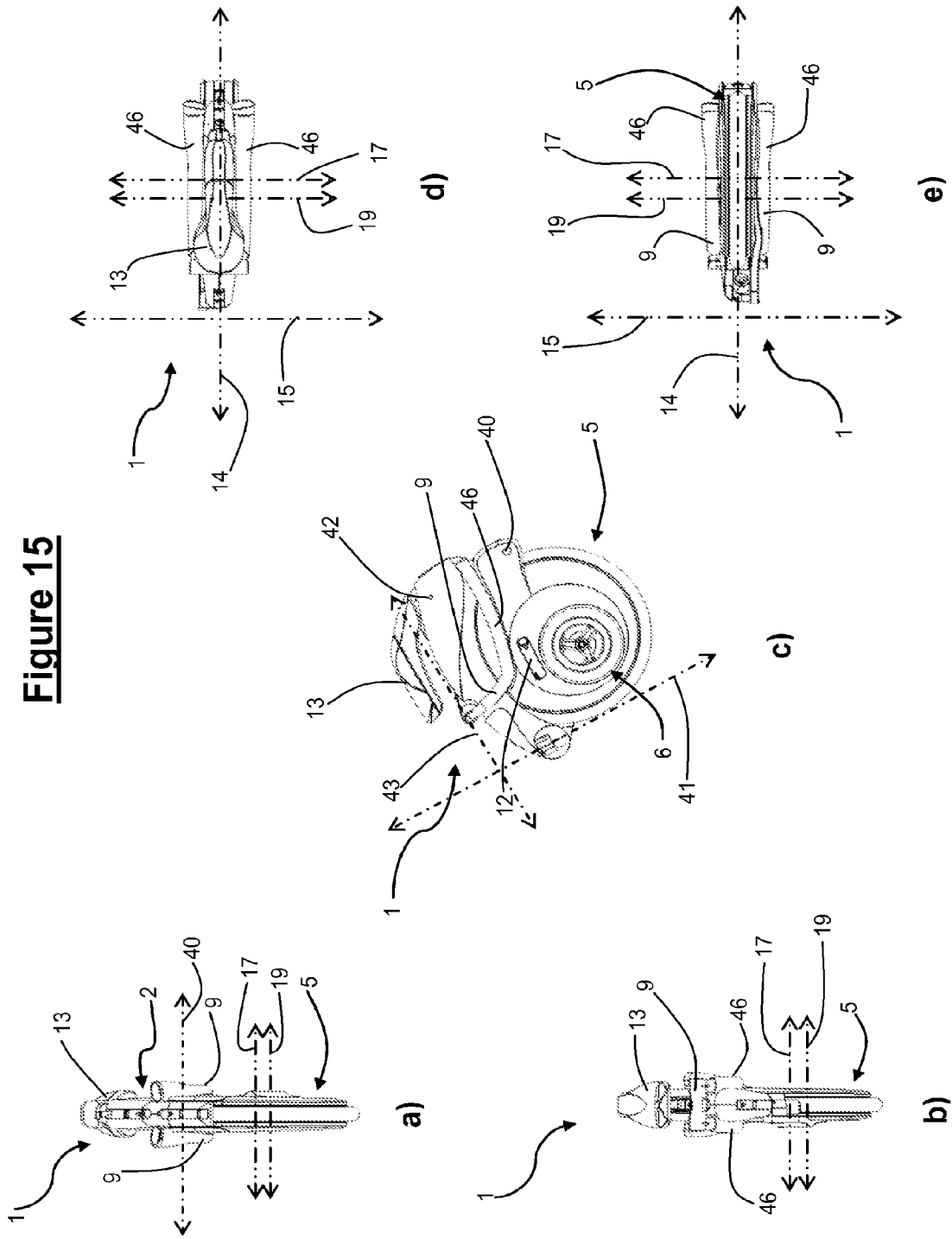
FIGS. 15a-15e respectively show front, rear, side, plan, and underside views of the cycle of FIG. 1 in the collapsed configuration.
Figure 16:
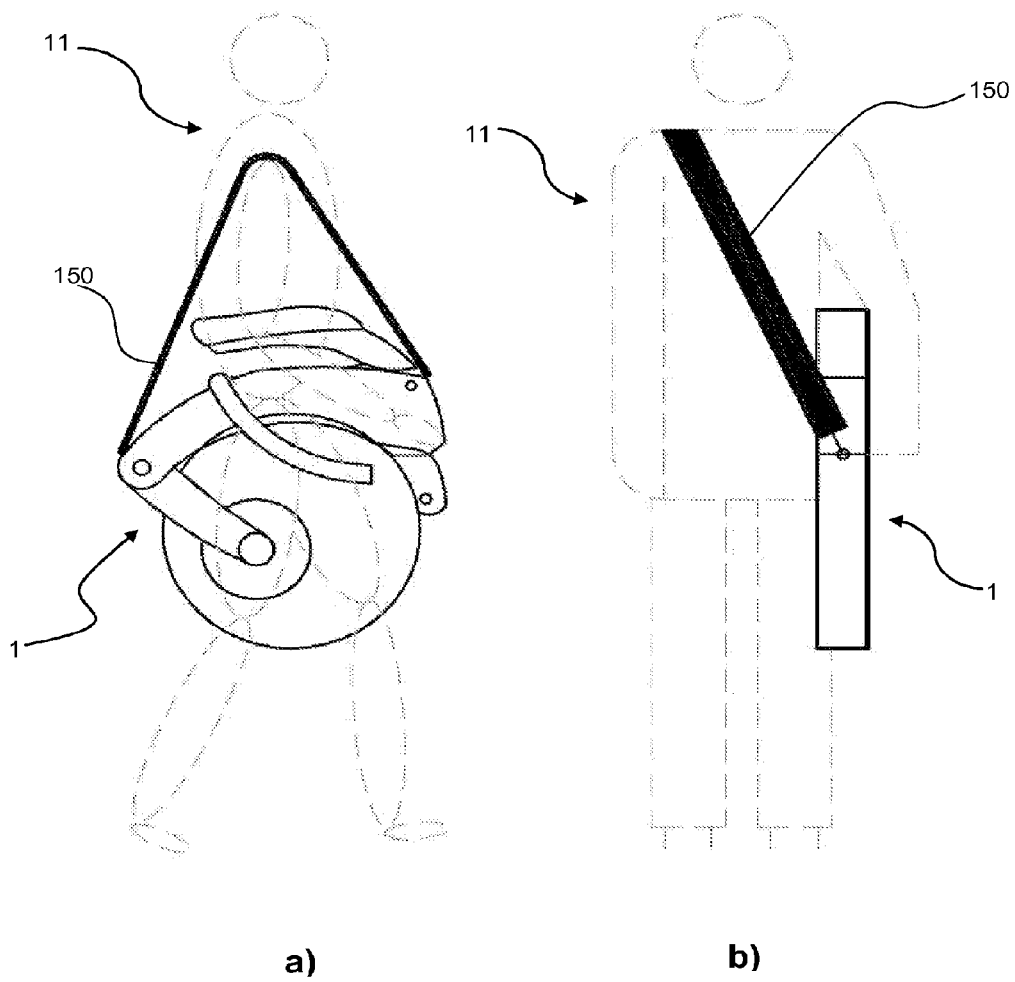
FIGS. 16a and 16b respectively show side and rear elevations of a rider carrying the cycle in the collapsed configuration.

When in the collapsed configuration shown in FIG. 15, the cycle (1) occupies a significantly smaller volume and is therefore easier to transport and store when not in use riding. The scale of the cycle (1) relative to an adult human rider (11) is shown in the representative drawings shown in FIG. 16 where the rider (11) is shown standing and carrying the cycle (1) by a strap (150) attached to the cycle (1).

The volume occupied by the cycle (1) in its erect riding configuration and collapsed configuration may be defined by a cuboid 'box' volume with planar sides touching the cycle extremities. Comparable cuboid volumes are definable for each of the major cycle components, including the wheels (5, 6), steering mechanism (8) and frame (2) assemblies. Comparison of the changes in the positions of the planes forming the box sides quantifies not only the volume changes, but also the nature of the collapsed cycle shape. As shown in FIGS. 17-21, the cycle (1) can be defined volumetrically by mutually-orthogonal parallel-pairs of vertical and horizontal planes (when the cycle (1) is positioned upright), demarcating opposed longitudinal, lateral and vertical boundary planes, respectively located at longitudinal, lateral and vertical extremities of the cycle (1) and the front wheel (5), rear wheel (6), steering mechanism (8), seat (13) and frame (2) individually. In one embodiment the longitudinal, vertical and lateral boundary planes of the front (5) and rear (6) wheels are respectively defined by the lateral, vertical and longitudinal extremities of a terrain-engaging annular tire incorporated in each of the front (5) and rear (6) wheels.

Figure 17:
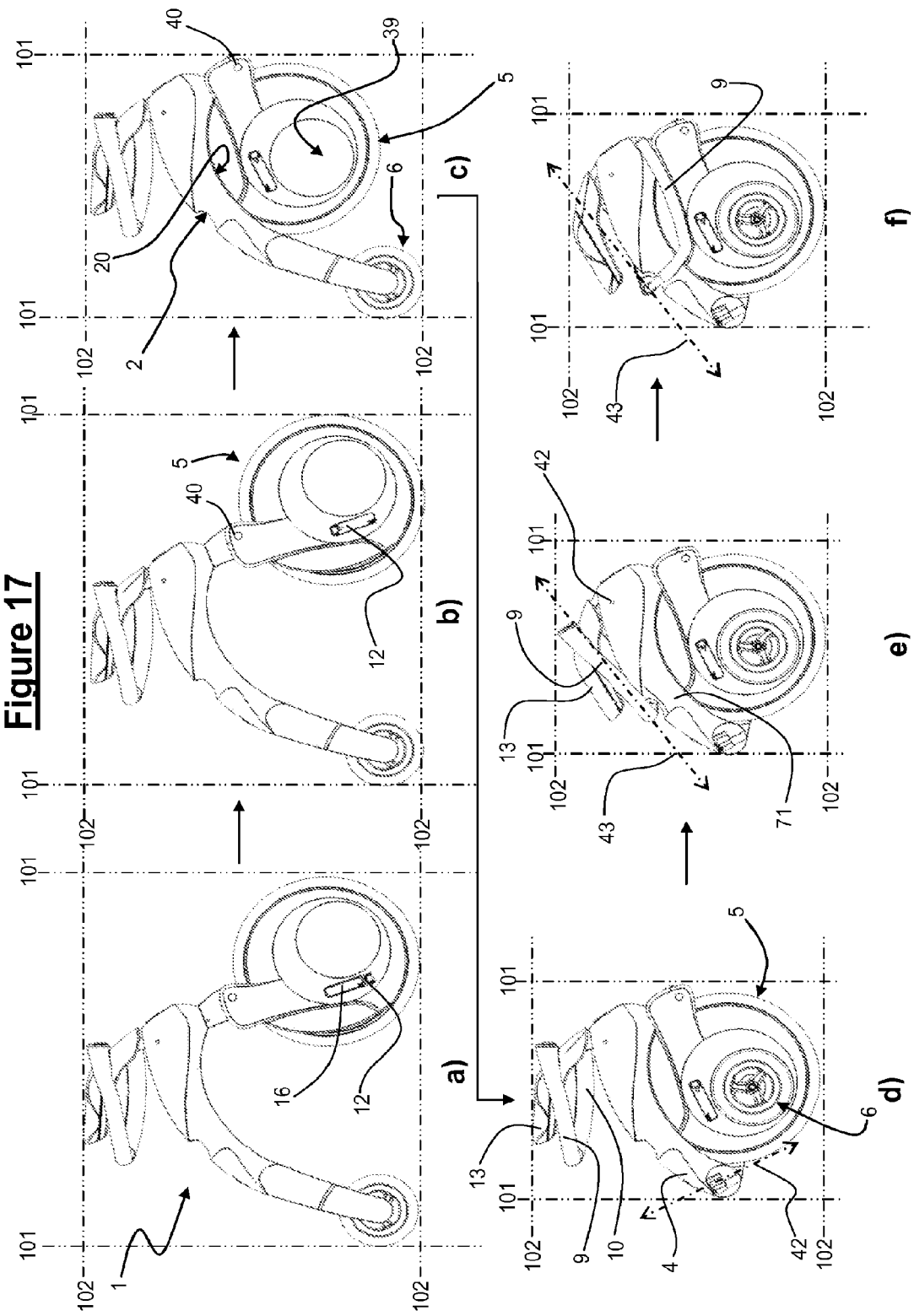
FIGS. 17a-17f show side elevations of the folding sequence of the cycle of FIG. 1 from the erect configuration (FIG. 17a) to the collapsed configuration (FIG. 17e)
Figure 18:
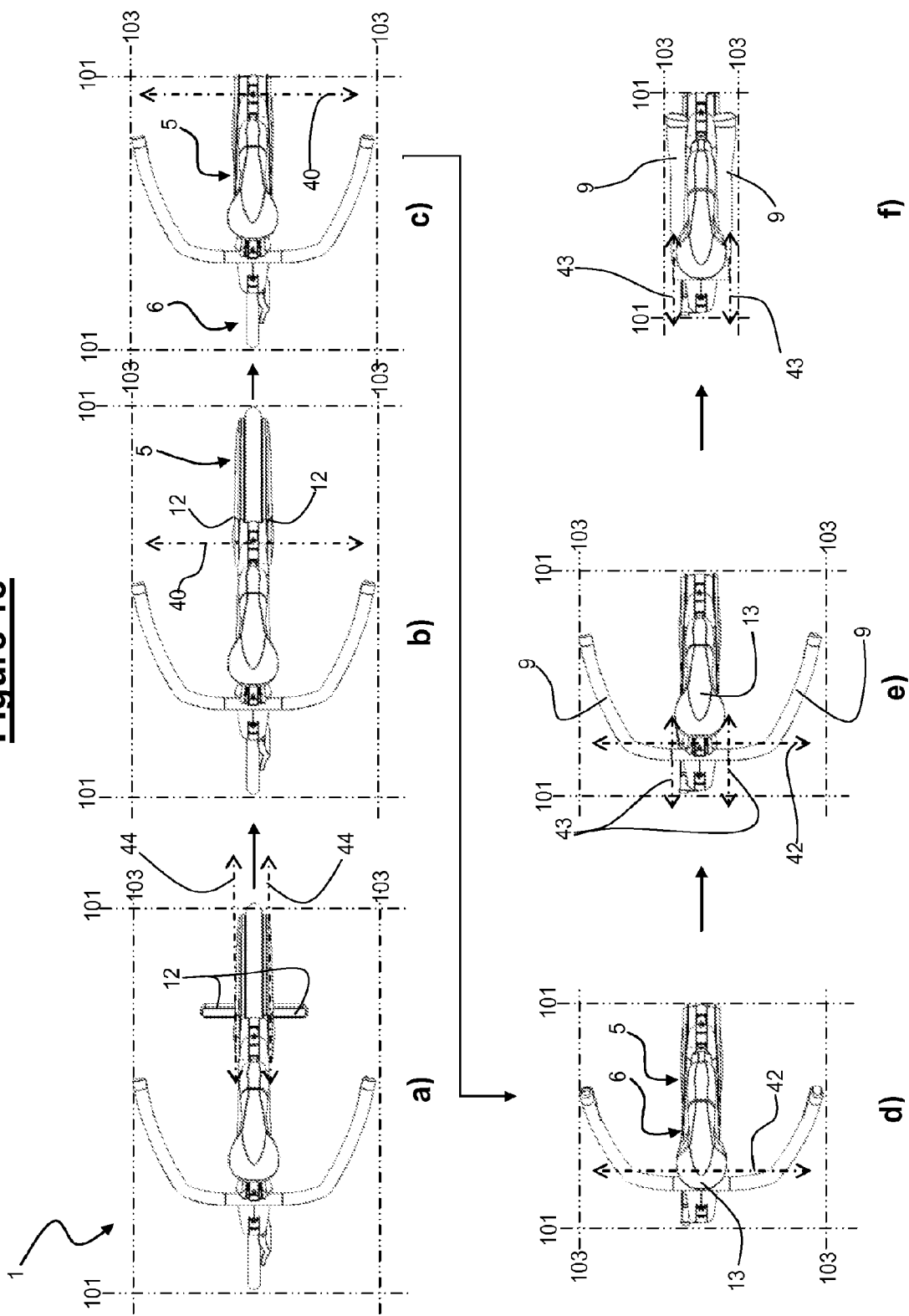
FIGS. 18a-18f show plan views of the folding sequence of the cycle of FIG. 1 from the erect configuration (FIG. 18a) to the collapsed configuration (FIG. 18f)
Figure 19:
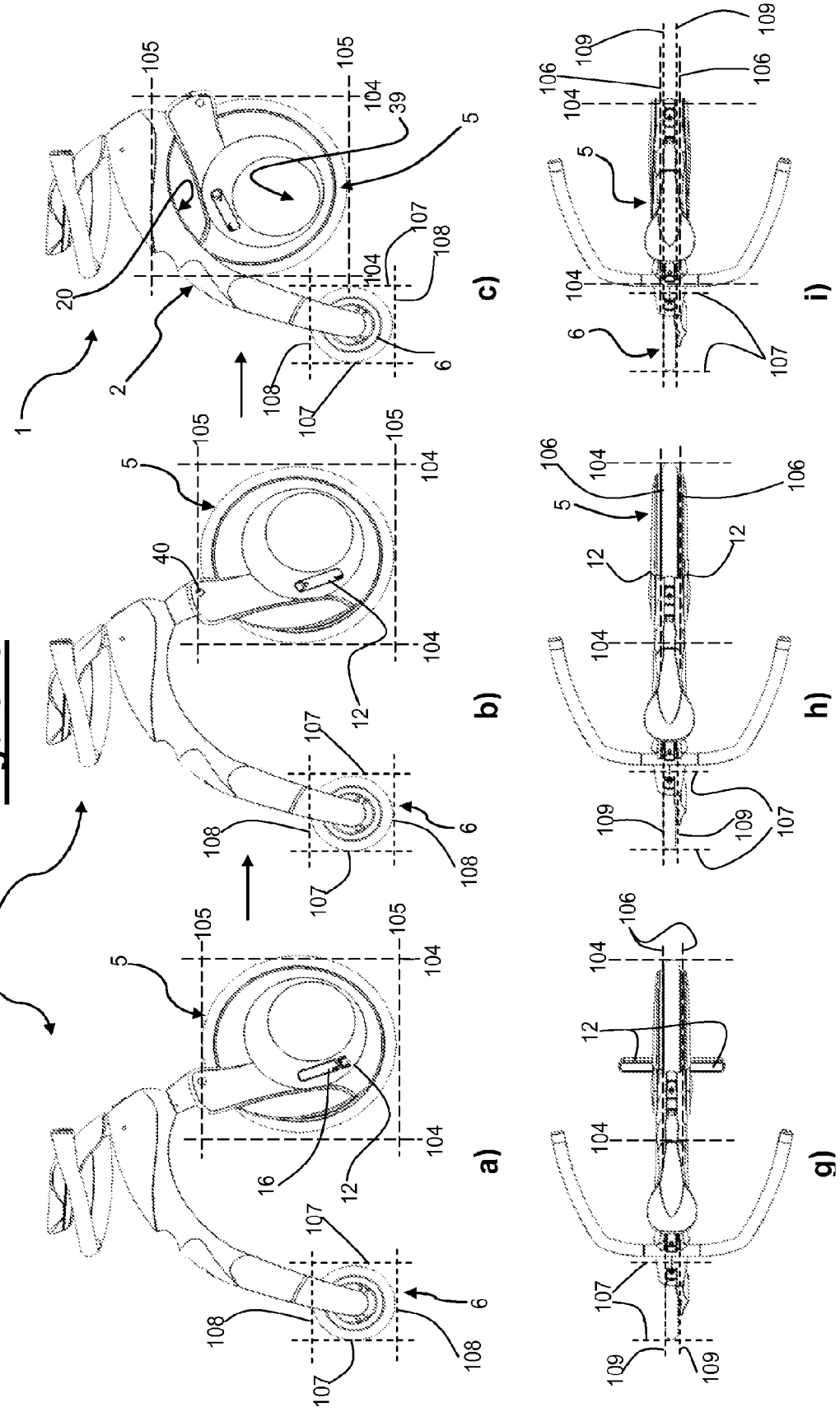
FIGS. 19a-19f show side elevations of the collapsing sequence of the cycle of FIG. 1 and the vertical and longitudinal boundary planes of the front and rear wheels.
FIGS. 19g-19l show plan views of the collapsing sequence of the cycle of FIG. 1, and the lateral and longitudinal boundary planes of the front and rear wheels.
Figure 19:
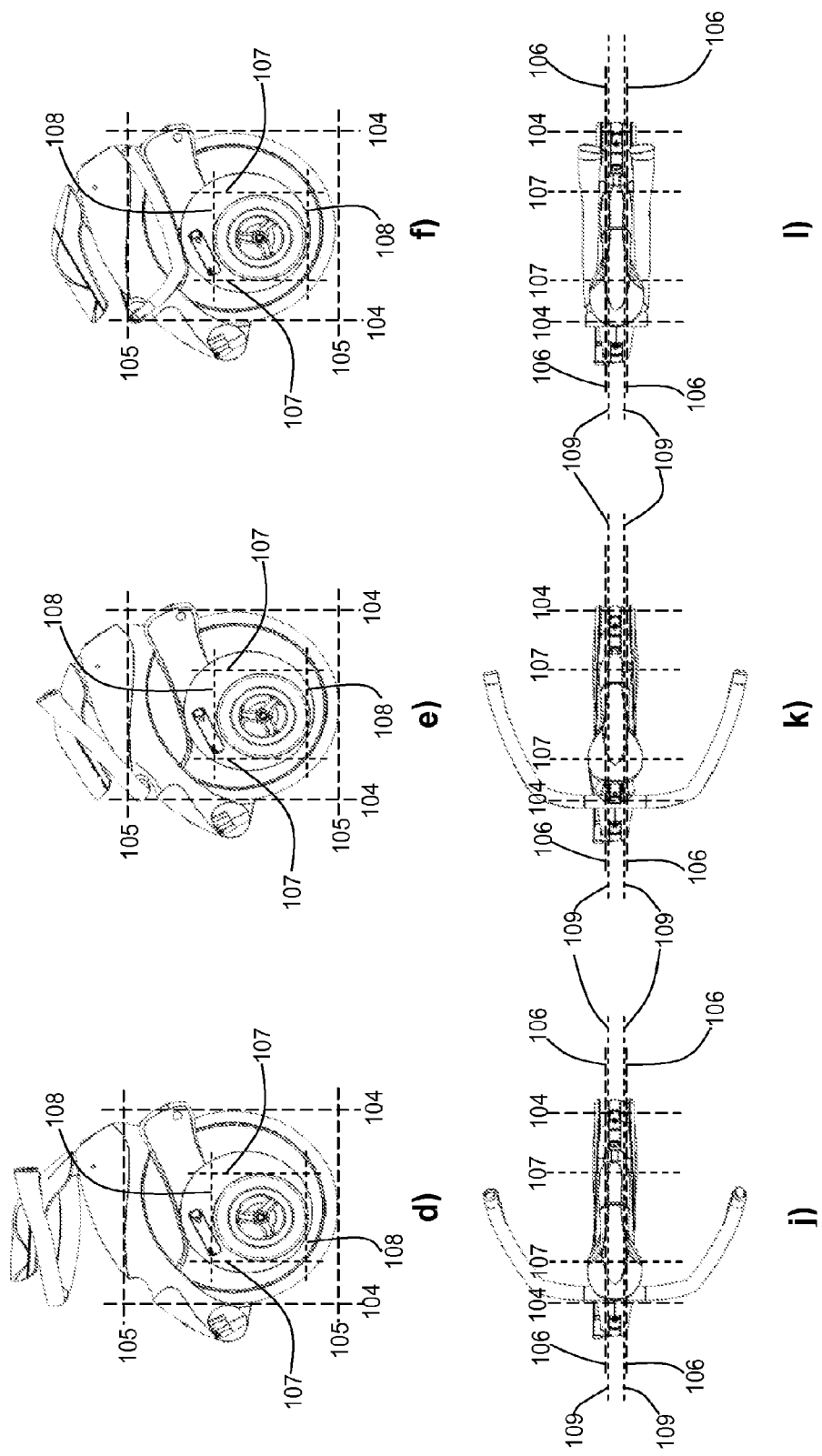
Figure 21:
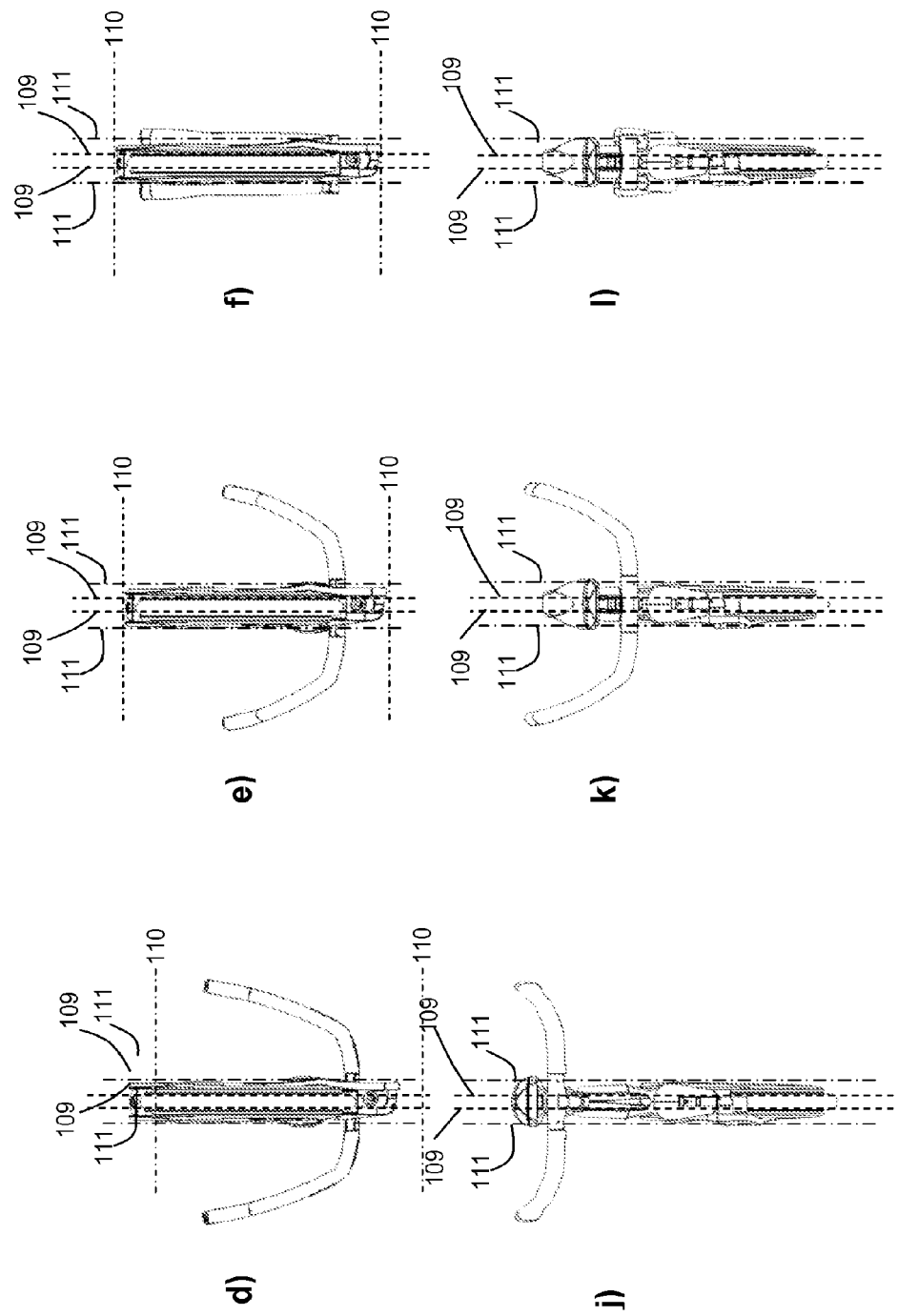
FIGS. 21a-21f show the underside of the cycle of FIG. 1 in the various stages of the collapsing sequence of the cycle along with the lateral boundary planes of the front and rear wheels and the frame.
FIGS. 21g-21l show rear elevations of the of the collapsing sequence of the cycle of FIG. 1 and the lateral boundary planes of the front and rear wheels and the frame.

The sequence in which the cycle (1) is reconfigured from the erect to collapsed configurations according to one preferred embodiment is shown in FIGS. 17 and 18 in side elevation and plan view respectively.

As mentioned previously, the cycle (1) is configured to collapse from the erect riding configuration to the collapsed configuration by pivoting the steering mechanism (8), front wheel (5), rear wheel (6), seat (13) and frame (2) into mutually closer proximity.

It will be appreciated that the sequential order in which the respective cycle components are repositioned may vary. However, one preferred method by which the cycle (1) is collapsed, and as shown in FIGS. 17-18 includes the following sequence:

1) Pivoting of the footrests (12) about the fifth fold axes (44) and inserting into mating recesses (16) to lie substantially flush with the front wheel surface. However, it should be appreciated that this step is not required in order to collapse the cycle (1), though folding the footrests (12) eliminates potential interference with the rider when they are carrying the cycle (1).
2) Pivoting of the front wheel (5) and frame (2) together about the first fold axis (40) such that the longitudinal (104) and lateral (106) boundary planes of the front wheel (5) respectively overlap a region between the frame lateral (111) and longitudinal (110) boundary planes. The front wheel (5) and frame (2) are pivoted together to insert a portion of the front wheel (5) into an arcuate recess (69) provided on the underside of the frame (2).
3) Pivoting of the rear wheel (6) and frame (2) together about the second fold axis (41) such that the lateral (109) and longitudinal (107) boundary planes of the rear wheel (6) respectively overlap a region between the front wheel lateral (106) and longitudinal (104) boundary planes and therefore also the frame lateral (103) and longitudinal (101) boundary planes.
4) Pivoting of the steering mechanism (8) and frame (2) together about a third fold axis (42) such that the steering mechanism stem (10) is positioned inside a longitudinal slot (70) in the frame (2), thereby preventing the steering mechanism (8) and the attached steering fork (7) from rotation about the secondary axis (18) relative to the frame (2).
5) Pivoting the steering mechanism handlebars (9) about a fourth fold axis (43) together toward the frame (2). Both handlebars (9) are capable of being repositioned into closer mutual proximity with the frame (2) by pivoting about the fourth fold axis (43) and inserting into mating frame handlebar recesses (71) in the frame (2). The handlebars (9) are retained in the frame handlebar recesses (71) and thereby prevent the rear wheel (6) from release from the collapsed position.

Alternatively, the cycle (1) may also be collapsed by interchanging steps 2 and 3 or steps 3 and 4.

The cycle (1) is configured to secure the front wheel (5) from rotation about the steering axis (18) during collapsing by either first pivoting the steering mechanism (8) into the recess (70), or first pivoting the front wheel (5) into the corresponding frame recess (69). It will be appreciated that the stability of the cycle (1) is impaired during the collapsing process if the front wheel (5) and steering fork (7) are allowed to rotate freely about the steering axis (18). Thus, inserting at least a portion of the steering mechanism (8) and/or front wheel (5) into the corresponding mating recesses (70) on the frame (2) effectively locks the front wheel (5) from such unwanted rotating.

As can be seen in FIGS. 17 and 18, using these methods to reposition the cycle (1) into the collapsed configuration results in the front wheel (5), rear wheel (6), steering mechanism (8) and frame (2) all being repositioned into mutually closer proximity whilst maintaining a constant, or decreased separation between the cycle lateral (103), longitudinal (101) and vertical (102) boundary planes. Moreover, the front wheel (5), rear wheel (6), steering mechanism (8), seat (13) and frame (2) are all repositioned into mutually closer proximity such that the longitudinal (101), lateral (103) and vertical (102) cycle boundary planes define a reduced volume cuboid.

The footrests (12) may be individually deployed in their riding position extended substantially perpendicular to the plane of the front wheel (5), or folded upright and inserted into mating recesses (16), substantially flush with the front wheel surface. The footrests (12) are pivotally geared together such that they both raise and lower simultaneously by moving either footrest (12), thereby reducing the number of steps required to collapse the cycle (1) relative to individually folding footrests.

The cycle (1) is thus configured to collapse from an erect riding configuration to a collapsed configuration, solely by use of pivots or hinges without any telescopic or sliding inter-movement of the various cycle components.

FIG. 17 also shows the vertical (102) and longitudinal (101) boundary plane pairs of the cycle (1) in each stage of the collapsing sequence. As can be seen in the progression from FIGS. 17a-17f, there is a significant reduction in the distance between the vertical boundary planes (102) and between the longitudinal boundary planes (101) when the cycle (1) is reconfigured from the erect configuration (FIG. 17a) to the collapsed configuration (FIG. 17f).

FIGS. 18a-18f show the same sequence as FIGS. 17a-17f in plan view and also show the reduction in distance between the lateral boundary planes (103) and between the longitudinal boundary planes (101). It can thus be seen that by repositioning the front wheel (5), rear wheel (6), steering mechanism (8), seat (13) and frame (2) into mutually closer proximity by pivoting about fold axes (40, 41, 42), the longitudinal (101), lateral (103) and vertical (102) cycle boundary planes define a reduced volume cuboid. It will also be appreciated that by repositioning just two of the aforementioned cycle components, the resultant cuboid volume defined by the cycle boundary planes will also reduce.

FIGS. 19a-19f show the vertical (105, 108) and longitudinal (104, 107) boundary planes of the front (5) and rear (6) wheels during the cycle collapsing sequence. The cycle (1) is configured such that repositioning of the front wheel (5) and rear wheel (6) into mutually closer proximity when collapsing results in the vertical (108) and longitudinal (107) boundary planes of the rear wheel (6) being located in a region between the front wheel vertical (105) and longitudinal (104) boundary planes respectively. Furthermore, as can be seen in FIGS. 19g-19l, the cycle (1) is also configured such that repositioning of the front wheel (5) and rear wheel (6) into mutually closer proximity results in both lateral boundary planes (109) of the rear wheel (6) being located in a region between the front wheel lateral boundary planes (106). In the collapsed configuration the rear wheel (6) is thereby contained entirely within the vertical (105), longitudinal (104) and lateral (106) boundary planes of the front wheel (5) and therefore the wheels (5, 6) collectively define the same volume cuboid as the front wheel (5) by itself.

FIGS. 20a-20f show plan views of the cycle (1) during the collapsing sequence while FIGS. 20g-20l show front elevations. FIGS. 20a-20l also shows the lateral boundary planes (106, 111) of the front wheel (5) and frame (2). It will be readily apparent that the repositioning of the front wheel (5) and frame (2) into mutually closer proximity results in both lateral boundary planes (106) of the front wheel (5) overlapping a region between the frame lateral boundary planes (111). Indeed, at each stage of the collapsing sequence, the front wheel lateral boundary planes (106) overlap the region between the frame lateral boundary planes (111).

FIGS. 21a-21f show underside views of the cycle (1) during the collapsing sequence while FIGS. 21g-21l show rear elevations. In a similar manner to FIGS. 21a-21l, the FIGS. 22a-22l show the rear wheel lateral boundary planes (109) overlapping a region between the frame lateral boundary planes (111).

As described previously, cycle steering may be subdivided into the following broad categories;
above seat—direct;
above seat—indirect;
below seat—direct, and
below seat—indirect.

Conventional, contemporary cycles such as that shown in FIG. 2 utilise above-seat direct steering with handlebars attached to the front wheel fork.

In contrast, in the first and second cycle embodiments shown in FIGS. 1-21 the cycle (1) has a 'below-seat' 'direct' steering configuration with the steering mechanism (8), including handlebars (9) and stem (10) positioned below and rearward of the seat (13). However, to generate the necessary degree of rotation of the front wheel (5), the arc circumscribed by the handlebars (9) at the distal end (46) of the stem (10) to the steering axis (18) may be an uncomfortable reach for some riders. Consequently, in embodiments such as that shown in FIGS. 1-21, the handlebars (9) are extended to include outer end portions or 'bar end handgrips' (46) that extend from the outer end of each of handlebar (9) and are orientated to pass around the outside of the riders thighs and/or buttocks. This handlebar configuration places the bar end handgrips (46) in closer proximity to the rider (11) throughout the range of steering movement. The handlebar configuration of the first and second embodiments thus places the handlebars (9) at the ideal position for access by the broadest range of rider (11) stature.

In a complimentary manner to conventional cycles, the ends of the bar end grips (46) also provide a convenient position to place any cycle controls, such as brakes, throttle (for externally-powered embodiments) lights and so forth.

Utilising the elongate stem (10) in the steering mechanism (8) has the effect of moving the position of the handlebars (9) closer to the rider (11) instead of being attached directly to the steering axis (18). This creates an ergonomically more effective steering input while providing a simple, reliable configuration to transfer the rotational movement of the rider's manual steering input to the steering fork (7) and front wheel (5). A rider (11) seated on the seat (13) in operative contact with the steering fork (7) (via handlebars (9) and stem (10)) and footrests (12) when the cycle (1) is in motion is thus positioned in a substantially upright posture without torso (26) inclination. Furthermore, in this configuration both seated rider's feet (28) are able to simultaneously reach the terrain surface (36) when the cycle (1) is stationary.

The handlebars (9) (including any and bar end grips (46) extend laterally outside the width of the rider's torso to a sufficient extent to allow the rider to provide adequate torque to the stem (10) and steering fork (7) to steer the cycle (1) whilst being within easy reach of the rider's hands (30). It will be apparent that this handlebar location provides a very natural position for operation by the rider's relaxed arms in an unstressed position either side of the rider's torso (26). The handlebars (9) are also located rearward of the rider's shins (47) and below the rider's thighs (48). The steering mechanism (8) thus provides a cycle (1) with a substantially unobstructed region forward of the rider's legs. Therefore, when the rider (11) has their feet (28) positioned on the footrests (12), the steering mechanism (8) is located below and behind the rider's entire body and thereby ensures that there are no obstructions or encumbrances forward of the rider's legs which would hinder mounting and dismounting of the cycle (1) and provide an entanglement hazard during collision or rapid deceleration As mentioned previously, steering may also be partially or fully effected by the rider pushing against the footrests (12)

and/or the sides of the front wheel (5) to provide steering input. It can be easily contemplated however that solely using the footrests (12) for steering obviously requires greater dexterity and strength than using the handlebars (9).

Figure 14:
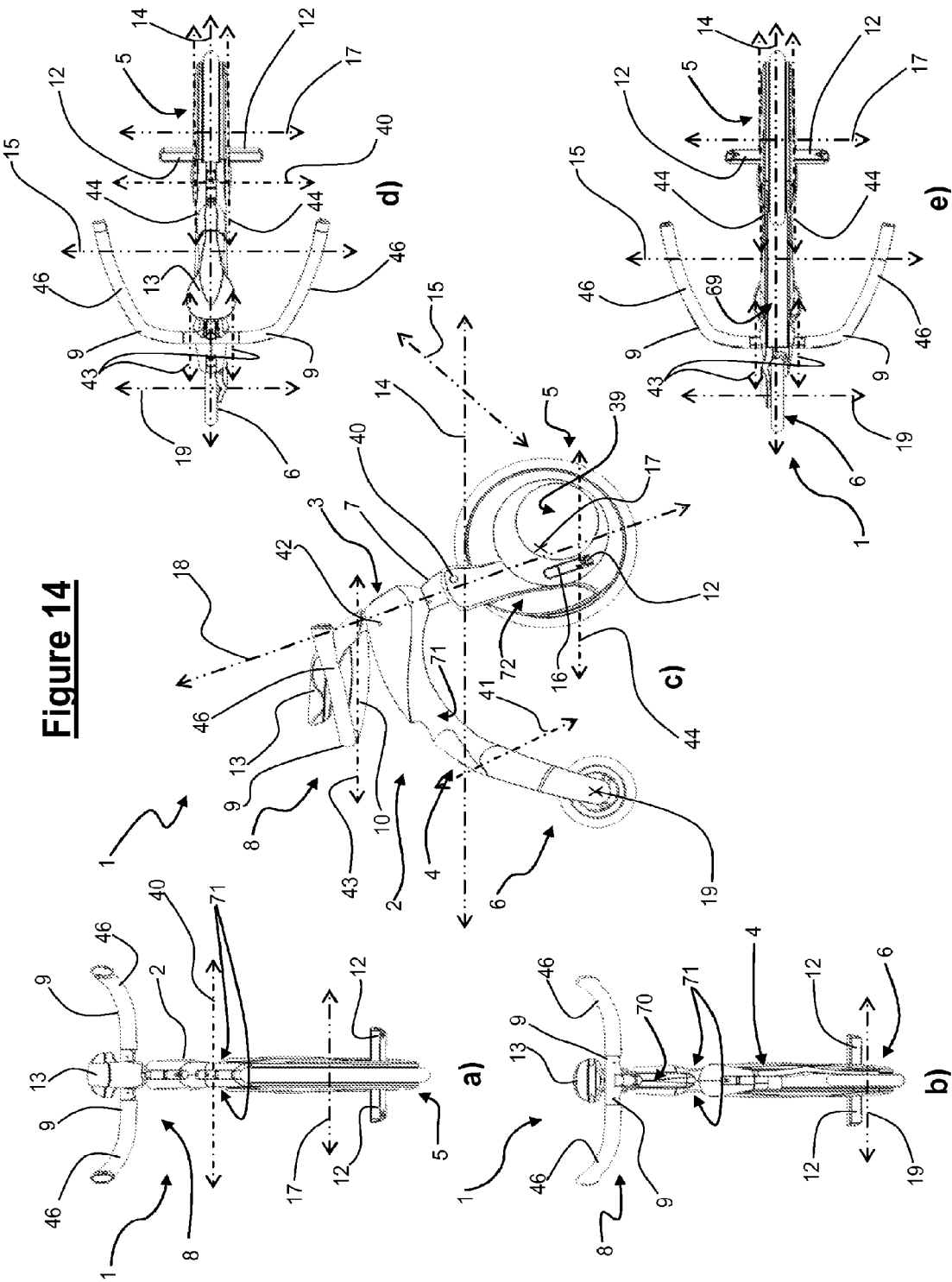
FIGS. 14a-14e respectively show front, rear, side, plan, and underside views of the cycle of FIG. 1 in the erect configuration.

The handlebars (9), stem (10) and seat (13) are centrally mounted to the frame (2) for rotation about a third fold axis (42) that is displaced from the steering axis (18), as shown more clearly in FIG. 14. The handlebars (9) are connected to the steering fork (7) by the stem (10) which extends from the steering axis (18) to the handlebars (9). The stem (10) is connected to the steering fork (7) by a universal joint (50) enclosed within the frame (2). This universal joint (50) transfers the rotational movement of the bar end grips (46), handlebars (9) and stem (10) to the steering fork (7) to generate corresponding rotational movements of the steering fork (7) and front wheel (5) about the secondary axis (18) in the same direction as the handlebars (9).

As the stem (10) provides a direct connection to the steering fork (7), there is no need to change the direction of handlebar rotation to correspond with the desired front wheel rotation as in indirect steering configurations. The universal coupling (50) also allows both the stem (10) and the seat (13) to pivot about the same third fold axis (42) during collapsing.

Figure 22:
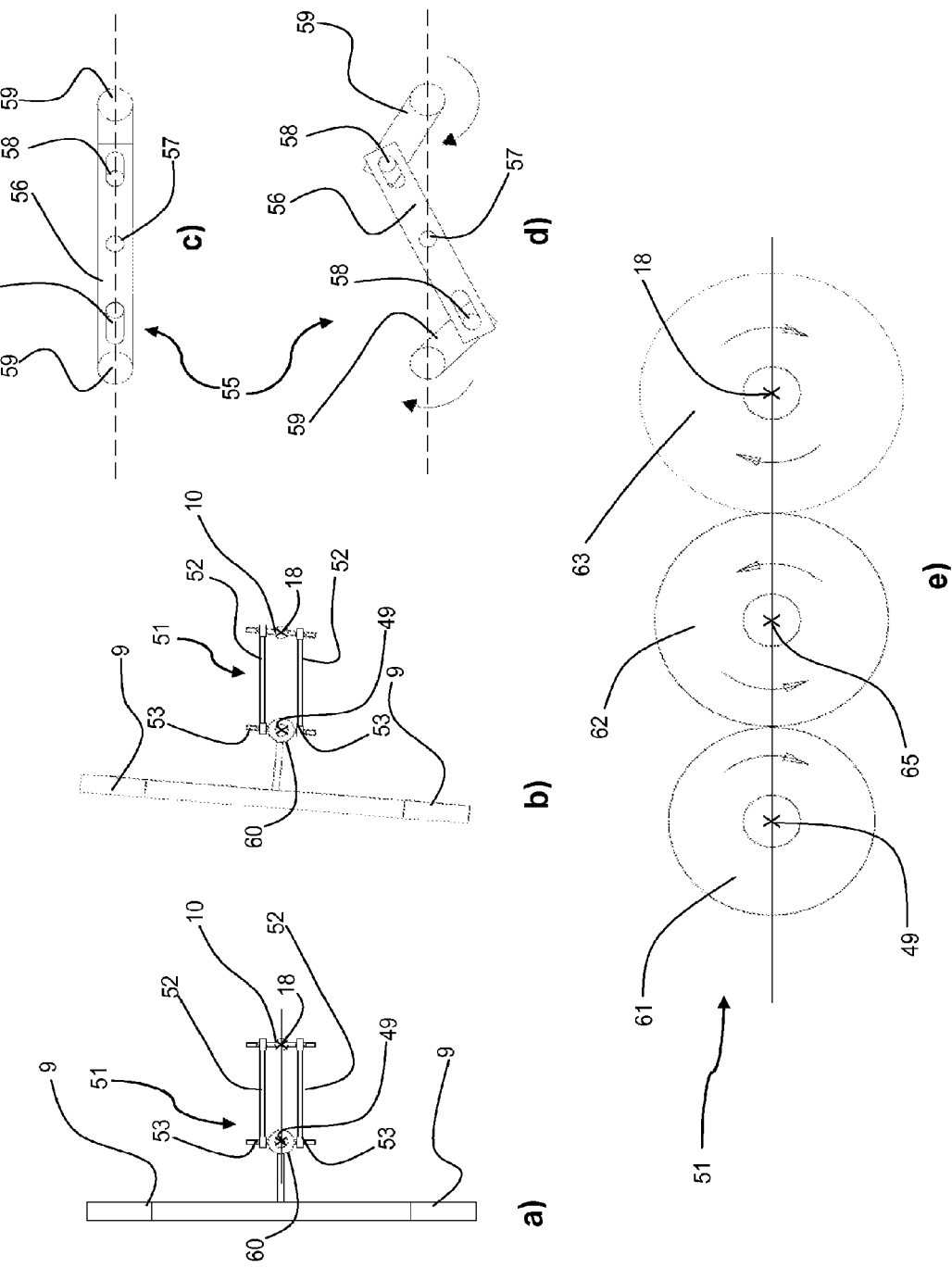
FIGS. 22a-22e show variations of steering mechanisms for use with the cycle of FIG. 1.
Figure 23:
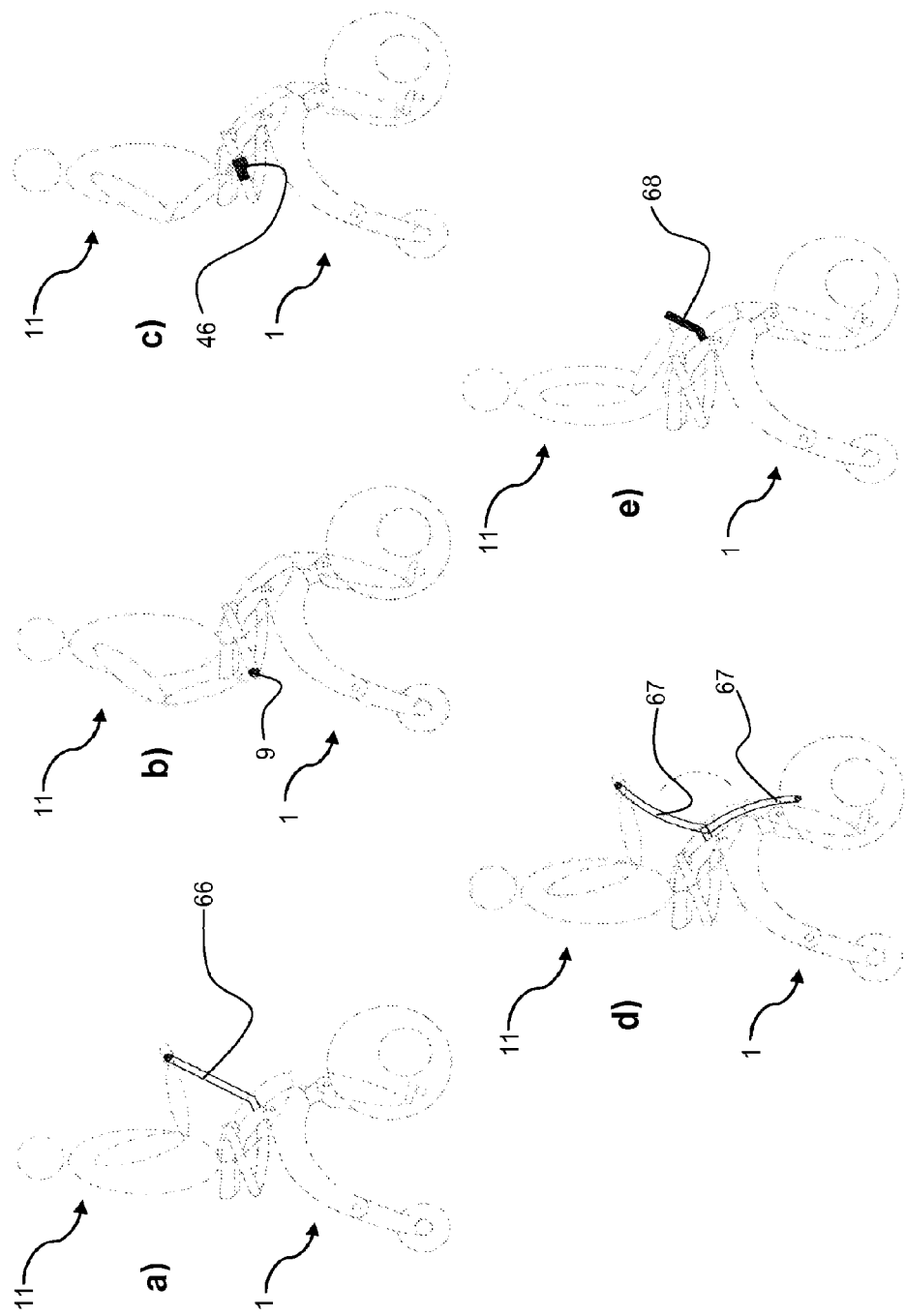
FIGS. 23a-23e show side elevations of alternative steering mechanism positions in comparison with the cycle steering mechanism shown in FIG. 1.

When the steering mechanism handle bars (9) are configured to rotate about a separate axis to the steering axis (18) a transfer coupling is used to transfer the rotational movement of the handlebars (9) to the steering fork (7) whilst maintaining the congruence between the rotation direction of the separate pivot axis. Three examples of transfer couplings (51) are shown in FIG. 22. FIGS. 22a and 22b show a transfer coupling (51) in the form of a pair of substantially parallel tie rods (52) attached to stubs (53) located on opposing sides of a rotatable collar (54) at the quaternary pivot axis (49) about which a pair of handlebars (9) rotate to effect steering. Rotational movement of the handlebars (9) is transmitted to the front wheel (5) via the tie rods (52) also being attached at their opposing ends to corresponding stubs (53) attached to the top portion of the steering fork (10).

FIGS. 22 c)-d) show schematically an alternative transfer coupling (51) embodiment, in the form of an articulated linkage (55) formed from a central link (56) constrained to pivot about a centre pin (57) and attached at both ends via pivotal sliding fittings (58) to stub shafts (59) attached to the collar (60) and steering member (7).

FIG. 22e shows a further well established transfer coupling in the form of three contra-rotating surfaces (62, 63, 64) attached for rotation at the quaternary pivot axis (49), an intermediate axis (65) and the steering axis (18) respectively. These contra-rotating surfaces (62, 63, 64) provide a mechanical advantage to the steering, whereby a given rotational movement of the steering mechanism about quaternary axis (49) produces a reduced rotational movement of the steering fork (7) about the secondary axis (18).

It will be readily appreciated numerous further alternative configurations may be employed to translate the movement of the steering mechanisms into corresponding movement of the front wheel (5) including geared shafts, universal joints, belts, pulleys and so forth. Moreover, the steering mechanism need not necessarily be a pair of handlebars (9) but may be formed from, levers, pulleys, cable with user handles and the like. Such non-rigid steering mechanisms lend themselves to compaction when folding the cycle, whilst presenting minimal obstruction or entanglement hazard in the event of a crash or emergency dismount. The movements associated with such alternative steering mechanisms may be configured to provide a range of unorthodox physical exercises for a rider in comparison to movements of conventional handlebars in a substantially horizontal plane.

It will also be appreciated that numerous alternative handlebar (9) configurations may be used and five examples are shown in FIGS. 23a-23e, overlaying a preferred embodiment of the present invention cycle (1) shown in phantom for comparison purposes.

FIG. 23a shows a fixed, above seat, direct handlebar configuration (66) comparable to conventional cycle handlebars with a central stem (10) extending to an orthogonal handlebar pair (9) forward of the rider (11). However, it will be readily appreciated that this configuration introduces the aforementioned disadvantages of conventional cycle handlebar configurations in the event of a rapid dismount.

FIG. 23b shows a pair of handlebars (9) that are positioned rearward of the seat (13) and extend orthogonally from stem (10). This configuration has many of the advantages of below-seat steering together with more simplified, compactable handlebars (9). However, this reduces the possible steering arc as the rider's arm movement is restricted by their torso (26). In contrast, the first and second preferred embodiments have bar end hand grips (46) that extend from the handlebars (9) to avoid this problem. The provision of bar end grips (46) extending either side of the rider's body allows the rider to scribe a steering arc of more than 180 degrees with each hand capable of holding a corresponding bar end grip (46) from behind their torso, across their thighs and over the longitudinal axis of the cycle frame (2) to the opposing side.

FIG. 23c shows handlebars (9) with short bar end hand-grips (46) that allow the rider to rotate the handlebars (9) about a larger arc than the straight handlebars (9) shown in FIG. 23b.

FIG. 23d shows an embodiment with a collapsible, above-seat, direct handlebar configuration (67) similar to that shown in FIG. 23a but having a handlebar stem (10) that is pivotable relative to the frame (2) to allow the handlebars (9) to be folded downwards in the collapsed configuration to reduce cycle volume. The stem (10) is curved to lie along the frame (2) and front wheel (5) in the collapsed configuration. However, this handlebar configuration still has the aforementioned disadvantages of conventional above seat cycle handlebar configurations during riding.

FIG. 23e shows a further embodiment with a steering configuration with a joystick (68) positioned between the rider's legs forward of the seat (13). Alternatively, the joystick (68) may be positioned on one side of the rider. The use of a joystick (68) allows the steering mechanism (8) to be operated by a single hand, though involves disadvantages through increased complexity, and reduced available mechanical torque.

Figure 24:
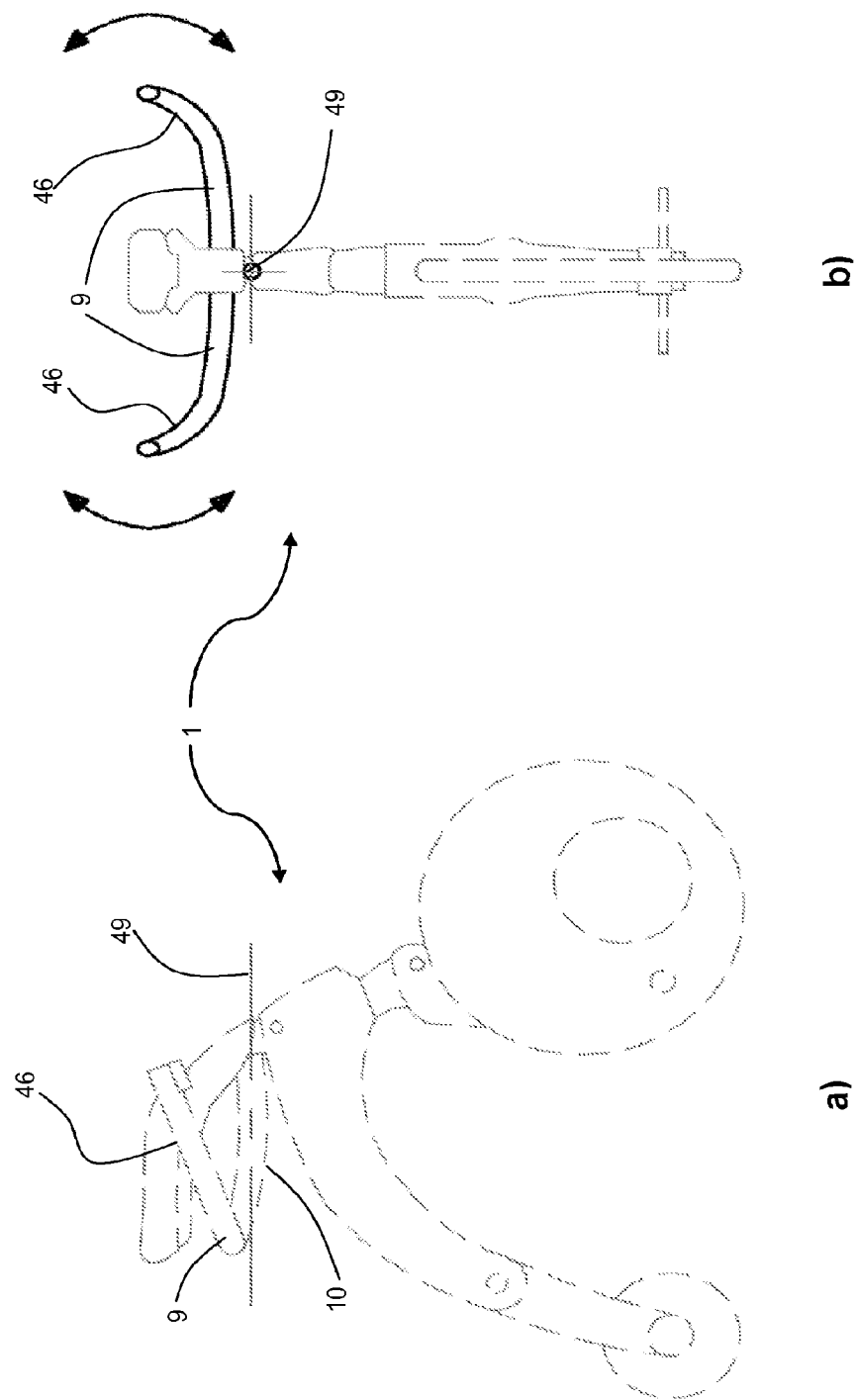
FIGS. 24a and 24b respectively show an alternative 'vertical' steering mechanism for use with the cycle of FIG. 1.
Figure 25:
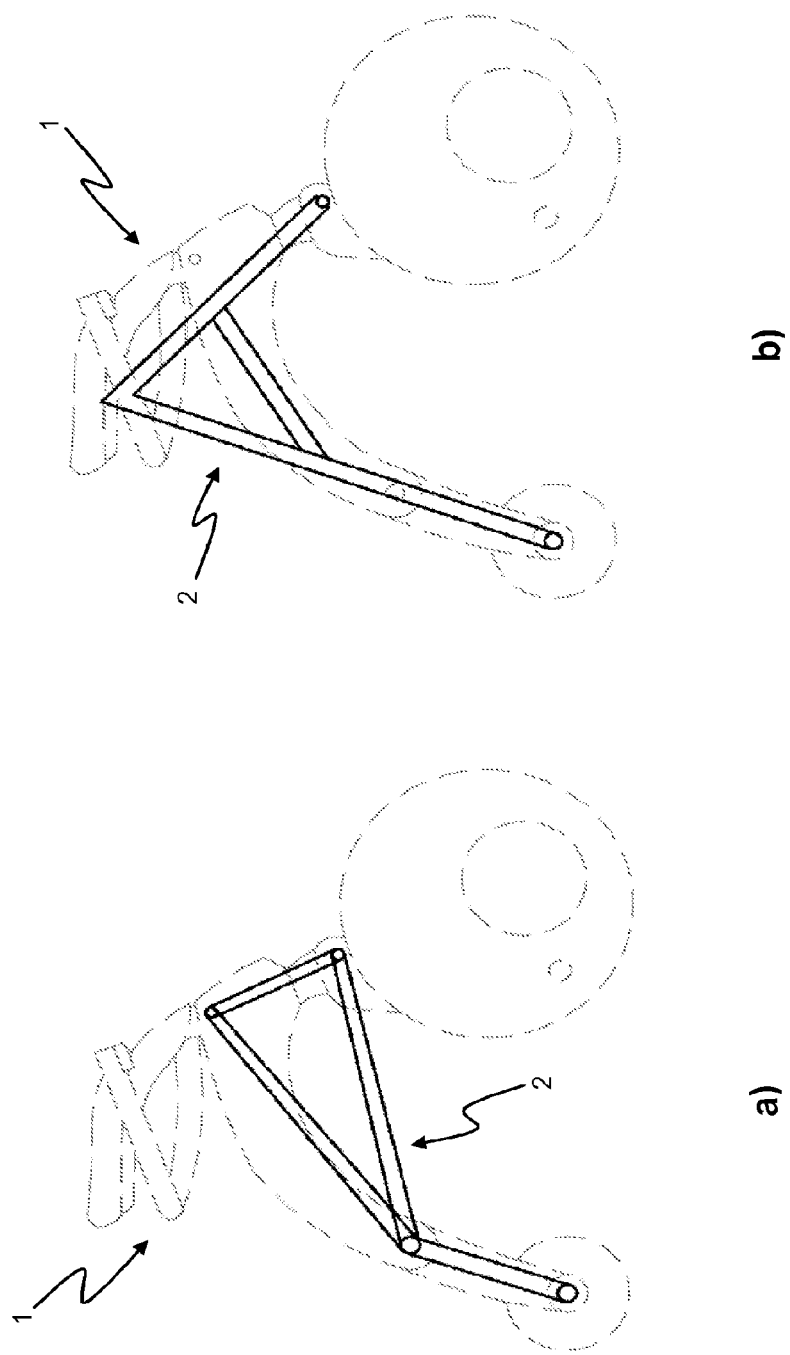
FIGS. 25a and 25b show symbolic representations of cycle frames according to two further embodiments of the present invention, in comparison with the cycle of FIG. 1.

Another embodiment is shown in FIG. 24 of a steering mechanism (8) utilising handlebars (9) attached to a stem (10) that is pivotable about a quaternary axis (49) that is coaxial with the longitudinal axis of the stem (10). A transfer coupling (not shown) is provided to connect the stem (10) to the steering fork (7) and has a meshed gearing connection that transfers the pivoting movement (see FIG. 24b) of the handlebar end grips (46) about the quaternary axis (49) to rotational movement of the steering fork (7) about the steering axis (18). Thus, a rider may push or lift the handlebar end grips (46) on either side of the frame to rotate the steering fork (7) to turn the wheel (5).

It will again be appreciated that the demonstrated embodiments are merely exemplary and numerous alternative embodiments may be configured to incorporate the inventive aspect of the present invention. Thus, in alternative embodiments (not shown), the cycles (1) may be equipped with steering mechanisms acting on the front (5) and/or rear (6) wheels. It will be readily understood by one skilled in the art however, that rear-wheel cycle steering is very difficult to configure to achieve satisfactory stability.

As described previously, the first and second preferred embodiments of the present invention have a substantially arcuate frame (2) with a central section shaped with a recess (69) (shown in FIG. 14) corresponding to the outer perimeter of the front wheel (5). The front wheel (5) also has a footrest recess (16) (shown in FIG. 14) for retaining the footrests (12) and an aperture (39) for retaining the rear wheel (6). The frame (2) also has recesses (70, 71) (shown in FIG. 14) capable of respectively accepting insertion of the stem (10) and handlebars (9) respectively While the arcuate frame shape offers an essentially mirrored profile shape to the outer portion of the front wheel (5) to aid co-operative mating, it will be appreciated that alternative frame shapes and constructions are also possible without departing from the scope of the present invention. For example, two alternative frame shapes are shown schematically in FIGS. 25a and 25b and have an essentially tubular framework construction. Therefore, in one embodiment, in the collapsed configuration, the front (5) and/or rear (6) wheel may be configured to pivot alongside the frame (2) rather than inserted into recesses in the frame (2).

Figure 26:
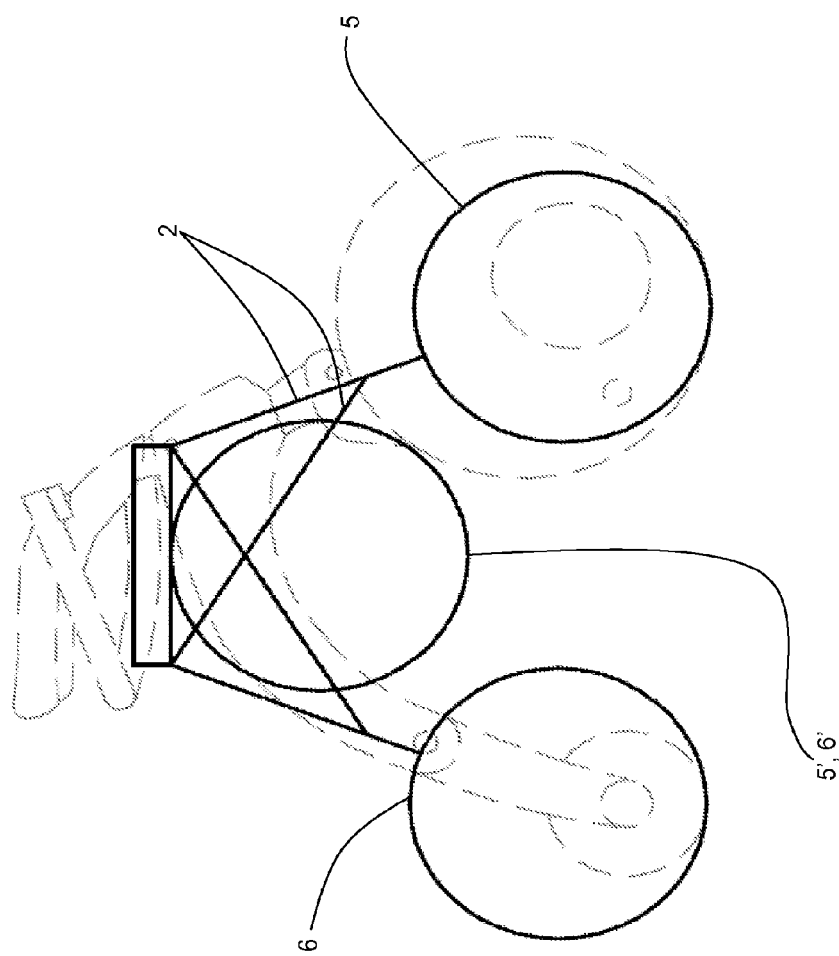
FIG. 26 shows a cycle according to another embodiment of the present invention, in comparison with the cycle of FIG. 1.

FIG. 26 shows another alternative embodiment where the front (5) and rear (6) wheels are identically sized and the frame is laterally asymmetric where the front (5) and/or rear (6) wheel are pivotable alongside each other, rather than inserted into the frame (2).

Further possible variations in wheel size are shown in FIGS. 27a-27e which respectively show the wheel-size variations relative to the second cycle embodiment shown in phantom. In comparison to said second embodiment, these variations respectively show:
 a) smaller front wheel (FIG. 27a);
 b) larger front wheel (FIG. 27b);
 c) significantly smaller front wheel (FIG. 27c);
 d) smaller rear wheel (FIG. 27d), and
 e) larger rear wheel (FIG. 27e).

Figure 27:
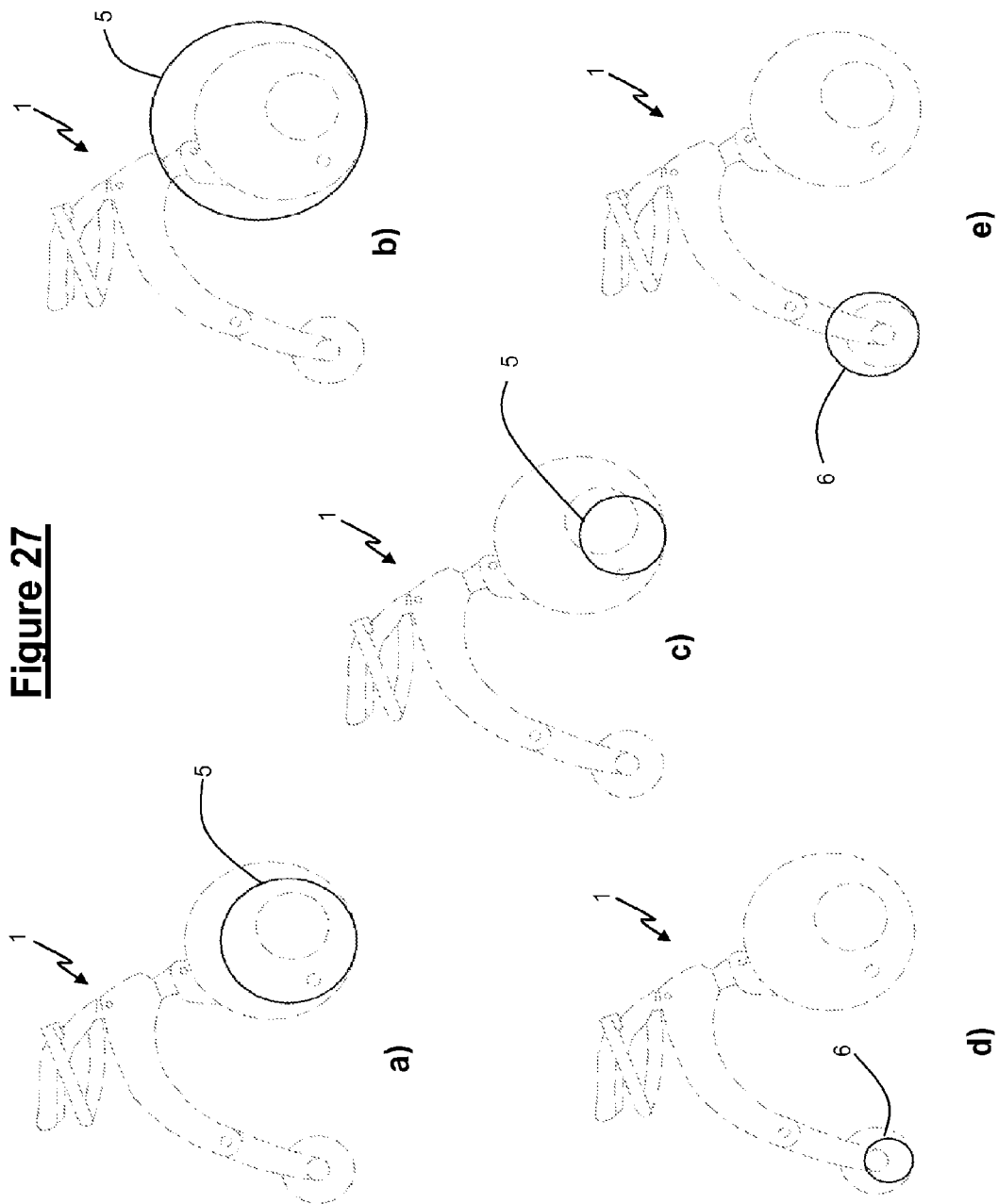
FIGS. 27a-27e show side elevations of the cycle of FIG. 1 with examples of variations in wheel sizes.
Figure 28:
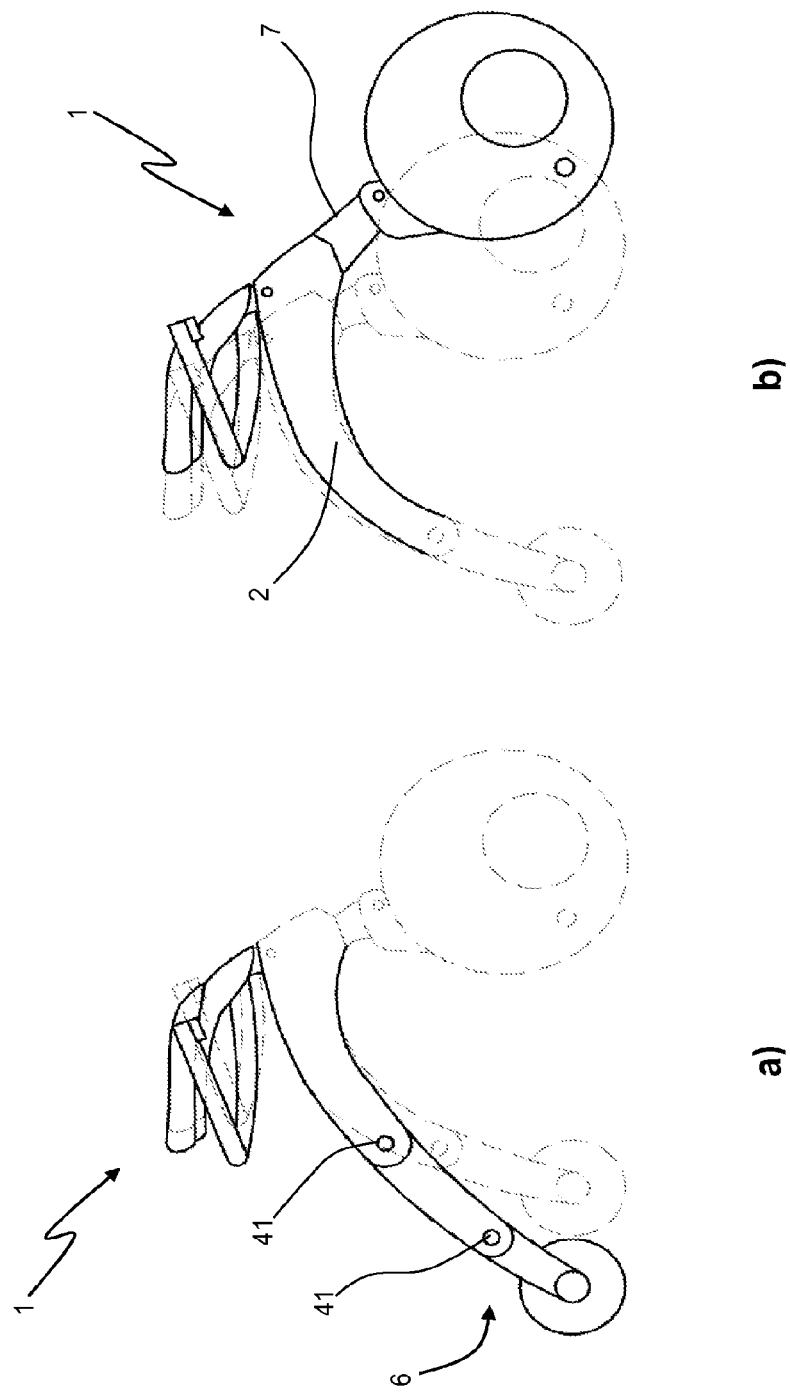
FIGS. 28a-28b show a cycle according to yet another embodiment of the present invention, in comparison with the cycle of FIG. 1.

In each of the aforementioned embodiments shown in FIG. 27, the front wheel (5) is larger than the rear wheel (6) and therefore can be considered comparable to the 'mini-farthing' wheel configuration as previously mentioned. However, it should be appreciated that a reverse configuration is also possible with the rear wheel (6) is larger than the front wheel (5).

The frame-size and wheel-base may also be varied without departing from the scope of the present invention. Two examples of frame variations are shown in FIG. 28a and FIG. 28b, whereby the cycle (1) wheelbase is increased by extending the rear (4) and front frame portion (3) respectively.

FIG. 28b shows one embodiment of a cycle (1) with a relatively elongated frame (2) and a steering axis (18) reclined at a shallower angle than the comparable second embodiment (shown in phantom). This configuration thus provides a cycle (1) with a longer wheel-base which may be suited for higher speed applications or for aesthetic reasons. However, the longer frame of the cycle (1) results in a larger volume when folded.

FIG. 28a shows an embodiment of a cycle (1) with a similar length wheel-base as the cycle (1) shown in FIG. 28b but with a rear wheel (6) connected to the frame (2) via two fold axes. This cycle (1) provides a longer wheel-base than the comparable second embodiment (shown in phantom) whilst still providing a significant reduction in occupied volume when in the collapsed configuration.

It will thus be readily apparent that variations may be made to the frame and wheel configurations without departing from the scope of the inventive aspects of the present invention.

While not explicitly shown in the Figures, the cycle (1) may be optionally fitted with front and/or rear brakes of known type to effect deceleration.

The present invention embodiments shown in FIGS. 1-37 have a hubless front wheel (5) with an aperture (39) in which the rear wheel (6) is inserted in the collapsed configuration. It will be appreciated that numerous hubless wheel designs may be utilised with the present invention, particularly when employed as the larger front wheel (5). However, in general the hubless front wheel (5) will have a tire (73) extending about an annular outer wheel rim portion (74) that is rotatable on bearings (75) provided about the circumference of the central portion (76) of the front wheel (5) which is connected to the steering fork (7).

Figure 29:
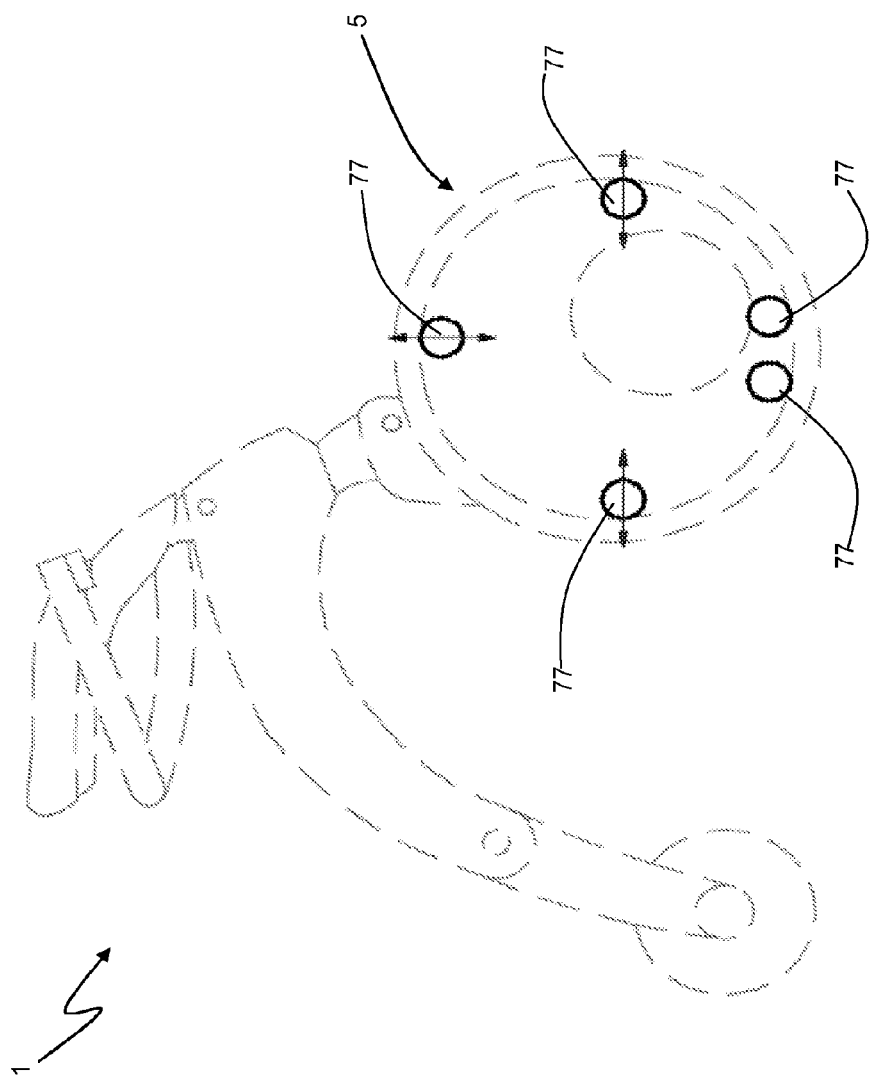
FIG. 29 shows a side elevation of front wheel bearings of the cycle of FIG. 1.
Figure 30:
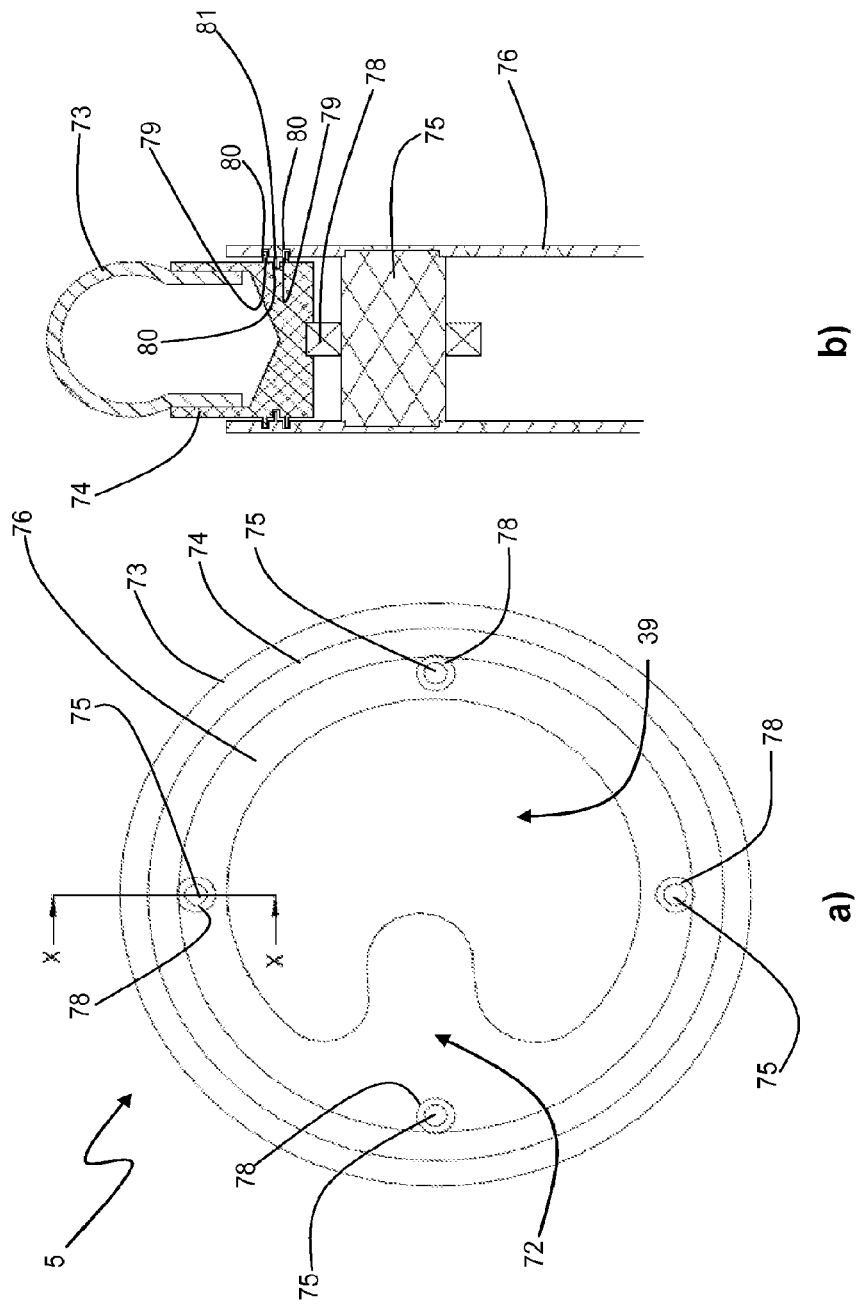
FIGS. 30a and 30b respectively show a side elevation and corresponding cross-section of a front wheel for use on the cycle of FIG. 1.

FIGS. 29 and 30 show two alternative embodiments of bearing configurations for the hubless front wheel (5). The front wheel (5) of FIG. 29 has five roller bearings (77) located about the circumference of the front wheel centre portion (76) at the top front and rear of the front wheel (5). Two of the bearings (77) are located at the bottom of the front wheel (5) where the tire (73) engages the terrain surface to accommodate the additional load experienced at this portion of the wheel rim (74). The rim portion (74) and tire (73) are thus rotatable about the centre portion (76) about the primary axis (17).

The hubless front wheel (5) shown in the embodiment in FIGS. 30a and 30b has four ring bearings (78) on which the annular rim portion (74) is rotatably supported. These bearings (78) are located at the top, front, rear and bottom of the front wheel (5). FIG. 30b shows a vertical cross-section of a portion of the front wheel (5) and shows the tire (73) attached to the annular rim portion (74). The annular rim wheel portion (74) has two lateral annular flanges (79) that mate and slide within corresponding annular slots (80) in the centre portion circumference. Similarly, an annular flange (81) on the centre portion circumference mates with an annular slot on the rim portion (74). These mating flanges (79) and slots (80) serve to guide and retain the rim portion (74) about the centre portion (76) as the rim portion (74) rotates about the bearings (78). The rim portion (74) is thus slideably and rotatably attached to the centre portion (76) for rotation about the primary axis (17).

In the first and second preferred embodiments of the present invention the cycle (1) has an externally-powered drive mechanism (38) that drives the front wheel (5) to propel the cycle (1). In preferred embodiments described herein, the drive mechanism (38) includes an electric motor (82) mounted in the front wheel (5) in a drive mechanism housing/front wheel centre portion (76). However, it should be appreciated that an internal combustion engine or other sufficiently compact motive engine may also be utilised.

The drive mechanism (38) in use with the cycle (1) is shown schematically in FIG. 31a and includes an electric motor (82) having a rotor (83) connected via a belt (84) to a rim-engaging drive gear (85) that is coupled to the front wheel rim portion (74) to effect front wheel rotation when the electric motor (82) is activated. The electric motor (82) is located eccentric to the primary axis (17) about which the front wheel (5) rotates and is connected to rotate the drive gear (85) about an axis that is parallel to and rearward of the primary axis (17). In an alternative embodiment (not shown) the drive mechanism (38) could be rotatably engaged via an intermediate gear to a drive gear to drive the rotatable outer rim. The outer rim and drive gear may both be configured with a toothed engagement interface, or a smooth frictional contact.

To further ensure the collapsed cycle presents a sleek, sealed cycle free from exposed chains, belts, gears and the like, the outer rim portion (74) and associated drive mechanism (38) are enclosed in a common housing formed as part of the centre portion (76) of the front wheel assembly (5) with the steering fork (7) being attached to this housing (76). Also accommodated in the housing (76) is an electrical power source (86) (e.g. a battery or fuel cell) and control circuitry (87) for respectively powering and controlling the electric motor (82). The control circuitry (87) is operatively connected to an accelerator (and optionally a brake) controls (not shown) operable by the rider (11).

The hubless front wheel (5) of the cycle (1) combined with a collapsible mini-farthing wheel configuration enables a significantly smaller frame to be utilised which may be specifically configured to mate with the collapsed wheel-in-wheel configuration. Moreover, recent advances in battery technology and miniaturisation have led to electric batteries that are capable of outputting substantial power to operate an electric motor (82) for long periods of time. Thus, in conjunction with the innate benefits of compactness, lightness and performance, certain embodiments of the present invention provide a cycle (1) that is capable of being entirely powered by an electric motor (82) with a battery power source.

It will also be appreciated that front-wheel drive of the cycle (1) enables a conventional external rear-wheel chain drive to be omitted whilst also simplifying the dimensional, structural and geometric requirements for the frame (2). However, driving the front wheel (5) directly by placement of the drive mechanism (38) at the primary axis (17) places constraints on the maximum practical wheel size, seating position and manoeuvrability. Therefore, the eccentric placement of the drive mechanism addresses these shortcomings and enables an optimised front wheel size to be employed without compromising the most ergonomically efficient placement and size of the foot rests (12) with respect to the ground and the rider.

It should be appreciated however, that alternative drive configurations are also possible. For example, the cycle (1) could be configured with a single externally-powered drive mechanism that applies motive power to both the front (5) and rear (6) wheels or separate drive mechanisms could power the front (5) and/or rear (6) wheels.

FIG. 31b shows one embodiment of a cycle (1) with a drive mechanism (38) provided in the form of a pedal crank mechanism (88) rotatable about an axis eccentric to the primary axis (17). The pedal crank mechanism (88) can be coupled to the annular rim portion (74) in numerous ways which will be discussed further below.

FIG. 31c shows a cycle (1) embodiment with a combination of the electric drive mechanism (82) of FIG. 31a with the pedal-crank mechanism (88) of FIG. 31b. This configuration allows the rider to use either or both drive mechanisms (82, 88) to power the cycle (1). Typically, the use of an additional drive mechanism will be as a supplementary drive mechanism, e.g. an electric drive mechanism (82) supplementing the pedal-powered drive mechanism (88) or vice versa. Such a supplementary drive mechanism may assist the rider in steep ascents and optionally be configured to provide retardation and/or electro-motive power generation during descents and/or braking.

Figure 32:
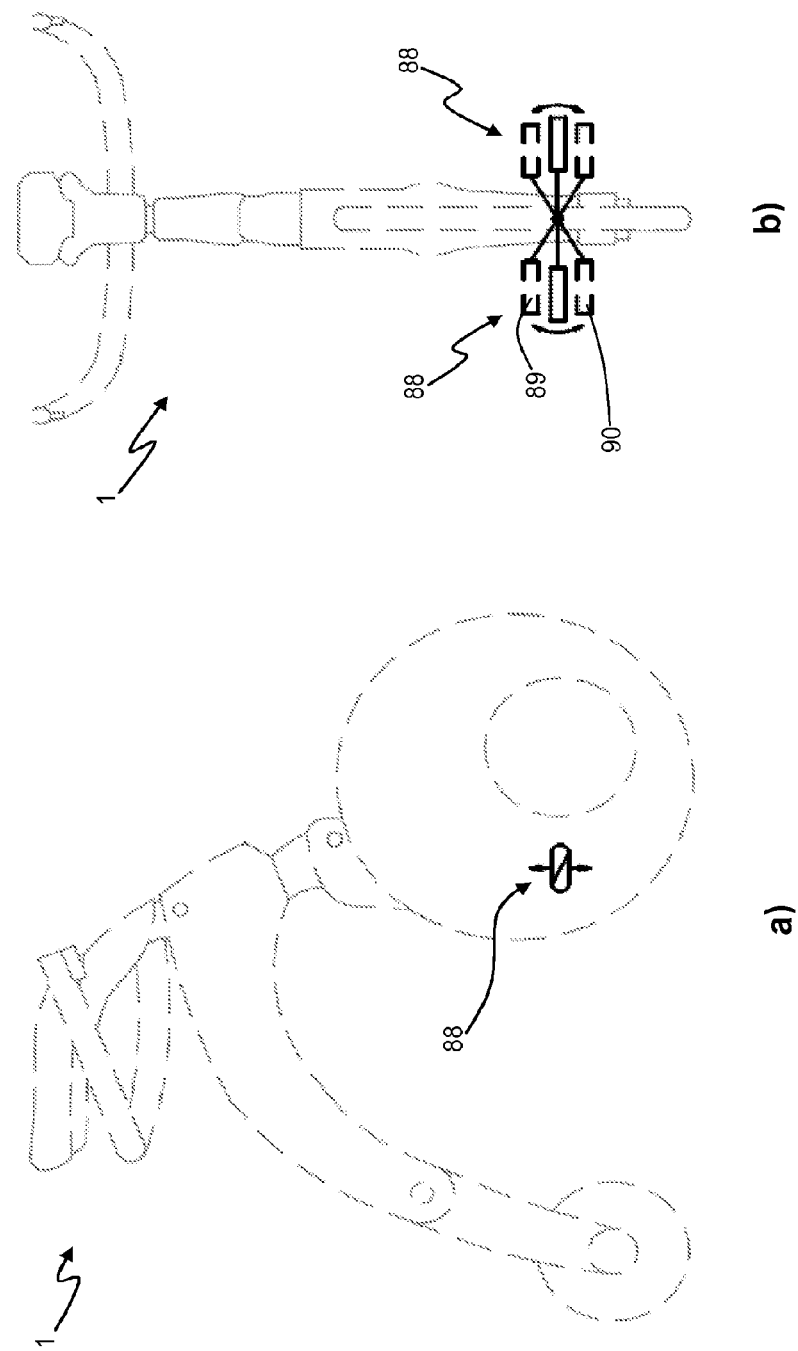
FIGS. 32a and 32b respectively show side and front elevations of a 'pedal-assist' drive mechanism for use with the cycle of FIG. 1.

Another alternative drive mechanism configuration is shown in FIG. 32 which shows a cycle (1) with an electric drive mechanism (not shown) and a pedal crank mechanism (88) that uses an elongate crank connected to footrests (12) laterally disposed from the front wheel (5) and movable between upper (89) and lower positions (90). The pedal crank (88) pivots about a centre pivot (91) and reciprocates a cam (not shown) connected to a drive gear (not shown) which is in turn coupled to the front wheel rim (not shown). The linear footrest motion is thus converted into rotary motion of the front wheel (5). Such a 'pedal-assist' configuration may be used to provide supplementary motive force without requiring a large protruding pedal crank mechanism such as that shown in FIG. 31c.

Figure 33:
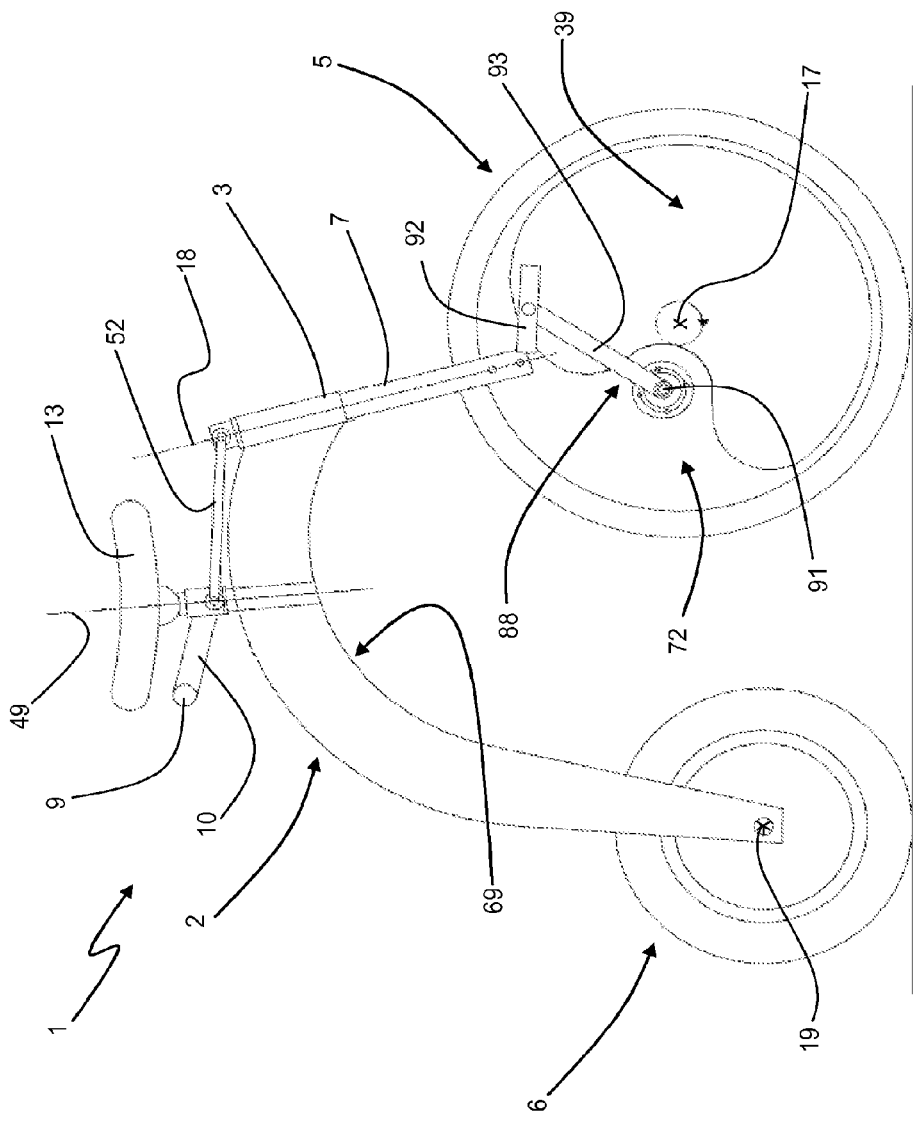
FIG. 33 shows a collapsible cycle according to another embodiment of the present invention.

FIG. 33 shows a cycle (1) according to another embodiment of the present invention. This cycle (1) is pedal-powered by the rider and has a front wheel (5) with a pedal crank assembly (88) coupled to the outer rim (74) of the front wheel (5) to effect rotation of the outer rim (74) from rider rotation of the pedal crank (88). The pedal crank assembly (88) is comprised of a pair of pedals (92) mounted on opposing sides of the front wheel (5) on a crank shaft (93) positioned on an axis eccentric from, and parallel to, the primary axis (17). The pedal crank assembly (88) is enclosed within a substantially annular drive mechanism housing (76) in the front wheel centre portion which prevents any oil and dirt associated with the pedal crank assembly (88) from contact with the rider, either during use or in its collapsed configuration.

Steering input from the rider is effected via a steering mechanism in the form of handlebars (9) pivotally attached to the frame for rotation about a quaternary axis (49). The handlebars (9) are coupled to the steering fork (7) via a transfer coupling in the form of tie-rods (52). The steering fork (7) is attached to the annular housing (76) with the arms of the fork (7) passing either side of the front wheel (5) though it will be readily appreciated that an asymmetric configuration with the fork (7) attached to a single side of the front wheel (5) is also possible.

The rear wheel (6) is rotatably attached to the rear frame portion (4) for rotation about a tertiary axis (19).

The inclusion of a steering mechanism (as shown in the embodiment in FIG. 33) enables greater rider control over direction, stability, acceleration and deceleration of the cycle (1). It will be appreciated that the transfer coupling (52) may be configured (not shown) to operate within a portion of the frame (2) to further enhance the sleekness of the cycle (1) minimising external fixtures and other potential encumbrances to collapsing and transport. To provide intuitive steering, it is important that the direction of rotation by the handle bars (9) is translated by the steering member rather than causing the converse rotation.

Figure 11:
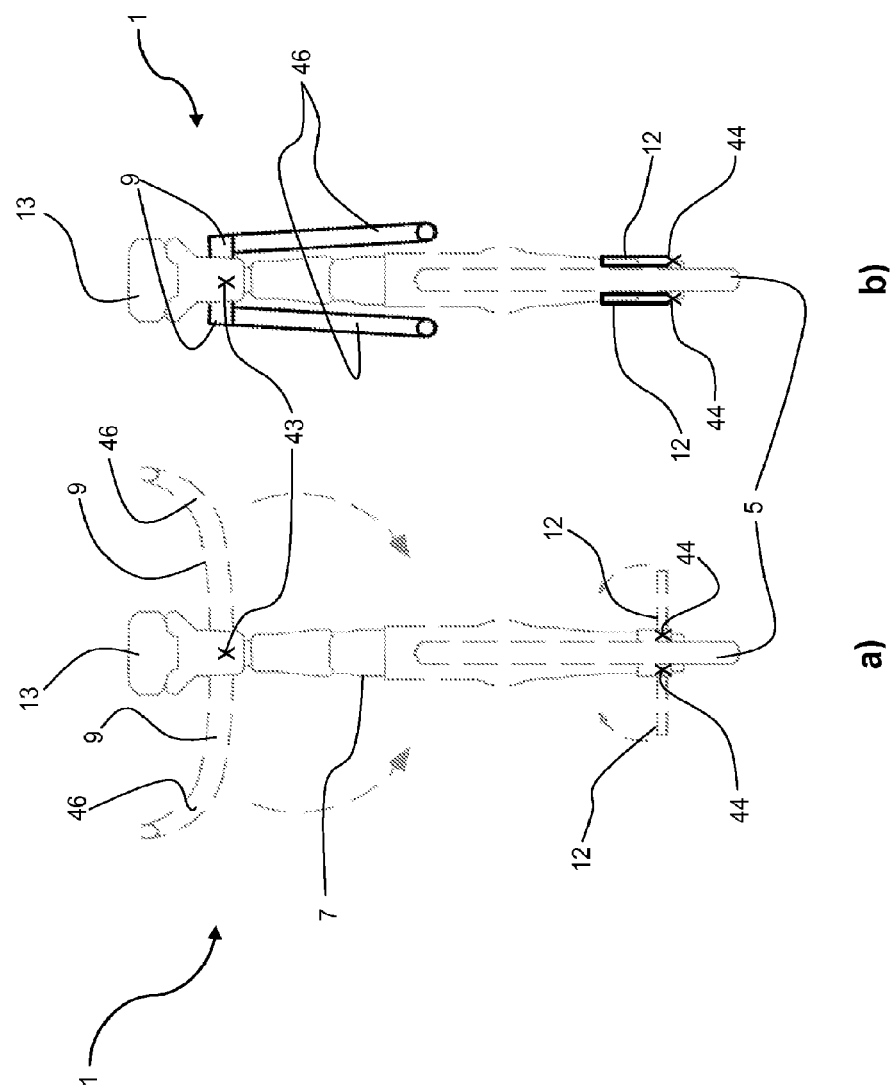
FIG. 11a show a side elevation of the cycle of FIG. 1 with the handlebars and footrests in the erect configuration.
FIG. 11b show a side elevation of the cycle of FIG. 1 with the handlebars and footrests in the collapsed configuration.
Figure 34:
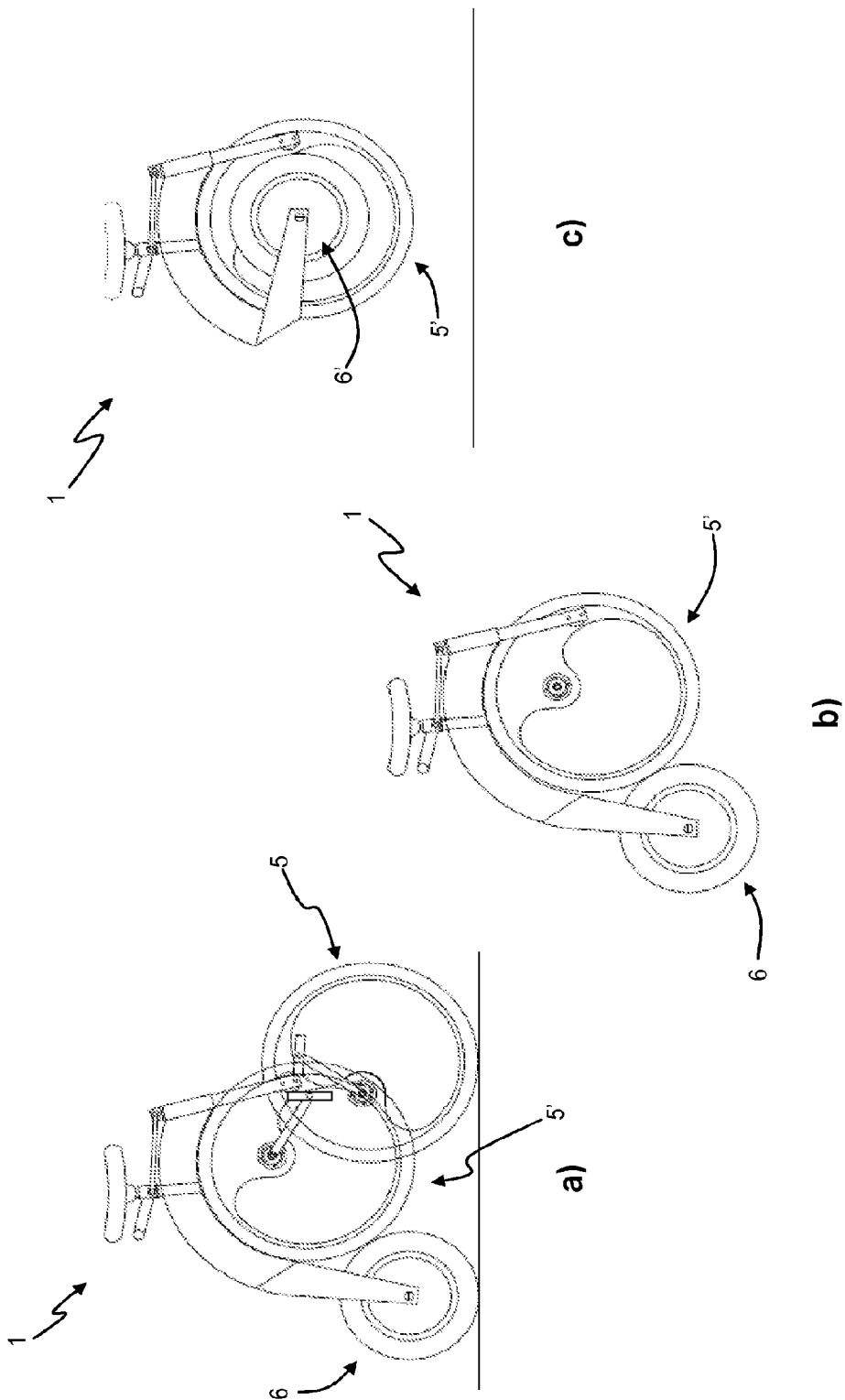
FIGS. 34a-34c show side elevations of the folding sequence of the cycle of FIG. 33.

FIG. 34 shows for completeness, the associated sequence of collapsing of the cycle embodiment in FIG. 33, whereby the front (5) and rear wheels (6) pivot into closer mutual proximity with each other and the frame (2) in the same sequence as shown in the embodiment in FIGS. 11-12.

FIGS. 35a-c show further embodiments of the present invention in which the frame (2) is articulated to enable the front and rear wheels (5) to move with respect to each other about an articulation point (94). The configuration of the embodiments shown in FIG. 35 permits the steering mechanism and associated transfer coupling described in the above embodiments to be omitted to provide a simplified configuration. Steering is provided by input from the user's feet (28) and knees (29) on the pedal crank (12) together with corresponding shifts in the user's weight distribution. It will be appreciated the same steering methods could be employed with an external drive mechanism such as an electric motor.

FIG. 35a shows a cycle (1) with an articulation point (94) immediately adjacent the attachment of the rear wheel (6) to the frame (2) while FIG. 35b) shows an embodiment with an articulation point (94) at an intermediate position on the frame (2) between the front and rear wheels (5, 6). FIG. 35c shows an embodiment with an articulation point (94) immediately between the front wheel steering member (7) and the frame (2).

It will again be appreciated that the demonstrated embodiments are merely exemplary and numerous alternative embodiments may be configured to incorporate the inventive aspect of the present invention. Thus, in alternative embodiments (not shown), the cycles (1) shown in FIG. 35 a-c may be equipped with steering mechanisms acting on the front (5) or rear (6) wheels. As previously discussed, it will be readily understood that rear-wheel cycle steering is very difficult to configure to achieve satisfactory stability, with the configuration of FIG. 35 a) offering the lowest stability, and that of FIG. 35 c) the highest.

Figure 36:
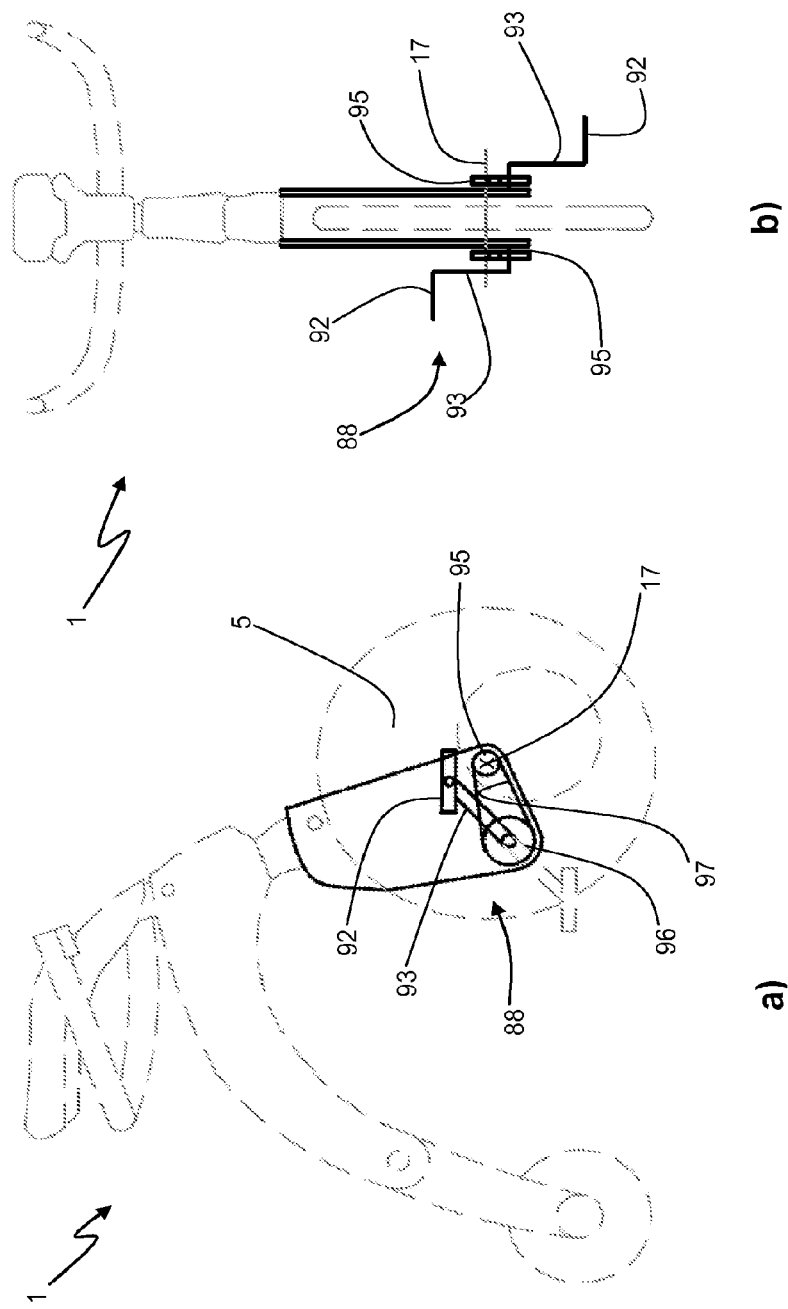
FIGS. 36a and 36b respectively show side and front elevations of a user-powered pedal drive mechanism for use with the cycle of FIG. 33.

In the embodiment of FIG. 36, it can be seen the rotation axis of the pedal crank (93) is placed in the rearward portion of the front wheel, thereby effectively lengthening the wheel base of the cycle (1) and increasing the range of steering movement about the secondary steering axis (18) that may be performed without interference between the front wheel/crank pedal assembly and the frame (2) and/or rider's legs (not shown). The eccentric crank pedal placement also provides a reduction in the effects of torque steer which otherwise affects wheels driven directly through the primary rotation axis (17), particularly during slow speed maneuvering and/or starting from rest.

The wheelbase may be further lengthened by locating the attachment point of the front wheel steering member (7) to the housing at a more rearward position. Moving the secondary steering axis (18) to pass rearward of the primary rotation axis (17) of the front wheel (5) also increases the stability of the cycle (1), albeit at the expense of requiring greater rider input to change direction.

As discussed above, front wheel drive pedal cycles with the pedal crank passing through the primary axis (17) suffer from the effects of torque steer, particularly when starting from rest. Thus, displacing the pedal crank (96) rearward from the primary axis (17) as in the embodiments shown provides several key benefits, including increased stability (aided by an increased wheelbase) and reduced torque steer. Furthermore, the rearward displacement of the pedal crank (96) from the primary axis (17) enables the rider's seating position to also be moved rearwards, thus providing greater stability whilst retaining the desirable high visibility characteristics and truncated frame.

In the embodiment shown in FIG. 36 the front wheel (5) is a wheel with a central axle (95) configured to rotate relative to an enlarged steering fork (7) about the primary axis (17). The steering fork (7) is located about the front wheel (5) and rotatably retains pedal crank mechanism (93) and axle (95). The pedal crank (93) has a crank gear (96) connected to the axle (95) via a drive belt (97) to effect rotation of the front wheel (5) through rotation of the axle (95) via the crank gear (96). The embodiment of FIG. 36 thus provides a penny-farthing/mini-farthing type configuration with the front wheel (5) driven by rotating its central axle/hub (95). However, in contrast to a conventional Penny-Farthing configuration, the eccentric pedal crank mechanism (88) permits gearing to be used and provides many of the other advantages of eccentrically mounted drive mechanisms.

Figure 37:
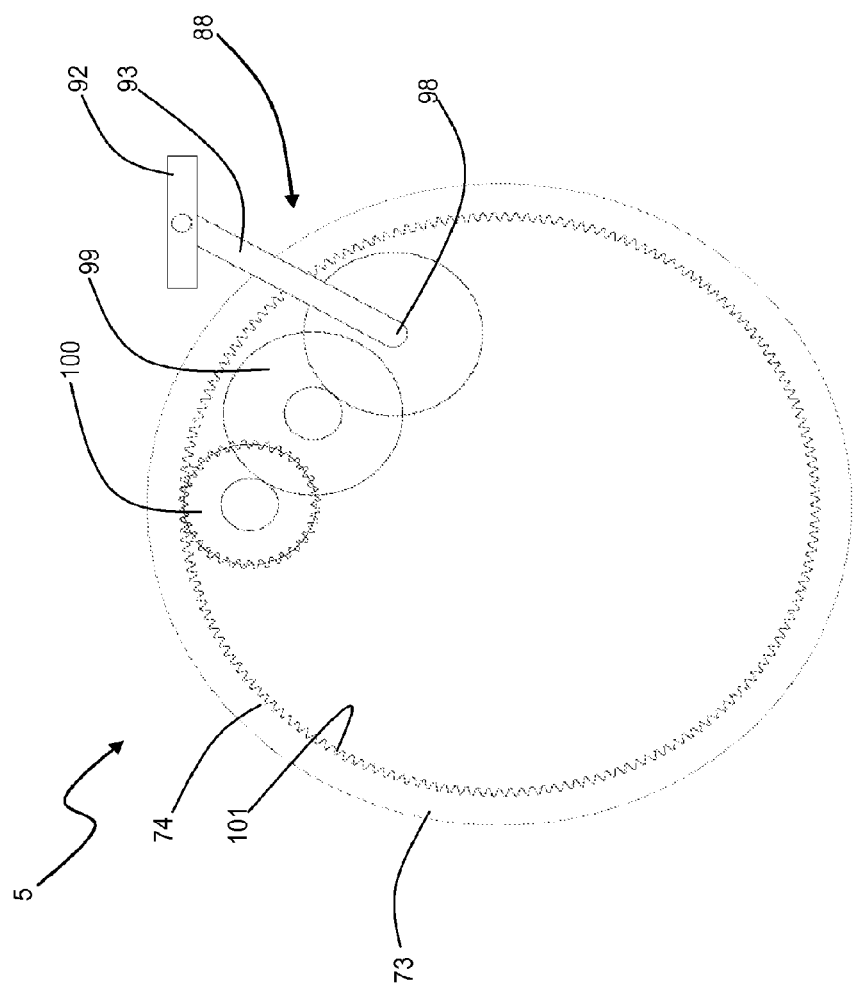
FIG. 37 shows a side elevation of one possible embodiment of a gearing system for use with a user-powered drive mechanism of a cycle.

FIG. 37 shows one embodiment of a geared pedal crank drive mechanism (88) that drives a hubless wheel (5). As FIG. 37 shows only one side of the drive mechanism, reference will be made to a single pedal (92) and pedal crank (93), though it will be clear that two such pedals and pedal cranks will typically be provided. This drive mechanism (88) has a pedal (92) rotatably attached to one end of a corresponding pedal crank (93) which the rider is able to operate with their feet to rotate a crank gear (98) attached to the other end of the crank (93). This crank gear (98) is rotatably engaged with a smaller intermediate gear (99) which is in turn rotatably engaged with a drive gear (100) to drive the rotatable outer rim (74).

The outer rim (74) and drive gear (100) are configured with a toothed engagement interface with the drive gear (100) having a toothed outer circumference and the rim portion (74) having a toothed annular inner surface (101), though a smooth frictional contact could also be used. The intermediate gear (99) is required to ensure the direction of crank pedal rotation matches that of the front wheel (5) though it will be appreciated that an extremely simplified configuration is possible by driving the rim portion (74) directly from the crank gear (98) if a satisfactory gear ratio can be achieved.

It will be readily understood by one skilled in the art that the resultant gear ratio produced by the crank, intermediate and drive gears (98, 99, 100) may be varied to provide a range of ratios. Numerous alternative means of coupling the drive mechanisms to the outer rim (74) of the front wheel (5) are possible including pulleys, belts and the like as will be readily apparent to one skilled in this field. The coupling for the drive mechanism (88) may also include gear changing mechanisms (not shown) to vary the resultant drive ratio between the crank gear (98) and the wheel rim (74).

The cycle embodiments of FIGS. 33-36 provide numerous advantages for a collapsible cycle primarily intended for urban use. Prior art collapsible cycles often use relatively small wheels to minimize the collapsed cycle volume. However, the prior art use of small wheels has also required the use of a pedal crank and chain drive mechanism located externally to the driven wheel. In the case of pedal cycles, the undesirable complexity of a chain drive has hitherto been unavoidable because the small size of the wheel prevents a centre located pedal crank without the pedals impacting the ground.

Thus, although configuring the cycle with a front wheel operated drive mechanism (e.g. a pedal crank placed at the geometric wheel centre) reduces the overall complexity of the cycle and facilitates efficient compaction when folded, it places limitations on the minimum wheel size. Moreover, such a front wheel pedal drive mechanism also generates restrictions on the upper wheel size, i.e. a rider may be unable to effectively reach the pedal crank of a large wheel or place their feet on the ground at rest, whilst small wheels are restricted to the use of correspondingly small pedals to avoid the risk of ground engagement, particularly during cornering. These disadvantages are addressed in pedal-driven embodiments of the present invention by the use of an eccentric pedal crank mechanism (88).

Figure 38:
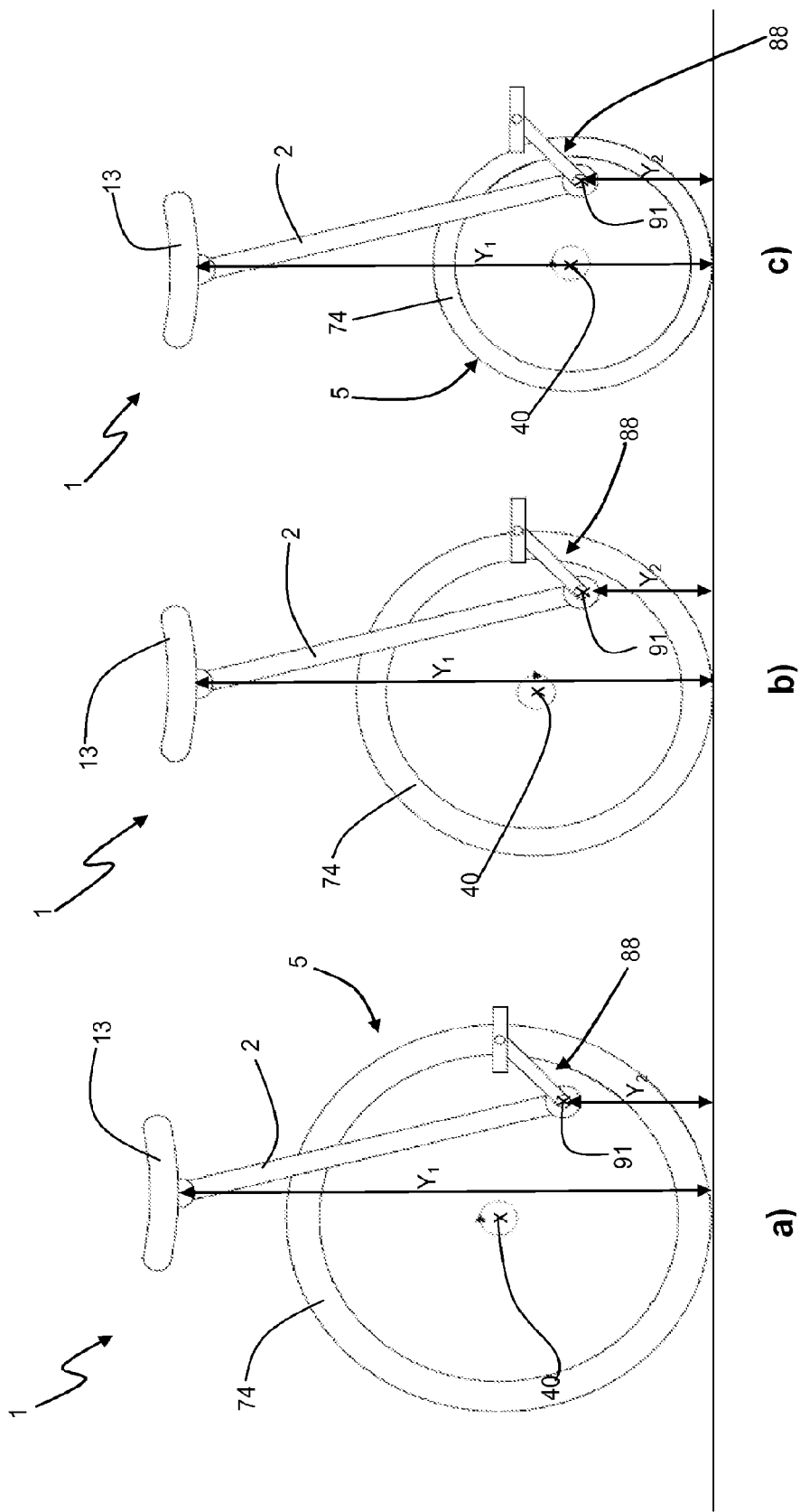
FIGS. 38a-38c show three embodiments of a unicycle according to another aspect of the present invention.
Figure 39:
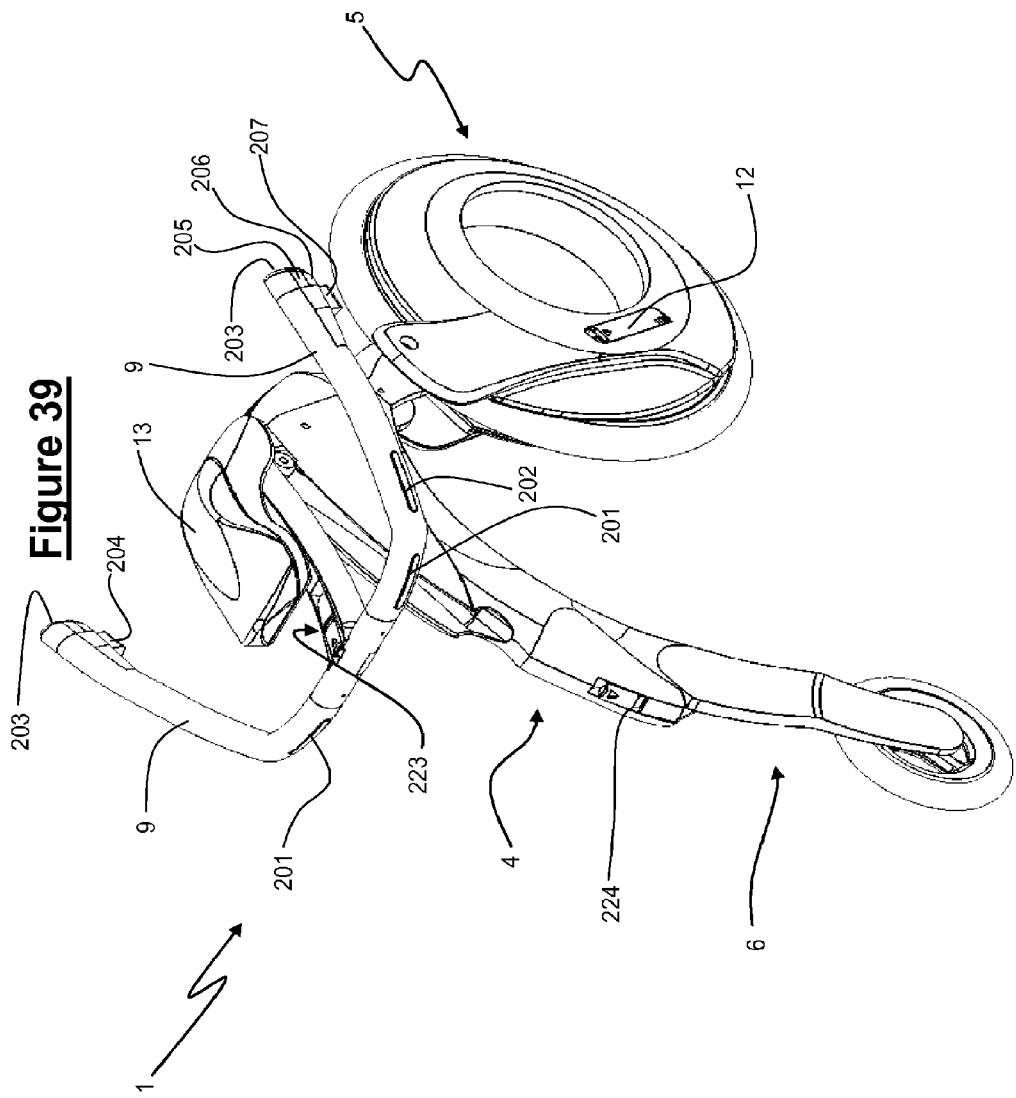
FIG. 39 shows a perspective view of a cycle according to yet another embodiment of the present invention.
Figure 40:
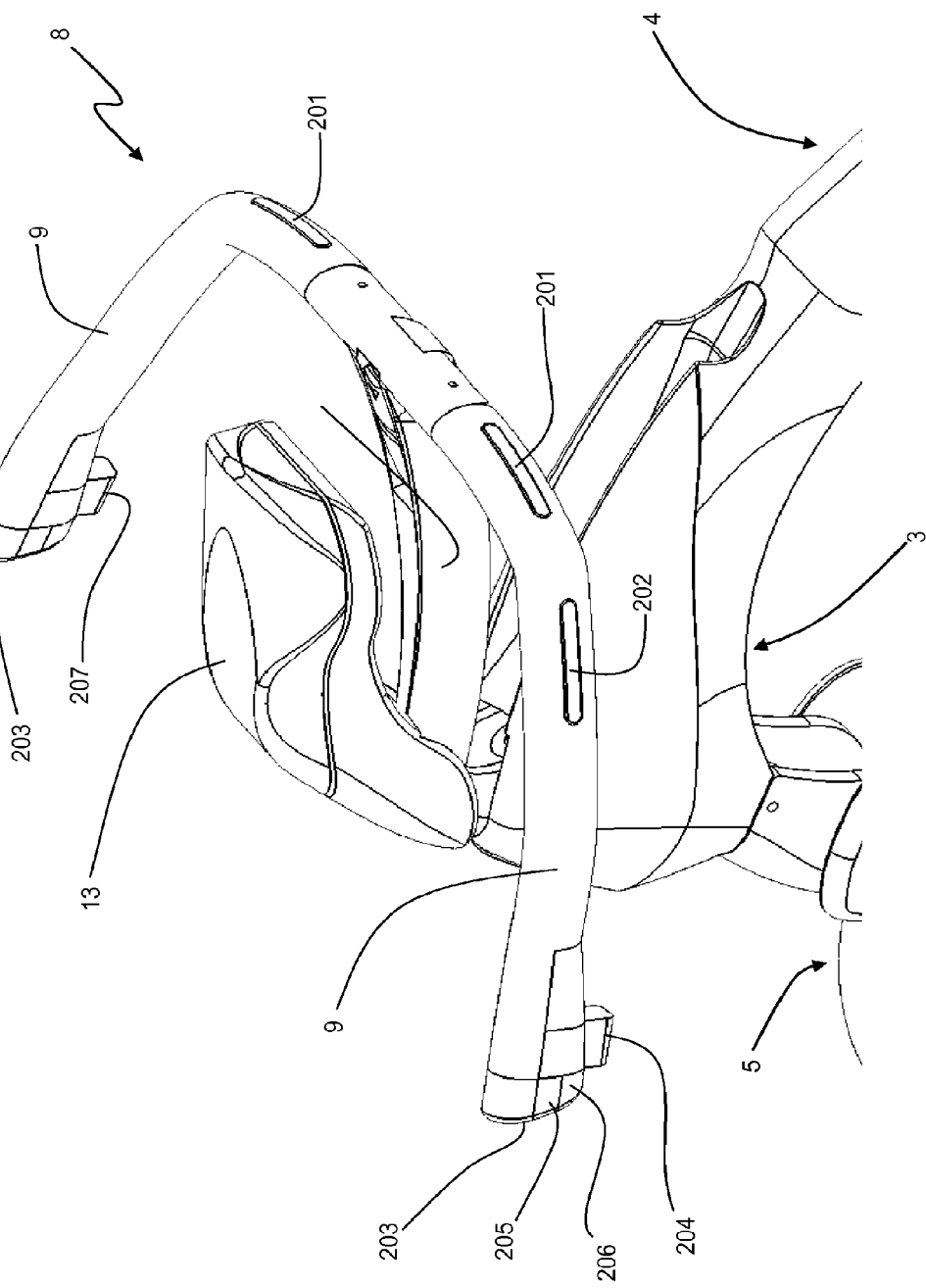
FIG. 40 shows an enlarged perspective view of the steering mechanism of the cycle of FIG. 39.
Figure 41:
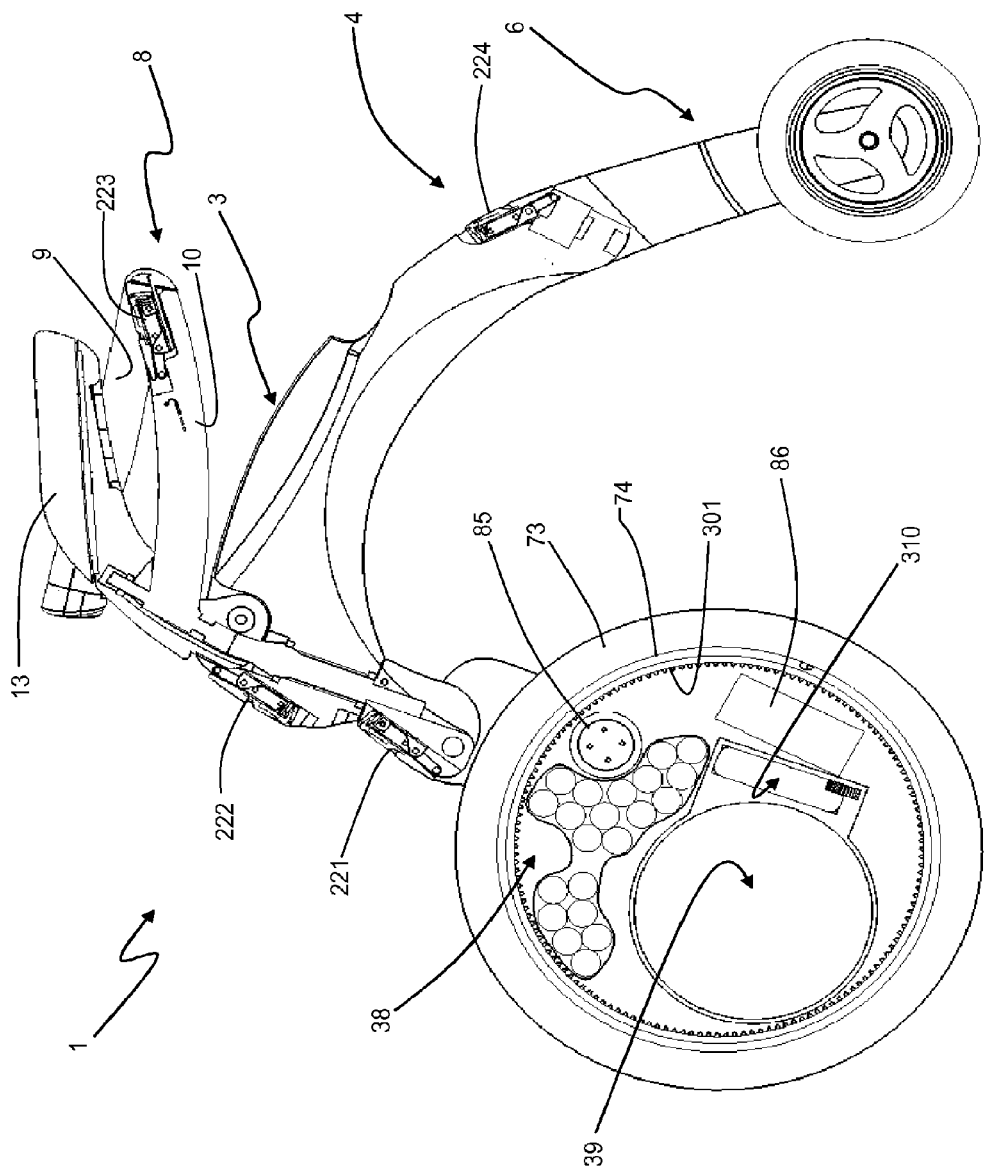
FIG. 41 shows a side elevation on a longitudinal cross-section of the cycle of FIGS. 39 and 40.
Figure 42:
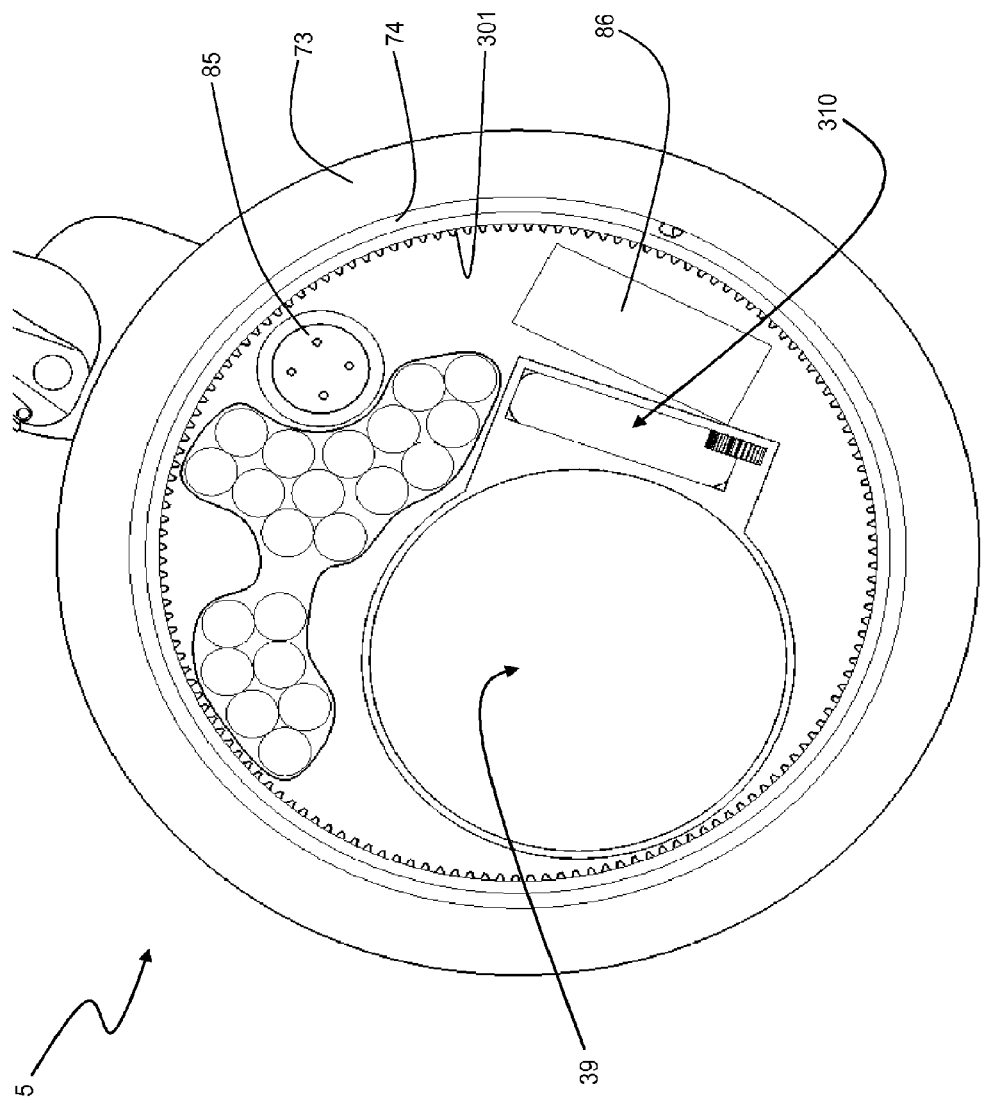
FIG. 42 shows an enlarged longitudinal cross-section of the front wheel of the cycle of FIGS. 39-41.

FIG. 38 shows three alternative unicycle embodiments with each unicycle (1) having a frame (2) with a rider seat (13) attached at an upper frame portion and a hubless wheel (5) with a rotatable outer rim portion (74). The wheel (5) is pivotally attached to the frame (2) and a pedal crank (93) is coupled to the outer rim portion (74) to effect wheel rotation from rider rotation of the pedal crank (93). The pedal crank (93) is eccentrically positioned within the wheel (5). Such an eccentric 'tertiary' pedal crank axis (19) enables the selection of the optimum wheel diameter. As shown in FIG. 38, by placing the pedal crank axis (93) eccentrically from the primary axis of wheel rotation (17), the height $Y_1$ of the pedal crank axis (93) above the ground and the height $Y_2$ of the seat (13) above the ground may be maintained at their optimum values irrespective of the front wheel (5) diameter. A further advantage of the present invention when applied to unicycles (as shown in FIG. 38) is the eccentric pedal crank axis (93) may be placed slightly in front of the rider, avoiding the destabilising effects of being forced to place the pedals at the wheel centre directly beneath the rider.

The cycle (1) shown in FIGS. 39-46 is generally the same as the cycle (1) shown in other figures and like parts have been referenced the same.

The cycle (1) has lights (201, 202, 203) positioned on the handlebars (9) which include brake lights (201) positioned on the rearward portion of the handlebars (9) and indicator lights (202) on rear-lateral portions. Headlights (203) are provided on the ends of the handlebars (9). These headlights (203) may also function as indicators. The brake lights (201) are activated whenever a brake control trigger (204) is pressed and the indicators (202) are activated by switches (205). The headlights (203) may be activated by switches (206) or alternatively may be turned on automatically when the rider is seated, e.g. as detected by a pressure switch in the seat (13). It will be appreciated that further lights or activation configurations may also be used.

An accelerator trigger (207) is provided on the end of right handlebar (9) and controls the energisation of the drive mechanism (38) and therefore the speed of the cycle (1).

The incorporation of electronics into the cycle (1) provides numerous capabilities unavailable to conventional cycles. For example, a conventional cycle is effectively prohibited for mounting rear brake lights on the handlebars as their visibility to road users behind the cycle would be severely obscured by the rider's body. To a somewhat lesser extent, indicator lights mounted on handle bars on a conventional cycle would also be limited in their visibility, particularly from behind the cycle. In contrast, the cycle (1) is configured with the handlebars (9) clearly visible rearward and to the sides of the rider (11). The cycle (1) thus has a significantly enhanced visual, communication and safety impact for other road users.

The cycle (1) may be transformed from its erected configuration to its collapsed state by releasing four latches (221, 222, 223, 224) respectively located at positions:

- on the front frame portion (3) adjacent the front wheel (5) to lock/release the front wheel position relative to the front frame portion (3);
- on the front frame portion (3) adjacent the steering mechanism (8) to lock/release the steering mechanism (8) relative to the front frame portion (3);
- at the end of the stem (10) at the junction with the handlebars (9) to lock/release the handlebars (9), and
- between the rear frame portion (4) and rear wheel assembly (6) to lock/release the rear wheel assembly (6).

The latches (221, 222, 223, 224) are all generally the same and are formed from an over-centre latch operable with a single digit that pivots to lock/unlock the adjacent components together. Each latch (221, 222, 223, 224) has an extendable lever portion and is recessed into a corresponding cycle component. Each latch (221, 222, 223, 224) has a release element movable between a locked and a released position, a fixed engagement fitting and a recess enclosure.

Each recess (231, 232, 233, 234) is coloured red while the latches (221, 222, 223, 224) are coloured green, such that in the locked position, the release element obscures the red recess portion, whilst when the release lever is moved to the released position, the other green portions are visible. These coloured latches thus provide a convenient visual indication that the latch is in the released or locked position.

The latches (221, 222, 223, 224) lock the respective cycle components in their respective positions in both the erected and collapsed configurations so that the cycle (1) is stable in the erect configuration for riding and can be locked in the collapsed configuration for transport or storage.

Figure 43:
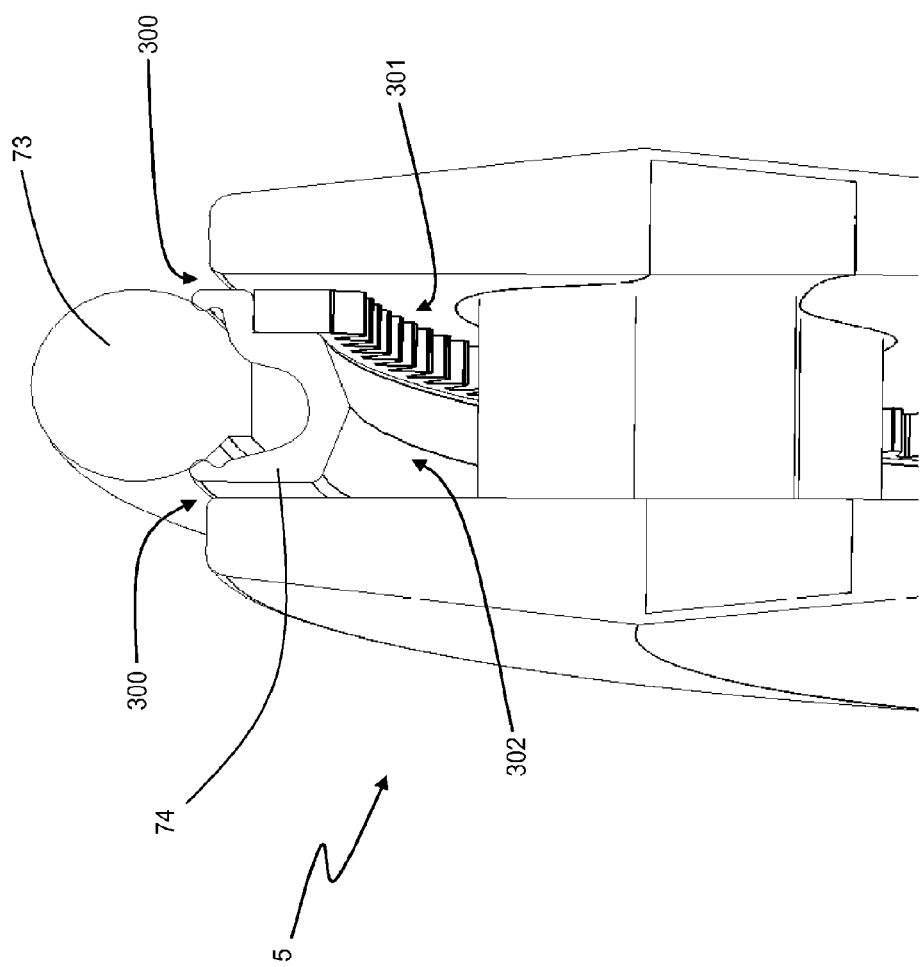
FIG. 43 shows a transverse cross-section of the front wheel shown in FIG. 42.
Figure 44:
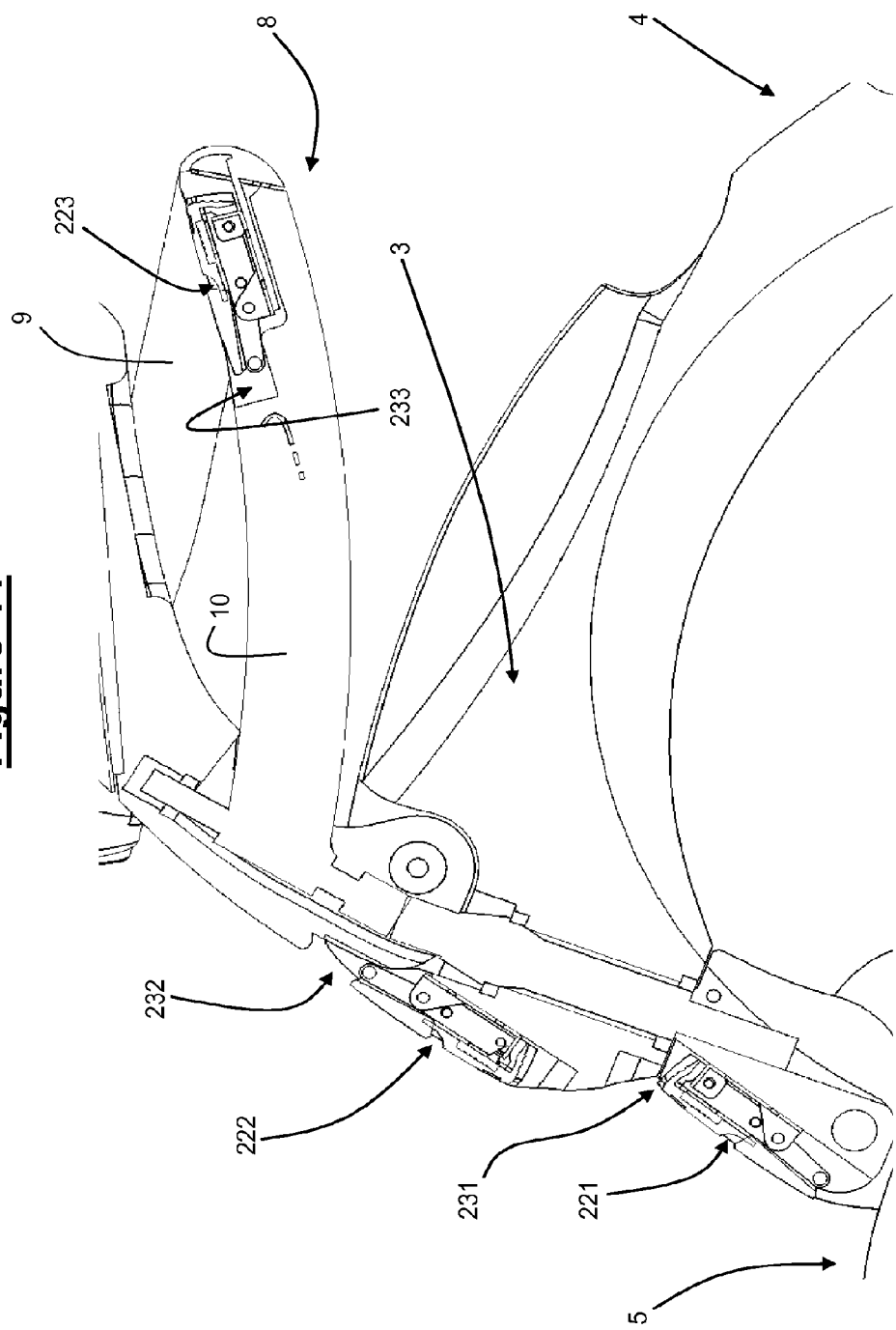
FIG. 44 shows an enlarged longitudinal cross-section of the front frame portion of the cycle of FIGS. 39-41.
Figure 45:
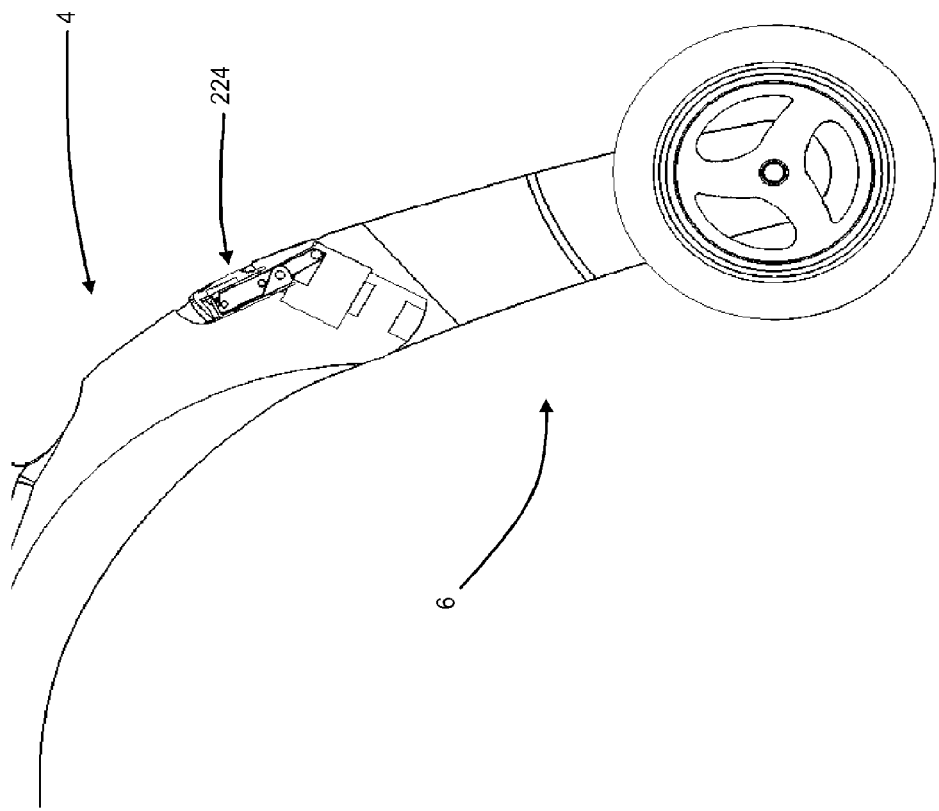
FIG. 45 shows an enlarged longitudinal cross-section of the rear frame portion of the cycle of FIGS. 39-41.
Figure 46:
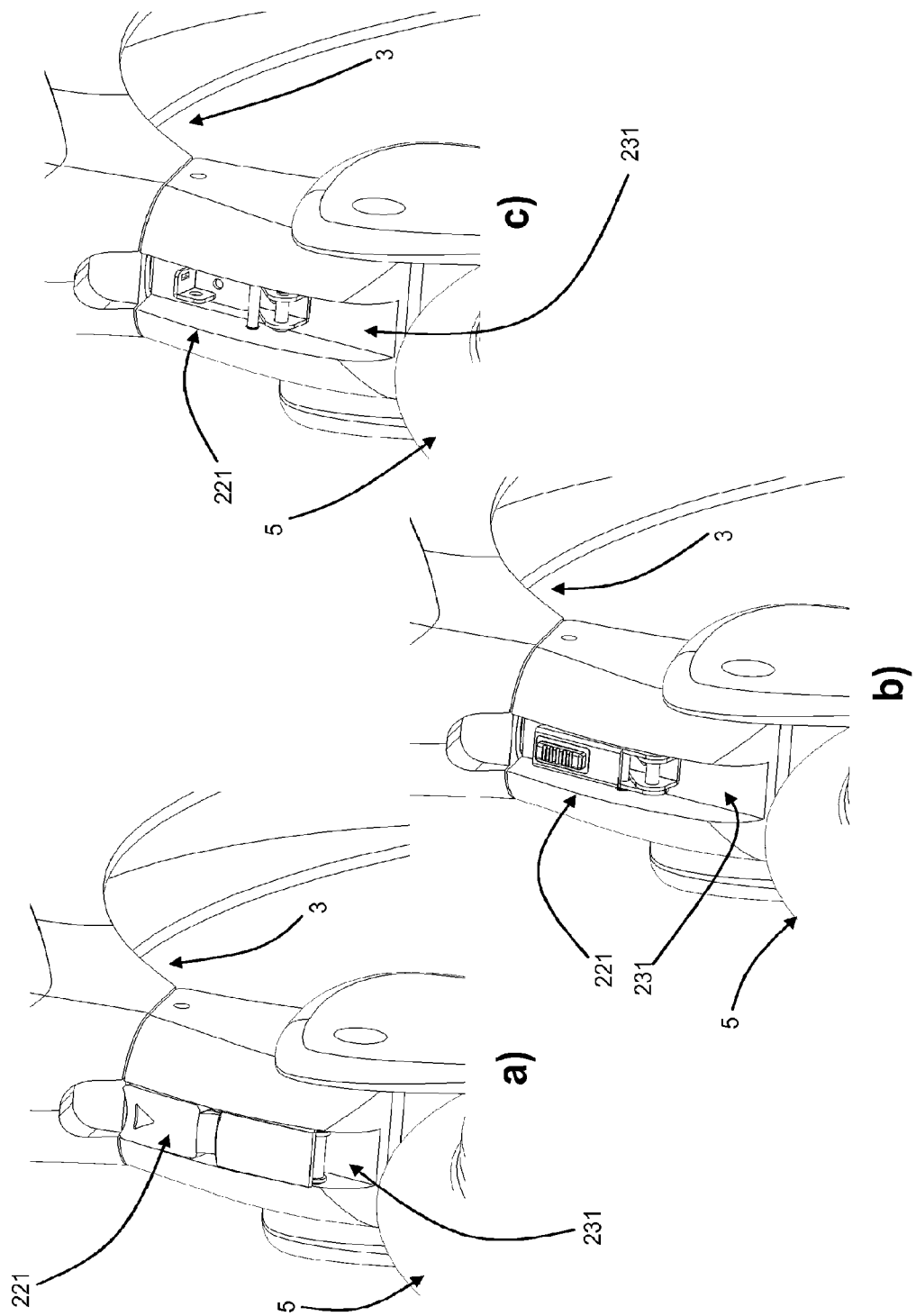
FIGS. 46a-46c show the different components of the latches on the cycle as shown in FIGS. 39-45.

As shown most clearly in FIG. 43, the hubless front wheel (5) has an annular perimeter (300) opening about the interface between the rotating rim portion (74) and the rest of the wheel (5). The outer rim portion (74) also includes a toothed inner surface (301) to be driven by the electric drive mechanism (38) via gear (not shown).

It is thus difficult to provide a totally weatherproof seal about this opening (300) which is inevitably subjected to abrasive water-borne grit and dirt ingress. To alleviate this problem the hubless front wheel (5) is therefore provided with a rotatable outer rim portion (74) rotating about the wheel centre and supported by a plurality of bearings (not shown) located about the periphery of the wheel centre. The outer rim portion (74) and bearings are configured to be in mutual contact between mating surfaces including an inner rim portion contact surface (302) and an outer bearing contact face. The inner rim portion contact surface (302) is substantially convex and v-shaped in transverse cross-section such that liquid and particulate are deflected outwards by rotation of the rim portion (74) about the wheel centre. Thus, although moisture and dirt may enter through the opening (300), the centripetal motion generated by the rotating rim portion (74) causes the expulsion of same via the same opening (300). This action also preserves the mating surfaces between the outer rim portion (74) and the bearings from wear resulting from the accumulation of dirt/grit.

The rotational effects of the wheel are also utilised to generate an airflow movement through the wheel centre to aid in cooling the electric motor, battery and other internal components. Apertures (310) into the front wheel (5) are exposed when the footrests (12) are pivoted out and thus provide air intakes/exhausts into the front wheel (5). Additional air intakes/exhausts may also be provided in the aperture (39) in the front wheel (5).

It will be readily seen that numerous frame configurations, wheel sizing and placements and steering mechanisms are possible. For example, while the preferred embodiments described herein relate to bicycle or unicycle configurations, it will be appreciated that the cycle of the present invention may include further wheels to give a three, four or more wheeled cycle. Thus it should be appreciated that the above embodiments are exemplary only and that numerous alternative configurations are possible.

It will be readily seen that numerous frame configurations, wheel sizing and placements and steering mechanisms are possible. For example, while the preferred embodiments described herein relate to bicycle or unicycle configurations, it will be appreciated that the cycle of the present invention may include further wheels to give a three, four or more wheeled cycle. Thus it should be appreciated that the above embodiments are exemplary only and that numerous alternative configurations are possible.

Aspects of the present invention have been described by way of example only and it should be appreciated that modifications and additions may be made thereto without departing from the scope thereof.

What is claimed:

1. A collapsible cycle for use by a rider over a terrain surface, said cycle including:
   a frame having front and rear portions, said cycle frame including:
   a longitudinal axis coincident with a second plane orientated substantially vertically, passing through a forward and rearward direction of cycle travel, and
   a lateral axis orthogonal to said longitudinal axis, and;

a seat attached to the frame;

a front wheel rotatably attached to a steering member, said front wheel rotatable in a first plane about a primary axis, said steering member being pivotally attached to the front frame portion for rotation about a secondary axis orthogonal to said primary axis;

a user-operable steering mechanism coupled to said steering member;

a rear wheel, rotatably attached to the rear frame portion and rotatable in a third plane about a tertiary axis;

a drive mechanism operatively coupled to the front or rear wheel;

said cycle defined volumetrically by mutually-orthogonal parallel-pairs of vertical and horizontal planes (when the cycle is positioned upright), demarcating opposed longitudinal, lateral and vertical boundary planes, respectively located at longitudinal, lateral and vertical extremities of both said cycle and front wheel, rear wheel and frame individually, said cycle collapsible from an erect riding configuration to a collapsed configuration by repositioning said front and rear wheels into mutually closer proximity, and characterized in that said steering mechanism includes a pair of handlebars displaced from the secondary axis by a stem, the stem extending from the steering member rearward and below the seat.

2. A collapsible cycle as claimed in claim 1, wherein at least a portion of the handlebars are positioned below and/or rearward of said seat.

3. A collapsible cycle as claimed in claim 1, wherein the steering mechanism further includes a transfer coupling to transfer rotational movement of the steering mechanism to generate corresponding rotational movement of the steering member and front wheel about the secondary axis in the same direction as the steering mechanism movement.

4. A collapsible cycle as claimed in claim 3, wherein the transfer coupling is at least partially enclosed by a portion of said frame.

5. A collapsible cycle as claimed in claim 1, configured such that said steering member secondary axis is inclined rearwards and subtends an angle with said terrain surface of between 60 and 80 degrees.

6. A collapsible cycle as claimed in claim 1, wherein a horizontal distance $X_4$ between the intersection of the secondary axis with said terrain surface and a vertical line passing substantially through, or immediately a rearward edge of said seat is within 20% of the value $X_4$ as given by the formula:

$$X_4 = \tan\Theta(0.28 Y_1 \tan\Theta + Y_1)$$

where $\Theta$ is the secondary axis angle, $Y_1$ is the vertical seat height at said vertical line.

7. A collapsible cycle as claimed in claim 1, wherein at least one of said front and rear wheels is a hubless wheels with a rotatable outer rim portion.

8. A collapsible cycle as claimed in claim 7, wherein said drive mechanism is coupled to the outer rim portion to effect wheel rotation.

9. A collapsible cycle as claimed in claim 1, wherein said drive mechanism is operatively connected to the front wheel for rotation about a drive axis, eccentric to said primary axis.

10. A collapsible cycle as claimed in claim 1, wherein said drive mechanism includes an externally-powered drive mechanism.

11. A collapsible cycle as claimed in claim 1, wherein said front wheel has a diameter exceeding a diameter of said rear wheel.

12. A collapsible cycle as claimed in claim 1, wherein said drive mechanism is configured to provide retardation during descending and/or braking.

13. A collapsible cycle as claimed in claim 1, wherein said drive mechanism is configured to provide electro-motive power generation during descending and/or braking.

14. A collapsible cycle as claimed in claim 1,
wherein said pair of handlebars is formed as twin bars, laterally disposed symmetrically either side of said stem, each bar being capable of being repositioned into closer mutual proximity with the frame by insertion into a corresponding mating recess in said frame.

15. A collapsible cycle as claimed in claim 1, wherein said front wheel and frame are pivotable together to insert the front wheel at least partially into a recess or aperture in the frame.

16. A collapsible cycle as claimed in claim 1, wherein when the cycle is oriented vertically upright, said front wheel repositioning is performed by pivoting the front wheel substantially in a vertical plane about a transversely orientated first fold axis.

17. A collapsible cycle as claimed in claim 1, wherein said repositioning includes pivoting the rear wheel substantially in the horizontal plane about a second fold axis.

18. A collapsible cycle as claimed in claim 1, wherein the rear wheel is releasably pivotable about a hinge located on the frame and having a second fold axis orientated in the vertical plane when the cycle is in its upright configuration.

19. A collapsible cycle as claimed in claim 1, wherein the steering mechanism and seat are both pivotable about a third fold axis.

20. A collapsible cycle as claimed in claim 19, wherein the third fold axis is located on, or substantially adjacent to, and orthogonal to, the secondary axis.

21. A collapsible cycle as claimed in claim 1, wherein the front wheel is releasably constrained from rotation about said secondary axis by at least one of the following configurations:
 a. pivoting the steering mechanism into a mating steering mechanism retaining recess in the frame, or
 b. pivoting the front wheel into a mating front wheel retaining recess in the frame.

22. A collapsible cycle as claimed in claim 1, including at least one footrest on a front wheel assembly.

23. A collapsible cycle as claimed in claim 22, further including a pair of said footrests configured such that deploying or retracting one of said pair of footrests simultaneously causes the deploying or retracting of the other footrest of said pair of footrests.

24. A collapsible cycle as claimed in claim 1, wherein in the collapsed configuration at least two of the front wheel, rear wheel, steering mechanism, seat and frame are repositioned into mutually closer proximity such that the longitudinal, lateral and vertical cycle boundary planes define a reduced volume cuboid.

25. A collapsible cycle as claimed in claim 1, wherein in the collapsed configuration the front wheel, rear wheel, steering mechanism, seat and frame are repositioned into mutually closer proximity such that the longitudinal, lateral and vertical cycle boundary planes define a reduced volume cuboid.

26. A collapsible cycle as claimed in claim 1, wherein the steering mechanism and frame are capable of being repositioned into mutually closer proximity such that at least a portion of the steering mechanism is positioned inside a recess, enclosure, opening, housing, or indentation in the frame.

27. A collapsible cycle as claimed in claim 1, wherein the steering member and frame are capable of being repositioned into mutually closer proximity such that at least a portion of the steering member is positioned inside a recess, enclosure, opening, housing, or indentation in the frame.

28. A collapsible cycle as claimed in claim 1, wherein the seat and frame are capable of being repositioned into mutually closer proximity such that at least a portion of the seat is positioned inside a recess, enclosure, opening, housing, or indentation in the frame.

29. A collapsible cycle as claimed in claim 1, wherein in the collapsed configuration the front wheel and frame are repositioned into mutually closer proximity such that at least one of said lateral and/or longitudinal boundary planes of the front wheel at least partially overlaps a region between said frame lateral and/or longitudinal boundary planes respectively.

30. A collapsible cycle as claimed in claim 1, wherein in the collapsed configuration the rear wheel and frame are repositioned into mutually closer proximity such that at least one of said lateral and/or longitudinal boundary planes of the rear wheel at least partially overlaps a region between said frame lateral and/or longitudinal boundary planes respectively.

31. A collapsible cycle as claimed in claim 1, wherein in the collapsed configuration at least one of the lateral and/or longitudinal boundary planes of the rear wheel at least partially overlaps a region between said front wheel lateral and/or longitudinal boundary planes respectively.

32. A collapsible cycle as claimed in claim 1, wherein in the collapsed configuration the front wheel, rear wheel and frame are repositioned into mutually closer proximity whilst maintaining a constant, or decreased separation between the cycle lateral, longitudinal and vertical boundary planes.

33. A method of collapsing a collapsible cycle as claimed in claim 1, said method including the sequence:
  pivoting the steering mechanism and frame into mutually closer proximity about a third fold axis such that at least a portion of the steering mechanism is positioned inside a recess, enclosure, opening, housing, or indentation in the frame, thereby preventing the steering mechanism and the attached steering member from rotation about said secondary axis relative to the frame;
  pivoting the front wheel and frame into mutually closer proximity about a first fold axis such that at least one of said lateral boundary planes of the front wheel at least partially overlaps a region between said frame lateral boundary planes;
  pivoting the rear wheel and frame into mutually closer proximity about a second fold axis such that at least one of said lateral boundary planes of the rear wheel at least partially overlaps a region between said frame lateral boundary planes.

34. A method of collapsing a collapsible cycle as claimed in claim 1, said method including the sequence:
  pivoting the front wheel and frame into mutually closer proximity about a first fold axis such that at least one of said lateral boundary planes of the front wheel at least partially overlaps a region between said frame lateral boundary planes;
  pivoting the steering mechanism and frame into mutually closer proximity about a third fold axis such that at least a portion of the steering mechanism is positioned inside a recess, enclosure, opening, housing, or indentation in the frame, thereby preventing the steering mechanism and the attached steering member from rotation about said secondary axis relative to the frame;
  pivoting the rear wheel and frame into mutually closer proximity about a second fold axis such that at least one of said lateral boundary planes of the rear wheel at least partially overlaps a region between said frame lateral boundary planes.

\* \* \* \* \*